(12) United States Patent
Vora et al.

(10) Patent No.: US 11,159,658 B2
(45) Date of Patent: Oct. 26, 2021

(54) HOMOGENIZATION OF TELEMATICS DATA THROUGH UNIFIED MESSAGING PROTOCOL

(71) Applicant: Moj.io, Inc., Vancouver (CA)

(72) Inventors: Tejas Ashokkumar Vora, Burnaby (CA); Mahmoud Ahmed Abdelfattah Abdelrasoul, Surrey (CA); Christopher Michael Maloney, San Francisco, CA (US)

(73) Assignee: MOJ.IO, Inc., Vancouver (CA)

( * ) Notice: Subject to any disclaimer, the term of this patent is extended or adjusted under 35 U.S.C. 154(b) by 86 days.

(21) Appl. No.: 16/519,957

(22) Filed: Jul. 23, 2019

(65) Prior Publication Data

US 2020/0028946 A1    Jan. 23, 2020

Related U.S. Application Data

(60) Provisional application No. 62/701,951, filed on Jul. 23, 2018.

(51) Int. Cl.
| | |
|---|---|
| *G06F 15/16* | (2006.01) |
| *H04L 29/08* | (2006.01) |
| *H04L 1/16* | (2006.01) |
| *H04L 1/18* | (2006.01) |
| *H04W 80/06* | (2009.01) |

(52) U.S. Cl.
CPC .......... *H04L 69/326* (2013.01); *H04L 1/1642* (2013.01); *H04L 1/1874* (2013.01); *H04L 1/1887* (2013.01); *H04W 80/06* (2013.01)

(58) Field of Classification Search
CPC ... H04L 69/22; H04L 12/1868; H04L 1/1642; H04L 1/1809; H04L 43/08; H04W 4/38
USPC ................................................. 709/230, 236
See application file for complete search history.

(56) References Cited

U.S. PATENT DOCUMENTS

| | | | | |
|---|---|---|---|---|
| 2004/0117801 A1* | 6/2004 | Eibach | .................... | G06F 9/546 719/314 |
| 2015/0326540 A1* | 11/2015 | Hamburg | .......... | H04W 12/0431 713/168 |
| 2016/0219089 A1* | 7/2016 | Murthy | ............... | H04L 65/4076 |

* cited by examiner

*Primary Examiner* — Wing F Chan
*Assistant Examiner* — Andrew Woo
(74) *Attorney, Agent, or Firm* — Perspectives Law Group, Corp.

(57) ABSTRACT

A messaging protocol supporting the homogenization of telematics data across a variety of remote monitoring contexts is disclosed. For example, different remote monitoring contexts may include vehicle monitoring and pet monitoring. The messaging protocol includes client-side and server-side implementations.

20 Claims, 115 Drawing Sheets

| Field | Type | Notes |
|---|---|---|
| Total message length | UINT32 4-bytes | Total message length, including this field to the end of the full message |
| Protocol version | 2-bytes | MSB – Major version<br>LSB – Minor version<br>For example:<br>Version 1.0 = 0x0100<br>Version 2.56 = 0x0238<br>Current protocol version is: 1.0 |
| Header options | 1 byte | Fields in header (if exists or not; 0 = does not exist, 1 = exists)<br>Values (bitwise):<br>Bit 0 – Device ID<br>Bits 1-7 – Reserved (must be set to 0) |
| Device ID type | 1 byte | Kind of device ID being sent<br>Values:<br>0x00 – IMEI of the device<br>0x01 – Serial number of the device |
| Device ID length | 1 byte | How many bytes to follow to read device ID |
| Device ID | Variable length | Device ID (in ASCII)<br>Supports alphanumeric, hyphen, and underscore<br>(Not case-sensitive) |
| Encryption | 1 byte | Encryption mechanism(s) used to encrypt the payload (including payload headers)<br>Values:<br>0x00 – No encryption<br>0x01 – AES-256: CBC with PKCS7 (recommended)<br>0x02 – 0x0F – Reserved<br><br>NOTE:<br>This field is mainly provided for initial testing while developing the protocol and communicating with gateway servers. In the initial phase, devices will not be provisioned using methods described in the device provisioning section. Devices will communicate with gateway servers using UDP or TCP instead of DTLS over UDP or TLS over TCP.<br><br>While using UDP or TCP communication methods with test gateway servers, devices will be provisioned with 256-bit symmetric encryption. In such instances, value 0x01 will be used to denote data is encrypted at the application layer. |

FIG. 5A

| | | While using DTLS over UDP or TLS over TCP communication methods, devices will use a provisioning mechanism as defined in earlier sections. As TLS already takes care of encrypting data, the application layer MUST NOT explicitly use any encryption mechanism. In such instances, value 0x00 will be used to denote that data is not encrypted using the application layer. |
|---|---|---|
| Reserved | 1 byte | Reserved for future use (and must be set to zero)<br>Values:<br>0x00 - Reserved |
| Sequence number | 4 bytes<br>UINT32 | Sequence number of the message. Incremented by one for each new message. |
| Payload (including payload header) | Variable length | See Payload section |

FIG. 5B

```
{ "PROTO_VER": "proto_version",
  "DEV_ID_TYPE": "id_type",
  "DEV_ID": "device_id",
  "SEQ_NUM": "sequence_number",
  "PAYLOAD": "payload"
}
```

FIG. 6

| Field | Type | Notes |
|---|---|---|
| Payload length | 2 bytes UINT16 | Length of actual payload (excluding payload header) |
| Message type | 1 byte | Message type.<br><br>Values:<br>0x01 – Device-to-server message<br>0x02 – Server-to-device request message<br>0x03 – Server-to-device acknowledgment (for direct UDP/TCP connections)<br>0x04 – Device-to-server response<br>0x05 – Device-to-server request message<br>0x06 – Server-to-device response<br>0x07 – 0xFF – Reserved for future use. |
| Message sub-type | 1 byte | Message sub-type for each message type.<br><br>Values:<br><br>For message type – 0x01 – device-to-server message:<br>0x01 – Device-to-server event message<br>0x02 – Device-to-server report message<br>0x03 – 0xFF – Reserved for future use.<br><br>For message type – 0x02 – server-to-device request message:<br>0x01 – Server-to-device read configuration request<br>0x02 – Server-to-device write configuration request<br>0x03 – Server-to-device on-demand telemetry request<br>0x04 – Server-to-device command execution request<br>0x05 – 0xFF – Reserved for future use.<br><br>For message type – 0x03 – server-to-device acknowledgment:<br>0x00 - Reserved (must be zero)<br><br>For message type – 0x04 – device-to-server response message:<br>0x01 – Device-to-server read configuration response<br>0x02 – Device-to-server write configuration response<br>0x03 – Device-to-server on-demand telemetry response<br>0x04 – Device-to-server command execution response<br>0x05 – 0xFF – Reserved for future use.<br><br>For message type – 0x05 – device-to-server request message: |

FIG. 7A

|  |  | *0x00 - Reserved (must be zero)*<br><br>*For message type – 0x06 – server-to-device response message:*<br>*0x00 - Reserved (must be zero)* |
|---|---|---|
| *Serialization format* | *1 byte* | *How actual payload data has been serialized.*<br><br>*Values:*<br>*0x00 – JSON with UTF-8 encoding serialized as bytes (not implemented)*<br>*0x01 – Binary serialization using* <u>*Avro*</u> |
| *Compression* | *1 byte* | *How payload data has been compressed.*<br><br>*Values:*<br>*0x00 – Payload data is not compressed*<br>*0x01 – Payload data is compressed using* *deflate* *method (not implemented)*<br>*0x02 – 0xFF – Reserved for future use.* |
| *Reserved* | *1 byte* | *Reserved for future use.*<br><br>*Values:*<br>*0x00 - Reserved (must be zero)* |
| *Payload data* | *Variable length* | *Described in Payload Data section* |

FIG. 7B

| Field | Purpose | Avro Format | JSON Format |
|---|---|---|---|
| DEV_TIME | Device time when event was detected on device | See: Time measurement field | See: Time measurement field |
| EVENT_ID | Event ID associated with event occurred or detected by device. Event ID would be different for different kind of devices. | string | string |
| GPS_TELEMETRY | GPS location telemetry data. This data will be reported only if device has GPS tracking capabilities.<br><br>Recommendation: It is good practice to send GPS telemetry with every single device-to-server message if device supports GPS tracking capabilities. This allows Service servers to track position changes in finer details. | record | object |
| TELEMETRY | Time-based or instantaneous telemetry data collected by devices. This is a key-value bag (dictionary) field, so there is no limitation on amount of telemetry reported by device.<br><br>Telemetry could be different for different kind of devices.<br><br>Telemetry could contain device-specific telemetry data such as battery voltage, and/or it could contain event-specific telemetry. Event-specific telemetry is defined in corresponding event tables.<br><br>Note: Telemetry schema is designed to provide flexibility to report any amount of unique telemetry data in a message. It does not impose any restriction or requirement; however, based on device capabilities, it is recommended to report all telemetry data. | map<br>{<br>  "type":"map",<br>  "values":[<br>    "long",<br>    "double",<br>    "string",<br>    "bytes",<br>    "bool",<br>  ]<br>} | array of key-value pair |

FIG. 8

| Event ID | Purpose | Telemetry |
|---|---|---|
| DEV_RESERVED | Reserved | |
| DEV_WK_TIMER | Device has woken up due to periodic timer event. | |
| DEV_WK_DISTURBANCE | Device has woken up due to external disturbance event. | DISTURBANCE_FORCE |
| DEV_WK_EXT_BAT | Device has woken up due to external battery event. | |
| DEV_WK_EXT_BAT_VOLT_CHNG | Device has woken up due to external battery voltage changes event. | |
| DEV_WK_EXT_BAT_LOW_VOLT | Device has woken up due to low external battery voltage event. | EXT_BAT_VOLTAGE |
| DEV_WK_INT_BAT | Device has woken up due to internal battery event. | |
| DEV_WK_INT_BAT_LOW_VOLT | Device has woken up due to low internal battery voltage event. | INT_BAT_VOLTAGE |
| DEV_SLEEP | Device is about to go to sleep. Must be the final message sent before the device goes to sleep. | |
| DEV_SLEEP_EXT_BAT_LAST_GASP | Device is going to sleep (last gasp) due to low external battery voltage. | EXT_BAT_VOLTAGE |
| DEV_SLEEP_INT_BAT_LAST_GASP | Device is going to sleep (last gasp) due to low internal battery voltage | INT_BAT_VOLTAGE |
| DEV_EXT_BAT_LOW_VOLT | Low external battery voltage has been detected. (Low voltage threshold is specified in configuration parameters.) | EXT_BAT_VOLTAGE |
| DEV_INT_BAT_LOW_VOLT | Low internal battery voltage has been detected. (Low voltage threshold is specified in configuration parameters.) | INT_BAT_VOLTAGE |
| DEV_RESTART | Device has been restarted. | |
| DEV_RESTART_MANUAL | Device has been restarted manually. | |
| DEV_RESTART_SVR | Device has been restarted by server. | |

FIG. 9A

| | | |
|---|---|---|
| DEV_RESTRAT_FW_UPG | Device has been restarted due to firmware upgrade. | |
| DEV_RESTART_FW_UPG_MCU | Device has been restarted due to MCU firmware update | |
| DEV_RESTART_FW_UPG_MODEM | Device has been restarted due to modem firmware update | |
| DEV_GPS_FIX_LOST | Device cannot obtain GPS fix in X time. | GPS_LAST_FIX_TIME |
| DEV_GPS_ACQ | | |
| DEV_ACCL_ALIGN_CHANGED | Accelerometer alignment status has changed. | ACCL_ALIGN_STATUS |
| DEV_BAT_CHARGING | Device's internal battery is being charged (only applies to devices with ONLY internal battery) | |
| DEV_POWER_CONNECTED | Device has been connected to external power source. | |
| DEV_POWER_DISCONNECTED | Device has been disconnected from external power source. | |
| DEV_INT_BAT_LEVEL_CHANGED | Internal battery charge level has changed. This event is controlled through device configuration – as to how often to send this event message while device is being charged using external power source. (Only applies to devices with only internal battery). | INT_BAT_LEVEL |
| DEV_INT_BAT_CHARGED | Internal battery is fully charged. (Only applies to devices with only internal battery). | INT_BAT_LEVEL |
| DEV_ZONE_ENTER | Device has entered a zone. | DEV_ZONE_TYPE DEV_ZONE_NUMBER |
| DEV_ZONE_EXT | Device has exited a zone. | DEV_ZONE_TYPE DEV_ZONE_NUMBER |

FIG. 9B

| Field | Purpose | Avro Format | JSON Format |
|---|---|---|---|
| GPS_FIX_TIME | GPS location fix time. | See: Time measurement field | See: Time measurement field |
| GPS_FIX_STATUS | GPS fix position status.<br><br>*Values:*<br>*0x00 – Not fixed*<br>*0x01 – Fixed – Previously known location*<br>*0x02 – Fixed – Real-time* | Int | Number |
| GPS_LAT | Latitude reported by GPS.<br><br>Precision Point: 7 decimal point precision<br>Range: -90 to 90 | Double | Number |
| GPS_LON | Longitude reported by GPS.<br><br>Precision Point: 7 decimal point precision<br>Range: -180 to 180 | Double | Number |
| GPS_ALT | Altitude reported by GPS. | See: Distance measurement field | See: Distance measurement field |
| GPS_SPEED | Speed reported by GPS. | See: Speed measurement field | See: Speed measurement field |
| GPS_HEADING | Heading reported by GPS. | See: Degrees measurement field | See: Degrees measurement field |
| GPS_NUM_SAT | Number of satellites to obtain fix used by GPS. | Int | Number |
| GPS_HDOP | Horizontal dilution of precision reported by GPS. | Int | Number |
| GPS_VDOP | Vertical dilution of precision reported by GPS. | Int | Number |

FIG. 10A

| | | | |
|---|---|---|---|
| GPS_PDOP | Position dilution of precision reported by GPS. | Int | Number |
| GPS_HACC | Horizontal accuracy reported by GPS. | Double | Number |
| GPS_VACC | Vertical accuracy reported by GPS. | Double | Number |
| GPS_LOST_LOCK_TIME | | See: Time measurement field | See: Time measurement field |
| GPS_LOST_LOCK_DURATION | | See: Time measurement field | See: Time measurement field |

FIG. 10B

| Field | Short name | Purpose | Avro Format | JSON Format |
|---|---|---|---|---|
| DEV_INT_BAT_VOLTAGE | DTIV | Voltage of internal battery. Recommended to be sent with all device-to-server messages.<br><br>*Note*: Internal battery is a small battery that is inside the device that the device will use for operations when not connected to an external power supply. | See: Voltage measurement field | See: Voltage measurement field |
| DEV_INT_BAT_LEVEL | DTIL | Remaining charge for device's internal battery. | See: Percentage measurement field | See: Percentage measurement field |
| DEV_EXT_BAT_VOLTAGE | DTEV | Voltage of external battery. Recommended to be sent with all device-to-server messages.<br><br>*Note*: External battery is an external power supply | See: Voltage measurement field | See: Voltage measurement field |

FIG. 11A

| | | or a battery providing power supply to device such as in vehicles. | | |
|---|---|---|---|---|
| DEV_ACCL_ALIGN_STATUS | DTAS | Accelerometer alignment status.<br><br>Values:<br>0x00 – Not aligned<br>0x01 – Aligned | Int | Number |
| DEV_ACCL_X_FORCE | DTAX | G-force in forward direction as reported by accelerometer. | See: G-force measurement field | See: G-force measurement field |
| DEV_ACCL_Y_FORCE | DTAY | G-force in lateral direction as reported by accelerometer. | See: G-force field | See: G-force field |
| DEV_ACCL_Z_FORCE | DTAZ | G-force in vertical direction as reported by accelerometer. | See: G-force field | See: G-force field |
| DEV_ACCL_MAGNITUDE | DTAM | Total G-force encountered as reported by accelerometer. | See: G-force field | See: G-force field |
| DEV_ACCELERATION | DTA | Acceleration encountered by device. | See: Acceleration field | See: Acceleration field |
| DEV_NW_CARRIER | DTC | Network carrier name Maximum: 30 characters. | string | string |
| DEV_NW_CONN_ROAMING | DTR | Network's roaming status<br><br>Values:<br>True – Device is roaming.<br>False – Device is NOT roaming. | bool | bool |
| DEV_NW_CONN_TYPE | DTCT | Network connectivity type. Recommended to be sent with all device-to-server messages.<br><br>Values:<br>0x00 – 2G | Int | Number |

FIG. 11B

|  |  | 0x01 – 3G<br>0x02 – 4G<br>0x03 – 5G |  |  |
|---|---|---|---|---|
| *DEV_NW_CELL_SIG_STR* | *DTSS* | *Cellular signal strength.* Recommended to be sent with all device-to-server messages. | *See: RSSI field* | *See: RSSI field* |
| *DEV_GPS_LAST_FIX_TIME* | *DTFT* | *Last valid location fix of GPS receiver.* | *See: Time measurement field* | *See: Time measurement field* |
| *DEV_TEMPERATURE* | *DTT* | *Temperature reading from temperature sensor.* | *See: Temperature measurement field* | *See: Temperature measurement field* |
| *DEV_HUMIDITY* | *DTH* | *Relative humidity reading from humidity sensor.* | *See: Percentage measurement field* | *See: Percentage measurement field* |
| *DEV_MOISTURE* | *DTM* | *Relative moisture in a given substance from moisture sensor.* | *See: Percentage measurement field* | *See: Percentage measurement field* |
| *DEV_AMB_LIGHT_LEVEL* | *DTAL* | *Illuminance reading from lux sensor.* | *See: Illuminance measurement field* | *See: Illuminance measurement field* |
| *DEV_POWER_SOURCE* | *DTPS* | *Power source for the device.*<br><br>Values:<br>0x00 – *Internal battery (DC)*<br>0x01 – *External battery (DC)*<br>0x02 – *External power supply (AC)* | *Int* | *Number* |
| *DEV_ORIENTATION_AZ* | *DTOA* | *Denotes orientation azimuth* | *Double* | *Number* |
| *DEV_ORIENTATION_PITCH* | *DTOP* | *Denotes orientation pitch* | *Double* | *Number* |
| *DEV_ORIENTATION_ROLL* | *DTOR* | *Denotes orientation roll.* | *Double* | *Number* |

FIG. 11C

| DEV_ZONE_TYPE | DTZT | Denotes various zone type defined.<br><br>Values:<br>0x00 – Geo-zone (defined by geo-location)<br>0x01 – BLE proximity zone (defined by BLE zone and IDs)<br>0x02 – Wi-Fi proximity zone (defined by Wi-Fi zone and IDs) | Int | Number |
|---|---|---|---|---|
| DEV_BLE_ZONE_NUMBER | DTZN | Denotes zone number as defined through configuration parameters.<br><br>Device can allow multiple zone (meaning multiple geo-zones, BLE and Wi-Fi proximity zones) | Int | Number |

FIG. 11D

| Field | Purpose | Avro Format | JSON Format |
|---|---|---|---|
| ID_RPT | Start of ID report. Please see field definitions for more details. | record | object |

FIG. 12

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. Optional. | record | object |
| TELEMETRY | Telemetry collected by device. Optional. | map | key-value array |
| HW_VER | Hardware version of the device.<br><br>Format: Major.Minor.Revision<br>Example: "1.2.56" | string | string |
| MCU_FW_VER | MCU firmware version. | string | string |
| MODEM_FW_VER | Radio/modem firmware version. | string | string |
| SER_NUM | Serial number of the device. | string | string |
| IMEI | IMEI (electronic serial number of modem) of the device. | string | string |
| IMSI | Subscriber ID of the SIM used in the GSM/GPRS modem. | string | string |
| MSISDN | Mobile Station International Subscriber Directory Number (phone number) assigned to the SIM. | string | string |
| ICCID | Serial number of the SIM used in the GSM/GPRS modem. | string | string |
| WIFI_MAC | Wi-Fi MAC address if device Wi-Fi enabled. | string | string |
| BT_MAC | Bluetooth MAC address if device Bluetooth enabled. | string | string |

FIG. 13

| Field | Purpose | Avro Format | JSON Format |
|---|---|---|---|
| NW_CONN_RPT | Start of network connectivity report. Please see field definitions for more details. | record | object |

FIG. 14

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. Optional. | record | object |
| TELEMETRY | Any telemetry device wants to report. Optional. | map | array of key-value pair |
| NW_CARRIER | Network carrier name. | string | string |
| NW_CONN_ROAMING | Network's roaming status<br><br>*Values:*<br>*True* – Device is roaming.<br>*False* – Device is NOT roaming. | bool | bool |
| NW_CONN_TYPE | Network connectivity type.<br>Recommended to be sent with all device-to-server messages.<br><br>*Values:*<br>*0x00* – 2G<br>*0x01* – 3G<br>*0x02* – 4G<br>*0x03* – 5G | Int | Number |
| NW_CELL_RECORDS | Cell records (maximum of 8) for all cell towers. First entry in array denotes master cell tower details and rest of the entries denotes neighboring cell tower details. | array of record | array of object |
| NW_BLE_PROX_RECORDS | Denotes BLE proximity records. | array of record | array of object |
| NW_WIFI_PROX_RECORDS | Denotes Wi-Fi proximity records. | array of record | array of object |

FIG. 15

| Field | Purpose | Avro Format | JSON Format |
|---|---|---|---|
| NW_CELL_MCC | Mobile country code of the cell tower. | int | number |
| NW_CELL_MNC | Mobile network code of the cell tower. | int | number |
| NW_CELL_ID | Cell ID of the cell tower. | string | string |
| NW_CELL_BAND | Band of the cell tower. | string | string |
| NW_CELL_LAC | Location area code of the cell tower. | int | number |
| NW_CELL_ASU | Arbitrary signal unit of cell tower if available. | int | number |
| NW_CELL_SIG_STR | Signal strength of cell tower. | int | number |
| NW_CELL_SIG_QTY | Signal quality of cell tower. | string | string |

FIG. 16

| Field | Purpose | Avro Format | JSON Format |
|---|---|---|---|
| BLE_ID | Unique BLE ID | String | String |
| MAC | MAC address of BLE device | String | String |
| BLE_SIG_STR | Denotes signal strength of BLW sensor as seen by device. | See: Signal strength measurement field | See: Signal strength measurement field |

FIG. 17

| Field | Purpose | Avro Format | JSON Format |
|---|---|---|---|
| WIFI_SSID | Denotes SSID of the Wi-Fi access point. | String | String |
| MAC | Denotes MAC address of the Wi-Fi access point. | String | String |
| SIG_STR | Denotes signal strength of the Wi-Fi access point as seen by device. | See: Signal strength measurement field | See: Signal strength measurement field |

FIG. 18

| Field | Purpose | Avro Format | JSON Format |
|---|---|---|---|
| MSG_STAT_RPT | Start of message statistics report. Please see field definitions for more details. | record | object |

FIG. 19

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. Optional. | record | object |
| TELEMETRY | Telemetry collected by device. Optional. | map | array of key-value pair |
| NUM_EVT_MSG | Number of event messages sent. | int | number |
| NUM_RPTS | Number of various types of reports sent. | Map { "type":"map", "values":[ "long" ] } | array of key-value pair |
| NUM_READ_REQ | Number of configuration/read requests received from server. | int | number |
| NUM_WRITE_REQ | Number of configuration/write requests received from server. | int | number |
| NUM_ONDEMAND_REQ | Number of on-demand telemetry/report requests received from server. | int | number |
| NUM_CMD_REQ | Number of command execution requests received from server. | int | number |
| NUM_ACK_RECV | Number of acknowledgment receipts received from server. | int | number |
| LAST_MSG_RECV_TIME | Timestamp of last message received from server. | See: Time measurement field | See: Time measurement field |
| LAST_ACK_RECV_TIME | Timestamp of last ACK message received from server. | See: Time measurement field | See: Time measurement field |

FIG. 20A

| | | | |
|---|---|---|---|
| NUM_BYTES_RECV | Number of bytes received. | See: Data measurement field | See: Data measurement field |
| NUM_BYTES_SENT | Number of bytes sent. | See: Data measurement field | See: Data measurement field |

FIG. 20B

| Field | Purpose | Avro Format | JSON Format |
|---|---|---|---|
| ERROR_RPT | Start of error report. Please see field definitions for more details. | record | object |

FIG. 21

| Field | Purpose | Avro Format | JSON Format |
|---|---|---|---|
| DEV_TIME | Device time when report was generated | See: Time measurement field | See: Time measurement field |
| GPS_TELEMETRY | GPS location data. Optional. | record | object |
| TELEMETRY | Telemetry collected by device. Optional. | map | array of key-value pair |
| ERROR_DATA | List of errors encountered. | array of record | array of object |

FIG. 22

| Field | Purpose | Avro Format | JSON Format |
|---|---|---|---|
| ERROR | Error encountered by device | string | string |
| ERROR_TIMESTAMP | Timestamp when error was encountered | See: Time measurement field | See: Time measurement field |
| ERROR_SEV | Severity of error. | Int | Number |

FIG. 23A

|  | Values:<br>0x00 – Warning<br>0x01 – Critical<br>0x02 – Fatal |  |  |

FIG. 23B

| Field | Purpose | Avro Format | JSON Format |
|---|---|---|---|
| WIFI_STAT_RPT | Start of Wi-Fi statistics report. Please see field definitions for more details. | record | object |

FIG. 24

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Optional) | record | object |
| TELEMETRY | Telemetry collected by device. (Optional) | map | array of key-value pair |
| SSID | SSID of the Wi-Fi. | string | string |
| MAC | Wi-Fi MAC address. | string | string |
| STATUS | Wi-Fi hotspot status.<br><br>Values:<br>True – Wi-Fi hotspot is enabled.<br>False – Wi-Fi hotspot is disabled. | bool | bool |
| ROAMING_STATUS | Wi-Fi roaming status.<br><br>Values:<br>True – Wi-Fi roaming is enabled. | bool | bool |

FIG. 25A

|  | *False* – Wi-Fi roaming is disabled. |  |  |
|---|---|---|---|
| PUBLIC_IP | *Public IP address of Wi-Fi hotspot.* | *string* | *string* |
| NUM_CLIENTS | *Number of clients connected to Wi-Fi hotspot.* | *int* | *number* |
| DATA_RECV | *Total number of bytes received since last report.* | *See: Data measurement field* | *See: Data measurement field* |
| DATA_SENT | *Total number of bytes sent since last report.* | *See: Data measurement field* | *See: Data measurement field* |
| AVG_RECV_SPEED | *Average receiving speed since last report.* | *See: Data speed measurement field* | *See: Data speed measurement field* |
| AVG_SEND_SPEED | *Average sending speed since last report.* | *See: Data speed measurement field* | *See: Data speed measurement field* |
| CUR_RECV_SPEED | *Current receiving speed.* | *See: Data speed measurement field* | *See: Data speed measurement field* |
| CUR_SEND_SPEED | *Current sending speed.* | *See: Data speed measurement field* | *See: Data speed measurement field* |
| TOTAL_DATA_RECV | *Data received since billing period started.* | *See: Data measurement field* | *See: Data measurement field* |
| TOTAL_DATA_SENT | *Data sent since billing period started.* | *See: Data measurement field* | *See: Data measurement field* |

FIG. 25B

| Field | Purpose | Avro Format | JSON Format |
|---|---|---|---|
| BT_STAT_RPT | *Start of Bluetooth statistics report. Please see field definitions for more details.* | *record* | *object* |

FIG. 26

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Optional) | record | object |
| TELEMETRY | Telemetry collected by device. (Optional) | map | array of key-value pair |
| BT_NAME | Bluetooth name. | string | string |
| BT_STATUS | Bluetooth status.<br><br>Values:<br>True – Bluetooth is enabled.<br>False – Bluetooth is disabled. | bool | bool |
| BLE_MODE_SUPPORT | Denotes various BLE modes supported.<br><br>Values: (bitwise):<br>0 = Not supported, 1 = Supported<br><br>Bit 0 – Scanning mode<br>Bit 1 – Advertising mode<br>Bit 2 – Connection mode<br>Bits 3-7 – Reserved | Byte (Bitwise) | Number (bitwise) |
| BLE_MODE_ENABLED | Denotes various BLE modes enabled.<br><br>Values: (bitwise):<br>0 = Disabled, 1 = Enabled<br><br>Bit 0 – Scanning mode<br>Bit 1 – Advertising mode<br>Bit 2 – Connection mode<br>Bit3-7 – Reserved (and must be set to zero) | Byte (Bitwise) | Number (bitwise) |
| BLE_PROFILE_SUPPORTED | Denotes various BLE GATT based profiles supported.<br><br>Values: Various BLE profiles. Example: FMP, PXP | List of string | List of string |
| BLE_SERVICES_SUPPORTED | Denotes various services supported by BLE device.<br><br>Values: Various GATT services supported. Example: | List of int | List of number |

FIG. 27A

|   | 0x1800 – Generic access<br>0x1801 – Alert notification service |   |   |
|---|---|---|---|

FIG. 27B

| Field | Purpose | Avro Format | JSON Format |
|---|---|---|---|
| SMS_RPT | Start of SMS report. Please see field definitions for more details. | record | object |

FIG. 28

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. Optional. | record | object |
| TELEMETRY | Telemetry collected by device. Optional. | map | array of key-value pair |
| RECV_TIME | SMS receipt time. | See: Time measurement field | See: Time measurement field |
| RESULT_CODE | Code while receiving SMS message on device.<br><br>Values:<br>0x01 – Success<br>0x02 – Internal error<br>0x03 – Malformed message | int | number |
| CALLER_ID | Sender's phone number. | string | string |
| ENCODING | Encoding of SMS message.<br><br>Values:<br>0x00 – GSM 7-bit<br>0x01 – UCS2<br>0x03 – ASCII<br>0x04 – UTF-8 | int | number |
| DATA | Encoded SMS message data, in form of BASE64 string. | string | string |

FIG. 29

| Field | Purpose | Avro Format | JSON Format |
|---|---|---|---|
| GPS_STATUS_RPT | Start of GPS status report. Please see field definitions for more details. | record | object |

FIG. 30

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Required) | record | object |
| TELEMETRY | Telemetry collected by device. (Optional) | map | array of key-value pair |
| STATUS | GPS receiver status.<br><br>Values:<br>True – GPS receiver is enabled.<br>False – GPS receiver is disabled. | Bool | Bool |
| SATTELITE_DATA | Satellite data. Maximum 16 records. | Array of record | Array of object |

FIG. 31

| Field | Purpose | Avro Format | JSON Format |
|---|---|---|---|
| PRN | Identification number of satellite.<br>Range: 1-32 | Int | Number |
| STATUS | Whether the satellite is being used in location fix. | Bool | Bool |
| SNR | Satellite signal strength.<br><br>Unit: dbHz<br>Range: 0 – 99 | Double | Number |
| AZIMUTH | Azimuth of satellite from true north.<br>Range: 0 – 359 | See: Degree measurement field | See: Degree measurement field |

FIG. 32

| Field | Purpose | Avro Format | JSON Format |
|---|---|---|---|
| DEV_CAP_RPT | Start of device capability report. Please see field definitions for more details. | record | object |

FIG. 33

| Field | Purpose | Avro Format | JSON Format |
|---|---|---|---|
| DEV_TIME | Device time when report was generated | See: Time measurement field | See: Time measurement field |
| GPS_TELEMETRY | GPS location data. Required. | record | object |
| TELEMETRY | Telemetry collected by device. Optional. | map | array of key-value pair |
| CAPABILITIES | List is not limited to device capabilities but also what device can do or can read or can write while attached to an entity (e.g. ,vehicle). | Map<br>{<br>  "type":"map",<br>  "values":[<br>    "bool"<br>  ]<br>} | Array of key-value pair<br><br>Value: bool |

FIG. 34

| Field | Purpose | Avro Format | JSON Format |
|---|---|---|---|
| ACCL_DATA_RPT | Start of accelerometer data report. Please see field definitions for more details. | record | object |

FIG. 35

| Field | Purpose | Avro Format | JSON Format |
|---|---|---|---|
| DEV_TIME | Device time when report was generated | See: Time measurement field | See: Time measurement field |
| REASON | Reason as to why accelerometer data report is being sent<br><br>Values:<br>0x00 – Streaming data<br>0x01 – Requested by server<br>0x02 – Device-type specific | int | number |
| DEV_SUB_REASON | Device-type-specific reason as to why accelerometer data report is being sent<br><br>Examples: None, harsh acceleration, harsh deceleration, jumping, walking | int | number |
| FREQ | Frequency at which accelerometer data has been captured<br><br>Range: 1 – 4000 | See: Frequency measurement field | See: Frequency measurement field |
| SAMPLE_INT | Time interval in microseconds between ACCL_DATA_RECORDS | int | number |
| ACCL_DATA_RECORDS | List of accelerometer data records | array of record | array of object |

FIG. 36

| Field | Purpose | Avro Format | JSON Format |
|---|---|---|---|
| ACCL_EVENT_TIME | Accelerometer event timestamp | See: Time measurement field | See: Time measurement field |
| ACCL_COLL_TIME | Accelerometer data collection timestamp | See: Time measurement field | See: Time measurement field |
| FORWARD_ACCL | Forward acceleration data | See: Acceleration measurement field | See: Acceleration measurement field |
| LATERAL_ACCL | Lateral acceleration data | See: Acceleration measurement field | See: Acceleration measurement field |
| VERTICAL_ACCL | Vertical acceleration data | See: Acceleration measurement field | See: Acceleration measurement field |
| GPS_TELEMETRY | GPS location data. Required. | record | object |
| TELEMETRY | Telemetry collected by device. Optional. | map | array of key-value pair |

FIG. 37

| Field | Purpose | Avro Format | JSON Format |
|---|---|---|---|
| ID | Unique ID for the read request. Device MUST include this ID while replying to Service servers with read response message. | Fixed size: 16 Name: GUID | String Valid string representing valid GUID |
| PARAMS | List of configuration parameters to be read. | array | array |

FIG. 38

| Field | Purpose | Avro Format | JSON Format |
|---|---|---|---|
| ID | Unique ID for the write request. Device MUST include this ID while replying to Service servers with write response message. | Fixed size: 16<br>Name: GUID | String<br>Valid string representing valid GUID |
| PARAMS | Map of configuration parameters to be written with their values.<br><br>Each parameter supports flexible schema to define more than one value. | map<br>{<br>  "type":"map",<br>  "values":[<br>    "[string]"<br>  ]<br>} | Array of key-value pair.<br><br>Each value is a valid array of string, defining multiple values for parameter being written. |

FIG. 39

| Field | Short name | Purpose | Avro Format | JSON Format |
|---|---|---|---|---|
| DEV_MSG_SERVER_ADDR | DCMS | IP Address / FQDN and port of Service servers.<br><br>Format:<br>XX.XX.XX.XX:YYYY – IP-Address:Port<br>myserver.com:YYYY – FQDN:Port | String | String |
| DEV_FOTA_SERVER_ADDR | DCFS | IP Address / FQDN and port of Service FOTA (Firmware Over the Air) upgrade servers.<br><br>Format:<br>XX.XX.XX.XX:YYYY – IP-Address:Port<br>myserver.com:YYYY – FQDN:Port | String | String |

FIG. 40A

| DEV_FOTA_CHECK _POLICY | DCFP | Defines when device will check for firmware upgrade.<br><br>Values: (bitwise)<br>Bit 0 – When device wakes up from sleep/powers up<br>Bit 1 – When device is about to go to sleep<br>Bit 2 – At regular intervals<br>Bits 3-7 – Reserved (must be set to zero) | *Int (unsigned byte)* | *Number (unsigned byte)* |
|---|---|---|---|---|
| DEV_FOTA_CHECK _INT | DCFI | Interval value (if bit-2 is set in DEV_FOTA_CHECK_POLICY parameter) for FOTA check.<br><br>Range:<br>0 – 604,800 seconds (maximum 7 days) | *See: Time measurement field* | *See: Time measurement field* |
| DEV_TELEMETRY_ APN | DCTA | Telemetry APN (access point name). This configuration is used to define separate APN than Wi-Fi APN to transmit and receive ONLY telemetry (events, reports, server-to-device and device-to-server requests) data.<br><br>Format: Valid FQDN | *String* | *String* |
| DEV_TELEMETRY_ APN_USR | DCTU | Username for connecting to telemetry APN.<br><br>Format: NULL or 1-64 characters | *String* | *String* |
| DEV_TELEMETRY_ APN_PWD | DCTP | Password for connecting to telemetry APN.<br><br>Format: NULL or 1-64 characters | *String* | *String* |
| DEV_WIFI_APN | DCWA | Wi-Fi APN (access point name). This configuration is used to define Wi-Fi APN | *String* | *String* |

FIG. 40B

| | | separately from telemetry APN to only transmit and receive non-telemetry data. Format: valid FQDN | | |
|---|---|---|---|---|
| DEV_WIFI_APN_USR | DCWU | Username for connecting to Wi-Fi APN. Format: NULL or 1-64 characters | String | String |
| DEV_WIFI_APN_PWD | DCWP | Password for connecting to Wi-Fi APN. Format: NULL or 1-64 characters | String | String |
| DEV_WIFI_SECURITY | DCWS | Various encryption types to for Wi-Fi access point. Values: 0x00 – Disabled (Open) 0x01 – WEP – 64Bit Key 0x02 – WEP – 128Bit Key 0x03 – WPA-PSK with TKIP 0x04 – WPA-PSK with AES 0x05 – WPA2-PSK with TKIP 0x06 – WPA2-PSK with AES 0x07 – WPA/WPA2-PSK with TKIP/AES | Int | Number |
| DEV_WIFI_SSID | DCSS | Wi-Fi access point SSID Max length: 16 characters | String | String |
| DEV_WIFI_SSID_BROADCAST | DCWB | Wi-Fi SSID broadcasting type. Values: 0x00 – Broadcast (default) 0x01 – Hidden | Int | Number |
| DEV_WIFI_BSSID | DCWM | BSSID (MAC address) for Wi-Fi access point Format: | String | String |

FIG. 40C

| | | XX:XX:XX:XX:XX:XX – Valid MAC address | | |
|---|---|---|---|---|
| DEV_WIFI_KEY | DCWK | Encryption key (For WEP) and pre-shared-key (PSK) for WPA and WPA2.<br><br>Format:<br>WEP encryption key:<br>Valid 64-bit (8 bytes) 128-bit (16 bytes) hexadecimal as per selected WEP scheme<br>WPA/WPA2 pre-shared-key:<br>8 – 64 characters | String | String |
| DEV_WIFI_MAX_CLIENTS | DCWC | Maximum number of clients that can connect to Wi-Fi access point.<br><br>Range: 0 – 32 | Int | Number |
| DEV_WIFI_IP_MODE | DCWT | How the IP address would be assigned to clients.<br><br>Values:<br>0x00 – Static<br>0x01 – Using DHCP | Int | Number |
| DEV_WIFI_IP | DCWI | IP address of Wi-Fi access point.<br><br>Format: Valid IP address | String | String |
| DEV_WIFI_SUBNET | DCWN | Subnet of Wi-Fi access point.<br><br>Format: Valid subnet mask | String | String |
| DEV_WIFI_DNS | DCWD | DNS server of Wi-Fi access point. | String | String |
| DEV_WIFI_USERNAME | DCSU | Username for the Wi-Fi to connect to service provider. | String | String |
| DEV_WIFI_PASSWORD | DCSQ | Password for Wi-Fi to connect to service provider. | String | String |
| DEV_BT_NAME | DCBN | Name for the Bluetooth adapter on device. | String | String |

FIG. 40D

| | | | | |
|---|---|---|---|---|
| DEV_BT_PIN | DCBQ | PIN for Bluetooth – other devices MUST use this PIN to connect to Bluetooth on device. | String | String |
| DEV_BT_MODE | DCBM | Various Bluetooth connectivity modes.<br><br>Values:<br>*0x00* – Disabled<br>*0x01* – Scanning mode (no whitelisting)<br>*0x02* – Scanning mode (with whitelisting)<br>*0x03* – Bluetooth client mode (to receive data) | Int | Number |
| DEV_BT_WHITELIST | DCBW | List of remote Bluetooth MAC addresses to be considered as whitelisted devices.<br><br>Format: Each value in list must a be a valid MAC address. | Array of string | Array of string |
| DEV_BT_ZONE_ADDR | DCBZ | List of remote (peer) Bluetooth ID (MAC) as a part of zone (safe zone/home zone).<br><br>Format: Each value in list must a be a valid MAC address. | Array of string | Array of string |
| DEV_BT_BR_DATA | DCBD | BLE advertising data.<br><br>Value:<br>Valid hexadecimal string | String | String |
| DEV_WIFI_ZONE_SSIDS | DCWZ | Comma separated list of SSIDs to define Wi-Fi proximity zone. | String | String |
| DEV_PROX_SCAN_INT | DCPI | Proximity sensor data scanning interval. | See: Duration measurement field | See: Duration measurement field |
| DEV_GPS_LOST_TIMEOUT | DCGT | Time device will wait before declaring the GPS fix status | See: Time measurement | See: Time measurement |

FIG. 40E

| | | to be lost. | field | field |
|---|---|---|---|---|
| DEV_GPS_LK_TIMEOUT | DCGL | Time device will wait before declaring the GPS fix status to be last known. | See: Time measurement field | See: Time measurement field |
| DEV_ACK_WINDOW_SIZE | DCAW | Maximum number of messages that can be sent to Service servers from device without waiting for an acknowledgment to be sent back by the server. (Only applies to direct UDP/TCP connections).<br><br>Range: 0 – 60<br>Default: 10 | Int | Number |
| DEV_ACK_TIMEOUT | DCAT | Maximum amount of time device can wait for receiving an acknowledgment back from Service servers. (Only applies to direct UDP/TCP connections).<br><br>Range: - 1 – 120 (in seconds)<br>Default: 60 | Int | Number |
| DEV_RETRY_INT | DCRI | Message delivery retry mechanism interval if device is unable to send or publish message successfully.<br><br>Range: 1 – 300 (seconds)<br>Default: 15 | See: Time measurement field | See: Time measurement field |
| DEV_WK_POLICY | DCKP | Policy that sets how device will wake up.<br><br>Values: (bitwise)<br>Bit 0 – Wake up on disturbance<br>Bit 1 – Wake up on low internal battery voltage<br>Bit 2 – Wake up on low external battery voltage | Int (unsigned short) | Number (unsigned short) |

FIG. 40F

|  |  | Bit 3 – Wake up on external battery voltage changes<br>Bit 4 – Wake up on external power connect<br>Bit 5 – Wake up on external power disconnect<br>Bit 6 – Wake up on CAN (embedded)<br>Bits 7-15 – Reserved |  |  |
|---|---|---|---|---|
| DEV_SMS_WHITELIST | DCSW | Comma separated list of number from which device can receive SMS and can forward them to Service servers. | String | String |
| DEV_HEARTBEAT_TIMER_INT | DCHI | Time (interval) device should wait in sleep-mode before waking up due to periodic timer expires. (This is same as heartbeat interval.) | See: Time measurement field | See: Time measurement field |
| DEV_LOW_INT_BAT_THR | DCIL | Threshold for internal battery voltage to be declared as low voltage. Same threshold will be used for device wake up on low internal battery event as well. | See: Voltage measurement field | See: Voltage measurement field |
| DEV_LOW_EXT_BAT_THR | DCEL | Threshold for external battery voltage to be declared as low voltage. Same threshold will be used for device wake up on low external battery event as well. | See: Voltage measurement field | See: Voltage measurement field |
| DEV_INT_BAT_LG_TIMEOUT | DCIT | Time device should wait after detecting low internal battery voltage and before going to deep sleep. | See: Time measurement field | See: Time measurement field |
| DEV_EXT_BAT_LG_TIMEOUT | DCET | Time device should wait after detecting low external battery voltage and before going to deep sleep. | See: Time measurement field | See: Time measurement field |
| DEV_WK_DISTURB | DCDT | G-force threshold for device | See: G-force | See: G-force |

FIG. 40G

| | | | | |
|---|---|---|---|---|
| ANCE_THR | | to wake up from sleep due to any disturbance. | measurement field | measurement field |
| DEV_ID_RPT_POLICY | DCIP | When device will send ID report to server.<br><br>Values: (Bitwise)<br>Bit 0 – When device wakes up from sleep/powers up<br>Bit 1 – When device is about to go to sleep<br>Bit 2 – At regular Intervals<br>Bits 3-7 – Reserved (and must be set to zero) | Int (unsigned byte) | Number (unsigned byte) |
| DEV_ID_RPT_INT | DCII | Interval value (if bit-2 is set in DEV_ID_RPT_POLICY parameter) for sending ID report.<br><br>Range:<br>0 – 604,800 (seconds – maximum 7 days) | See: Time measurement field | See: Time measurement field |
| DEV_NW_CONN_RPT_POLICY | DCNP | When device will send network connectivity report to server.<br><br>Values: (Bitwise)<br>Bit 0 – When device wakes up from sleep/powers up<br>Bit 1 – When device is about to go to sleep<br>Bit 2 – At regular intervals<br>Bit 3-7 – Reserved | Int (unsigned byte) | Number (unsigned byte) |
| DEV_NW_CONN_RPT_INT | DCNI | Interval value (if bit-2 is set in DEV_NW_CONN_RPT_POLICY parameter) for sending network connectivity report.<br><br>Range: 0 – 604,800 seconds (maximum 7 days) | See: Time measurement field | See: Time measurement field |
| DEV_MSG_STAT_RPT_POLICY | DCMP | When device will send message statistics report to server. | Int (unsigned byte) | Number (unsigned byte) |

FIG. 40H

| | | Values: (Bitwise)<br>Bit 0 – When device wakes up from sleep/powers up<br>Bit 1 – When device is about to go to sleep<br>Bit 2 – At regular intervals<br>Bit 3-7 – Reserved | | |
|---|---|---|---|---|
| DEV_MSG_STAT_RPT_INT | DCMI | Interval value (if bit-2 is set in DEV_MSG_STAT_RPT_POLICY parameter) for sending message statistics report.<br><br>Range: 0 – 604,800 seconds (maximum 7 days) | See: Time measurement field | See: Time measurement field |
| DEV_ERROR_RPT_POLICY | DCEP | When device will send error report to server.<br><br>Values: (Bitwise)<br>Bit 0 – When device wakes up from sleep/powers up<br>Bit 1 – When device is about to go to sleep<br>Bit 2 – At regular intervals<br>Bit 3-7 – Reserved | Int (unsigned byte) | Number (unsigned byte) |
| DEV_ERROR_RPT_INT | DCEI | Interval value (if bit-2 is set in DEV_ERROR_RPT_POLICY parameter) for sending error report.<br><br>Range: 0 – 604,800 seconds (maximum 7 days) | See: Time measurement field | See: Time measurement field |
| DEV_WIFI_STAT_RPT_POLICY | DCSP | When device will send Wi-Fi hotspot statistics report to server.<br><br>Values: (Bitwise)<br>Bit 0 – When device wakes up from sleep/powers up<br>Bit 1 – When device is about to go to sleep | Int (unsigned byte) | Number (unsigned byte) |

FIG. 40I

|  |  | Bit 2 – At regular intervals<br>Bit 3-7 – Reserved |  |  |
|---|---|---|---|---|
| DEV_WIFI_STAT_RPT_INT | DCSI | Interval value (if bit-2 is set in DEV_WIFI_STAT_RPT_POLICY parameter) for sending Wi-Fi hotspot statistics report.<br><br>Range: 0 – 604,800 seconds (maximum 7 days) | See: Time measurement field | See: Time measurement field |
| DEV_BT_STAT_RPT_POLICY | DCBP | When device will send Bluetooth report to server.<br><br>Values: (Bitwise)<br>Bit 0 – When device wakes up from sleep/powers up<br>Bit 1 – When device is about to go to sleep<br>Bit 2 – At regular intervals<br>Bit 3-7 – Reserved | Int (unsigned byte) | Number (unsigned byte) |
| DEV_BT_STAT_RPT_INT | DCBI | Interval value (if bit-2 is set in DEV_BT_STAT_RPT_POLICY parameter) for sending Bluetooth statistics report.<br><br>Range 0 – 604,800 seconds (maximum 7 days) | See: Time measurement field | See: Time measurement field |
| DEV_GPS_STAT_RPT_POLICY | DCGP | When device will send GPS status report to server.<br><br>Values: (Bitwise)<br>Bit 0 – When device wakes up from sleep/powers up<br>Bit 1 – When device is about to go to sleep<br>Bit 2 – At regular intervals<br>Bit 3 – When GPS fix status changes<br>Bit 4-7 – Reserved | Int (unsigned byte) | Number (unsigned byte) |
| DEV_GPS_STAT_RPT_INT | DCGI | Interval value (if bit-2 is set in DEV_GPS_STAT_RPT_PO | See: Time measurement field | See: Time measurement field |

FIG. 40J

| | | LICY parameter) for sending GPS status report.  Range: 0 – 604,800 seconds (maximum 7 days) | | |
|---|---|---|---|---|
| DEV_CAP_RPT_PO LICY | DCCP | When device will send device capabilities report to server.  Values: (Bitwise) Bit 0 – When device wakes up from sleep/powers up Bit 1 – When device is about to go to sleep Bit 2 – At regular intervals Bits 4-7 – Reserved | Int (unsigned byte) | Number (unsigned byte) |
| DEV_CAP_RPT_INT | DCCI | Interval value (if bit-2 is set in DEV_CAP_RPT_POLICY parameter) for sending device capabilities report.  Range: 0 – 604,800 seconds (maximum 7 days) | See: Time measurement field | See: Time measurement field |
| DEV_ACCL_DATA_ COL_POLICY | DCAP | Accelerometer data collection policy and sending policy.  Values: (Bitwise) Bit 0 – Harsh event data (0 = disable, 1 = enable) Bit 1 – Streaming data (0 = enable, 1 = disable) Bits 2-7 – Reserved (must be set to zero) | Int (unsigned byte) | Number (unsigned byte) |
| DEV_ACCL_EVENT _DATA_PRD | DCAI | Duration for collecting harsh event accelerometer data before the harsh event took place.  Range: 1 – 60 | See: Time measurement field | See: Time measurement field |
| DEV_ACCL_EVENT _DATA_FRQ | DCAF | Defines hash event data collection frequency.  Range: 1 – 30 | See: Frequency measurement field | See: Frequency measurement field |

FIG. 40K

| | | | | |
|---|---|---|---|---|
| DEV_INT_BAT_CH RG_MSG_INT | DCIC | Defines time interval to send DEV_INT_BAT_LEVEL_CH ANGED event message when device with only internal battery is being charged using external power source.<br><br>*Range: 1 – 300* | See: Time measurement field | See: Time measurement field |

FIG. 40L

| Field | Purpose | Avro Format | JSON Format |
|---|---|---|---|
| ID | Unique ID for the on-demand request. Device MUST include this ID while replying with on-demand request's response message. | *Fixed*<br>*Size: 16*<br>*Name: GUID* | *String*<br>*Valid string representing valid GUID* |
| REQUEST_TY PE | Type of on-demand data being requested.<br><br>*Values:*<br>GPS_TELEMETRY – Service server is requesting GPS telemetry data.<br><br>TELEMETRY – Service server is requesting telemetry data. Server can define which specific telemetry it is interested in using in REQ_TELEMETRY field.<br><br>REPORTS – Service server is requesting reports data. Server can define which specific report it is interested in using REQ_REPORT field. Server can define any device-type independent or device-type specific report. | *Array of string* | *Array of string* |
| REQ_TELEME TRY | List of all telemetry the Service server is requesting. It may include device-type independent or device-type specific telemetries. | *Array of string* | *Array of string* |
| REQ_REPORT | List of all reports the server is requesting. It may include device-type independent or device-type specific reports | *Array of string* | *Array of string* |

FIG. 41

| Field | Purpose | Avro Format | JSON Format |
|---|---|---|---|
| ID | Unique ID for the command execution request. Device MUST include this ID while replying to Service server with command execution request's response message. | Fixed size: 16<br>Name: GUID | String<br>Valid string representing valid GUID |
| COMMANDS | List of command execution records. | Array of record | Array of object |

FIG. 42

| Field | Purpose | Avro Format | JSON Format |
|---|---|---|---|
| COMMAND_ID | Command to be executed. | String | String |
| PARAMS | Required parameters, if required for execution of specific command. (Optional) | Map<br><br>Key: string (param name)<br>Value: String | Array of key-value pair.<br><br>Key: string (param name)<br>Value: String |

FIG. 43

| Command | Purpose | Required Parameters |
|---|---|---|
| DEV_REBOOT | Restarts the device. | |
| DEV_SAVE_CONFIG | Save current device configuration to profile. | PROFILE_NAME<br>String: Max. 16 characters |
| DEV_RESET | Resets all configuration parameters to factory set values. | |
| DEV_RESET_PROFILE | Resets all configuration parameters to provided profile name. | PROFILE_NAME<br>String: Max. 16 characters |
| DEV_WIFI_TOGGLE | Toggles Wi-Fi hotspot. | STATUS (bool)<br>Values:<br>True – Turns Wi-Fi ON<br>False – Turns Wi-Fi OFF |
| DEV_GPS_TOGGLE | Toggles GPS receiver power status. | STATUS (bool)<br>Values:<br>True – Turns GPS receiver ON<br>False – Turns GPS receiver OFF |

FIG. 44A

| | | |
|---|---|---|
| DEV_CLEAR_BUFFER | Clears on-device message buffer. | |
| DEV_FLUSH_BUFFER | Forcefully flushes all messages in on-device message buffer and tries to send/publish them. | |
| DEV_FOTA_CHECK | Manually checks for firmware upgrade. (Optional) | DEV_FOTA_SERVER_ADDR<br>This parameter is optional. If not provided, device will check for FOTA using FOTA server address stored in device configuration. |
| DEV_SEND_SMS | Sends SMS message from device to destination number. | SMS_MESSAGE<br>String: Maximum 918 characters<br><br>SMS_DEST_PHONE (String) |
| DEV_TIME_SYNC | Manually forces device to initiate time sync with Service servers. | |
| DEV_AGPS_REQ | Manually forces device to request AGPS data from Service servers using current device's location. | |
| DEV_RECAL_ACCL | Initiates re-calibration of onboard accelerometer. | |
| DEV_SYS_PREP | Puts device to deep sleep (primarily used for device shipping purposes)<br><br>Device will ONLY wake up when it detects external voltage changes or is switched-on using power switch. | |
| DEV_INIT_BOOTSTRAP | This command allows the Service servers to initiate server-initiated bootstrap process for device. The main purpose is to facilitate rotation of device credentials (certificate and private key).<br><br>When device receives this command, it will store new bootstrap configuration (newly issued device-specific bootstrap certificate, private key, and bootstrap server URI on device.<br><br>After that, device will send ACK back to device acknowledging that it has received init bootstrap command and then it will terminate all active connections with Service gateway server, | BOOTSTAP_SRV_URI<br>URI of the Service bootstrapping server.<br><br>BOOTSTRAP_CERT<br>Newly issued device-specific certificate (signed by Service) to be used for DTLS/TLS handshake with Service bootstrap server.<br><br>BOOTSTRAP_SECRET<br>Newly generated device-specific private key to be used for DTLS/TLS handshake with |

FIG. 44B

| | remove all previously issued certificates and private keys, and will initiate client-initiated bootstrap process as described in Device Provisioning section. | Service bootstrap server. |

FIG. 44C

| Field | Purpose | Avro Format | JSON Format |
|---|---|---|---|
| ACK_TYPE | Acknowledgment type.<br><br>*Values:*<br>0x00 – ACK - Success<br>0x01 – NACK - Message authentication code failed<br>0x02 – NACK - Header – No/invalid device ID<br>0x03 – NACK - Header - Protocol version not provided or not supported<br>0x04 – NACK - Header - Encryption problems<br>0x05 – NACK - Header - Sequence number error<br>0x06 – NACK - Header - Generic message header parsing error<br>0x07 – NACK - Payload - Message not supported<br>0x08 – NACK - Payload - Operation not supported<br>0x09 – NACK - Payload - Serialization not supported<br>0x0A – NACK - Payload - Serialization failure<br>0x0B – NACK - Payload - Compression not supported<br>0x0C – NACK - Payload - Decompression failure<br>0x0D – NACK - Payload - Generic header parsing error<br>0x0E – NACK - Payload parsing - Schema/payload structure parsing failed<br>0x0F – NACK - Payload parsing - Mandatory values missing<br>0x10 – NACK - Payload parsing - Values NULL<br>0x11 – NACK - Payload parsing - Values in invalid format<br>0x12 – NACK - Payload parsing - Values out of range<br>0x13 – NACK - Payload parsing - Generic failure<br>0xFF – NACK - Generic failure | Int | Number |

FIG. 45

| Field | Purpose | Avro Format | JSON Format |
|---|---|---|---|
| ID | Unique ID for the read request. Device MUST include this ID while replying to Service servers with read response message. | Fixed size: 16<br>Name: GUID | String<br>Valid string representing valid GUID |
| DEV_TIME | Device time when report was generated | See: Time measurement field | See: Time measurement field |
| ACK_TYPE | Acknowledgment code for the server-to-device request. | Int | Number |
| PARAMS | List of key-value pair of configuration parameters to be read and its values. This field will ONLY exist if the ACK field value is 0x00 (ACK). | Map<br><br>Key: Configuration parameter name<br><br>Value: Array of string (denotes values for parameters) | Array of key-value pair.<br><br>Key: Configuration parameter name<br><br>Value: Array of string (denotes values for parameters) |

FIG. 46

| Field | Purpose | Avro Format | JSON Format |
|---|---|---|---|
| ID | Unique ID for the write request. Device MUST include this ID while replying to Service server with write response message. | Fixed size: 16<br>Name: GUID | String<br>Valid string representing valid GUID |
| DEV_TIME | Device time when report was generated | See: Time measurement field | See: Time measurement field |
| ACK_TYPE | Acknowledgment code for the server-to-device request. | Int | Number |
| PARAMS | Key-value pair of configuration parameters being written and the status code of write operation. This field will ONLY exist if the ACK field value is 0x00 (ACK). | Map<br><br>Key: Configuration parameter name | Array of key-value pair.<br><br>Key: Configuration parameter name |

FIG. 47A

|   | Status code values:<br>0x00 – Success<br>0x01 – Invalid value<br>0x02 – Invalid format<br>0x03 – Value out of range<br>0xFF – Generic write failure | Value: Array of Int (denotes status code for write operation for each value sent by server for parameter) | Value: Array of number (denotes status code for write operation for each value sent by server for parameter) |
|---|---|---|---|

FIG. 47B

| Field | Purpose | Avro Format | JSON Format |
|---|---|---|---|
| STATUS | Status code for the parameter write request for a parameter.<br><br>Values:<br>0x00 – Success<br>0x01 – Invalid value<br>0x02 – Invalid format<br>0x03 – Value out of range<br>0xFF – Generic write failure | Int | Number |
| VALUES | All values for a parameter after a write operation regardless of status. | Array of string | Array of string |

FIG. 48

| Field | Purpose | Avro Format | JSON Format |
|---|---|---|---|
| ID | Unique ID for the on-demand request. Device MUST include this ID while replying to Service server with on-demand request's response message. | Fixed size: 16<br>Name: GUID | String<br>Valid string representing valid GUID |
| DEV_TIME | Device time when report was generated. | See: Time measurement field | See: Time measurement field |
| ACK_TYPE | Acknowledgment code for the server-to-device request. | Int | Number |
| GPS_TELEMET | GPS location data. Required, if | record | object |

FIG. 49A

| | | | |
|---|---|---|---|
| RY | requested by server. | | |
| TELEMETRY | Telemetry collected by device. Contains all telemetries requested by server. It may include device-type independent or device-type specific telemetries. Device can include extra telemetry in addition to whatever the server requested. | map | array of key-value pair |
| REPORTS | Includes all reports requested by server. It may include device-type independent or device-type specific reports. | Map<br><br>Key: Name of the report<br><br>Value: Record. Structure of individual report record can be found in device-type-independent report section OR in device-type- specific report section. | Array of key-value pair<br><br>Key: Name of the report<br><br>Value: Record. Structure of individual report record can be found in device-type-independent report section OR in device-type-specific report section. |

FIG. 49B

| Field | Purpose | Avro Format | JSON Format |
|---|---|---|---|
| ID | Unique ID for the on-demand request. Device MUST include this ID while replying to Service server with on-demand request's response message. | Fixed size: 16<br>Name: GUID | String<br>Valid string representing valid GUID |
| DEV_TIME | Device time when report was generated | See: Time measurement field | See: Time measurement field |
| ACK_TYPE | Acknowledgment code for the server-to-device request. | Int | Number |
| COMMANDS_STATUS | List of command execution status records. | Array of record | Array of object |

FIG. 50

| Field | Purpose | Avro Format | JSON Format |
|---|---|---|---|
| COMMAND_ID | Command to be executed. | String | String |
| STATUS | Status of command executed by device.<br><br>Values:<br>0x01 – Success<br>0x02 – Missing parameters<br>0x03 – Invalid parameters supplied<br>0x04 – Invalid parameters format<br>0x05 – Parameter values out of range<br>0x06 – Command is not supported<br>0x07 – Requested command execution is not possible (due to some state on device)<br>0xFF – Failed | Int | Number |
| ERROR | | String | String |

FIG. 51

| Field | Purpose | Avro Format | JSON Format |
|---|---|---|---|
| ID | Unique ID for the device-to-server request. Device MUST include this ID while sending this message type to Service server. Service server will include this ID while replying to device with server-to-device response message. | Fixed size: 16<br>Name: GUID | String<br>Valid string representing valid GUID |
| DEV_TIME | Device time when request was generated. | See: Time measurement field | See: Time measurement field |
| REQUESTS | List of request records. | Array of record | Array of object |

FIG. 52

| Field | Purpose | Avro Format | JSON Format |
|---|---|---|---|
| REQUEST_ID | Request name. | String | String |
| PARAMS | Required parameters, if required for specific request. (Optional) | Map<br><br>Key: string (param name)<br>Value: String | Array of key-value pair.<br><br>Key: string (param name)<br>Value: String |

FIG. 53

| REQUEST_ID | Purpose | Parameters | Avro Format | JSON Format |
|---|---|---|---|---|
| DEV_REQ_TIME _SYNC | Allows device to synchronize time with Service servers using standard NTP (network time protocol) | NTP_CLIENT_DATA<br><br>Notes:<br>*For clients making requests using NTP sends 48 bytes of data with first byte set to 0x1B (00011011)<br><br>Leap indicator = 0 (No warning)<br><br>Version Num. = 3 (IPv4)<br><br>Mode = 3 (Client mode)* | *Bytes* | *Bytes* |
| DEV_REQ_AGPS | Allows device to request assisted-GPS data from Service servers. | SOURCE: *Which AGPS source to be used.*<br><br>Values::: *U-Blox* | *String* | *String* |
| | | LAT: *Latitude position for requesting AGPS data.*<br><br>*Range: -90 to 90* | *String* | *String* |
| | | LON: *Longitude position for requesting AGPS data.*<br><br>*Range: -180 to 180* | *String* | *String* |
| | | PACC: *Approximate position accuracy of provided latitude/longitude position*<br><br>*Range: 0-6000000* | *String* | *String* |

FIG. 54

| Field | Purpose | Avro Format | JSON Format |
|---|---|---|---|
| ID | Unique ID for the device-to-server request. Device MUST include this ID while sending this message type to Service servers. Service servers will include this ID while replying to device with a server-to-device response message. | Fixed size: 16<br>Name: GUID | String<br>Valid string representing valid GUID |
| ACK_TYPE | Acknowledgment code for the server-to-device requests. | Int | Number |
| RESP_REQUESTS | List of response records for each REQUEST_ID. | Map<br><br>Key: REQUEST_ID<br>Value: Record. | Array of key-value pair<br><br>Key: REQUEST_ID<br>Value: Record. |

FIG. 55

| Field | Purpose | Avro Format | JSON Format |
|---|---|---|---|
| STATUS | Status code of individual request execution on Service server.<br><br>Values:<br>0x00 – Success<br>0x01 – Not supported<br>0x02 – Service unavailable<br>0xFF – Failure | Int | Number |
| RESPONSE | Response of individual request. | Map<br><br>Key: Response parameter<br><br>Value: Parameter specific (string) | Array of key-value pair<br><br>Key: Response parameter<br><br>Value: Parameter specific (string) |

FIG. 56

| REQUEST_ID | Purpose | Response | Avro Format | JSON Format |
|---|---|---|---|---|
| DEV_REQ_TIME_SYNC | Allows to synchronize time with the Service server using standard NTP (Network Time Protocol) | NTP_SVR_DATA<br><br>Notes:<br>Time synchronization response as per NTP. | String (BASE64 encoded string of bytes) | String (BASE64 encoded string of bytes) |
| DEV_REQ_AGPS | Allows device to requests assisted-GPS data from the Service servers. | AGPS_SVR_DATA<br><br>Notes:<br>AGPS response received from source AGPS server. | String (BASE64 encoded string of bytes) | String (BASE64 encoded string of bytes) |

FIG. 57

| Event ID | Purpose | Telemetry |
|---|---|---|
| VEH_IGN_ON | Ignition-on event is detected on vehicle. | |
| VEH_IGN_OFF | Ignition-off event is detected on vehicle. | |
| VEH_VBUS_DETECTION_START | Device has started vehicle bus detection. | |
| VEH_VBUS_DETECTION_SUCCESS | Device has successfully completed vehicle bus detection. | |
| VEH_VBUS_DETECTION_TIMEOUT | Vehicle bus detection has timed out. | |
| VEH_TRIP_TIME_BASED | Periodic reporting while vehicle is in trip (ignition is on) | |
| VEH_TRIP_HEADING_CHANGED | Vehicle heading has changed while vehicle is in trip (ignition is on) | |
| VEH_TRIP_MOVING_STARTED | Vehicle has started moving while vehicle is in trip (ignition is on) | |
| VEH_TRIP_MOVING_STOPPED | Vehicle has stopped moving while vehicle is in trip (ignition is on) | |
| VEH_IDLING_STARTED | Vehicle idling has started while ignition is on. | |

FIG. 58A

| | | |
|---|---|---|
| VEH_IDLING_STOPPED | Vehicle idling has stopped while ignition is on. | |
| VEH_HARSH_FW | Harsh forward (harsh acceleration/speeding) event has been detected while ignition is on. | ACCEL_X_FORCE<br>ACCEL_Y_FORCE<br>ACCL_Z_FORCE<br>ACCEL_MAGNITUDE |
| VEH_HARSH_BRK | Harsh braking (harsh deceleration) event has been detected while ignition is on. | ACCEL_X_FORCE<br>ACCEL_Y_FORCE<br>ACCL_Z_FORCE<br>ACCEL_MAGNITUDE |
| VEH_HARSH_RIGHT_TURN | Harsh right turn event has been detected while ignition is on. | ACCEL_X_FORCE<br>ACCEL_Y_FORCE<br>ACCL_Z_FORCE<br>ACCEL_MAGNITUDE |
| VEH_HARSH_LEFT_TURN | Harsh left turn event has been detected while ignition is on. | ACCEL_X_FORCE<br>ACCEL_Y_FORCE<br>ACCL_Z_FORCE<br>ACCEL_MAGNITUDE |
| VEH_HARSH_UPWARD | Harsh upward event has been detected while ignition is on. | ACCEL_X_FORCE<br>ACCEL_Y_FORCE<br>ACCL_Z_FORCE<br>ACCEL_MAGNITUDE |
| VEH_HARSH_DOWNWARD | Harsh downward event has been detected while ignition is on. | ACCEL_X_FORCE<br>ACCEL_Y_FORCE<br>ACCL_Z_FORCE<br>ACCEL_MAGNITUDE |
| VEH_CRASH | Crash/accident event has been detected. | ACCEL_X_FORCE<br>ACCEL_Y_FORCE<br>ACCL_Z_FORCE<br>ACCEL_MAGNITUDE |
| VEH_POST_CRASH | This event is used to report post-crash/accident events. | |
| VEH_TILT | Vehicle tilt has been detected. | TILT_ANGEL |
| VEH_TOW_START | Vehicle towing has started. (Only used when ignition is off). | |
| VEH_TOW_BC | Defines breadcrumb events when vehicle is in towing state. (Only used when ignition is off). If, Ignition ON is detected while in towing state, device will send VEH_TOW_ENDED event message before sending | |

FIG. 58B

|  | VEH_IGNITION_ON event message. |  |
|---|---|---|
| VEH_TOW_ENDED | Vehicle towing has stopped. (Only used when ignition is off). |  |

FIG. 58C

| Field | Short name | Purpose | Avro Format | JSON Format |
|---|---|---|---|---|
| VEH_SPEED | VTS | Vehicle speed using VBUS. | See: Speed measurement field | See: Speed measurement field |
| VEH_RPM | VTR | Vehicle RPM. | See: RPM measurement field | See: RPM measurement field |
| VEH_MIL_STATUS | VTM | Check engine light is illuminated. | Bool | Bool |
| VEH_DTC_COUNT | VTD | Number of confirmed emissions-related DTCs. | Int | Number |
| VEH_IGNITION_TYPE | VTI | If the engine is spark-ignition or compression-ignition.<br><br>Values:<br>0x01 – Spark ignition (Otto or Wankel engines)<br>0x02 – Compression ignition (diesel engines) | Int | Number |
| VEH_VIRT_ODO | VTOV | Virtual (calculated) odometer value. | See: Distance measurement field | See: Distance measurement field |

FIG. 59A

| | | | | |
|---|---|---|---|---|
| VEH_REAL_ODO | VTOR | Real (reported on VBUS) odometer value. | See: Distance measurement field | See: Distance measurement field |
| VEH_ENGINE_LOAD | VTEL | Calculated engine load. | See: Percentage measurement field | See: Percentage measurement field |
| VEH_COOLANT_TEMP | VTCT | Engine coolant temperature. | See: Temperature measurement field | See: Temperature measurement field |
| VEH_THROTTLE_POS | VTTP | Throttle position. | See: Percentage measurement field | See: Percentage measurement field |
| VEH_FUEL_PRESSURE | VTFP | Fuel/gauge pressure. | See: Pressure measurement field | See: Pressure measurement field |
| VEH_FUEL_VOL | VTFV | Remaining fuel volume. | See: Volume measurement field | See: Volume measurement field |
| VEH_FUEL_LEVEL | VTFL | Remaining fuel level. | See: Percentage measurement field | See: Percentage measurement field |
| VEH_IMA_PRESSURE | VTMP | Intake manifold absolute pressure. | See: Pressure measurement field | See: Pressure measurement field |
| VEH_INTAKE_AIR_TEMP | VTMT | Intake air temperature. | See: Temperature measurement field | See: Temperature measurement field |
| VEH_MAF_AIR_FLOW | VTMF | Mass air flow rate. | See: Air-flow measurement field | See: Air-flow measurement field |
| VEH_RUN_TIME | VTRT | Run time since engine has started. | See: Duration measurement field | See: Duration measurement field |

FIG. 59B

| VEH_DIST_SINCE_MIL | VTMD | Distance travelled since malfunction indicator lamp (MIL) is on. | See: Distance measurement field | See: Distance measurement field |
|---|---|---|---|---|
| VEH_FUEL_RAIL_PRESSURE | VTRP | Fuel rail pressure (relative to manifold vacuum) | See: Pressure measurement field | See: Pressure measurement field |
| VEH_FUEL_RAIL_GAUGE_PRESSURE | VTGP | Fuel rail gauge pressure. | See: Pressure measurement field | See: Pressure measurement field |
| VEH_WARMUPS_SINCE_DTC_CLEARED | VTDW | Warm-ups since DTCs are cleared. | Int | Number |
| VEH_DIST_SINCE_DTC_CLEARED | VTDD | Distance travelled since DTCs are cleared. | See: Distance measurement field | See: Distance measurement field |
| VEH_EVAP_VAPOR_PRESSURE | VTEP | Evaporative system's vapor pressure. | See: Pressure measurement field | See: Pressure measurement field |
| VEH_ABS_BARO_PRESSURE | VTAP | Absolute barometric pressure. | See: Pressure measurement field | See: Pressure measurement field |
| VEH_CONTROL_VOLT | VTCV | Control module voltage. | See: Voltage measurement field | See: Voltage measurement field |
| VEH_ABS_LOAD | VTAL | Absolute load value. | See: Percentage measurement field | See: Percentage measurement field |
| VEH_REL_THROTTLE_POS | VTTR | Relative throttle position. | See: Percentage measurement field | See: Percentage measurement field |
| VEH_AMB_AIR_TEMP | VTAT | Ambient air temperature. | See: Temperature | See: Temperature |

FIG. 59C

| | | | | |
|---|---|---|---|---|
| VEH_TIME_SINCE_MIL | VTLT | Total run time since MIL is on. | See: Duration measurement field | See: Duration measurement field |
| VEH_TIME_SINCE_DTC_CLEARED | VTDT | Total time since DTCs are cleared. | See: Duration measurement field | See: Duration measurement field |
| VEH_HYBRID_BAT_LIFE | VTHB | Remaining life of hybrid battery pack. | See: Percentage measurement field | See: Percentage measurement field |
| VEH_ENGINE_OIL_TEMP | VTOT | Engine oil temperature. | See: Temperature measurement field | See: Temperature measurement field |
| VEH_ENGINE_FUEL_RATE | VTFR | Engine fuel rate. | See: Liquid Volume Rate measurement field | See: Liquid Volume Rare measurement field |
| VEH_ENGINE_REQ_TORQUE | VTTQ | Requested engine percentage torque. | See: Percentage measurement field | See: Percentage measurement field |
| VEH_ENGINE_ACT_TORQUE | VTTA | Actual engine percent torque. | See: Percentage measurement field | See: Percentage measurement field |
| VEH_ENGINE_REF_TORQUE | VTTF | Engine reference torque. | See: Pressure measurement field | See: Pressure measurement field |
| VEH_TRANS_FL_TEMP | VTTT | Transmission fluid temperature. | See: Temperature measurement field | See: Temperature measurement field |
| VEH_TRANS_FL_PRESSURE | VTTG | Transmission fluid pressure. | See: Pressure measurement field | See: Pressure measurement field |

FIG. 59D

| | | | | |
|---|---|---|---|---|
| VEH_TIRE_LF_PRESSURE | VTLF | Left-front tire pressure. | See: Pressure measurement field | See: Pressure measurement field |
| VEH_TIRE_LR_PRESSURE | VTLR | Left-rear tire pressure. | See: Pressure measurement field | See: Pressure measurement field |
| VEH_TIRE_RF_PRESSURE | VTRF | Right-front tire pressure. | See: Pressure measurement field | See: Pressure measurement field |
| VEH_TIRE_RR_PRESSURE | VTRR | Right-rear tire pressure. | See: Pressure measurement field | See: Pressure measurement field |
| VEH_INDICATORS | VTIS | Status of various indicators. Values: (0 = OFF, 1 = ON) Bits 0 – 63 – Reserved | Long (Bitwise) | Number (Long – Bitwise) |

FIG. 59E

| Field | Purpose | Avro Format | JSON Format |
|---|---|---|---|
| VEH_ID_RPT | Start of vehicle identification report. | record | object |

FIG. 60

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Optional) | record | object |
| TELEMETRY | Telemetry collected by device. (Optional) | map | array of key-value pair |

FIG. 61A

| | | | |
|---|---|---|---|
| VIN | Vehicle identification number.<br>Length: 17 characters | *String* | *String* |
| PROTOCOL | OBD-II communication protocol over vehicle bus.<br><br>Values:<br>*0x00* – Unknown<br>*0x01* – ISO15765-4 (CAN-BUS) – 11 Bit, 500 KBaud<br>*0x02* – ISO15765-4 (CAN-BUS) – 29 Bit, 500 KBaud<br>*0x03* – ISO15765-4 (CAN-BUS) – 11 Bit, 250 KBaud<br>*0x04* – ISO15765-4 (CAN-BUS) – 29 Bit, 250 KBaud<br>*0x05* – ISO14230-4 (KWP2000) – 5 baud init<br>*0x06* – ISO14230-4 (KWP2000) – Fast init<br>*0x07* – ISO9141-2<br>*0x08* – SAE J1850 VPW<br>*0x09* – SAE J1850 PWM | *Int* | *Number* |
| OBD_STANDARD | Which OBD standards vehicle's ECU is designed to comply with.<br><br>Values:<br>01 – OBD-II as defined by the CARB<br>02 – OBD as defined by the EPA<br>03 – OBD and OBD-II<br>04 – OBD-I<br>05 – Not OBD compliant<br>06 – EOBD (Europe)<br>07 – EOBD and OBD-II<br>08 – EOBD and OBD<br>09 – EOBD, OBD and OBD II<br>10 – JOBD (Japan)<br>11 – JOBD and OBD II<br>12 – JOBD and EOBD<br>13 – JOBD, EOBD, and OBD II<br>17 – Engine Manufacturer Diagnostics (EMD)<br>18 – Engine Manufacturer Diagnostics Enhanced (EMD+)<br>19 – Heavy Duty On-Board Diagnostics<br>20 – Heavy Duty On-Board Diagnostics | *Int* | *Number* |

FIG. 61B

| | | | |
|---|---|---|---|
| | (HD OBD)<br>21 – Worldwide Harmonized OBD (WWH OBD)<br>23 – Heavy Duty Euro OBD Stage I without NOx control (HD EOBD-I)<br>24 – Heavy Duty Euro OBD Stage I with NOx control (HD EOBD-I N)<br>25 – Heavy Duty Euro OBD Stage II without NOx control (HD EOBD-II)<br>26 – Heavy Duty Euro OBD Stage II with NOx control (HD EOBD-II N)<br>28 – Brazil OBD Phase 1 (OBDBr-1)<br>29 – Brazil OBD Phase 2 (OBDBr-2)<br>30 – Korean OBD (KOBD)<br>31 – India OBD I (IOBD I)<br>32 – India OBD II (IOBD II)<br>33 – Heavy Duty Euro OBD Stage VI (HD EOBD-IV) | | |
| FUEL_TYPE | Fuel type of the vehicle.<br><br>Values:<br>00 – Not available<br>01 – Gasoline<br>02 – Methanol<br>03 – Ethanol<br>04 – Diesel<br>05 – LPG<br>06 – CNG<br>07 – Propane<br>08 – Electric<br>09 – Bi-fuel running gasoline<br>10 – Bi-fuel running methanol<br>11 – Bi-fuel running ethanol<br>12 – Bi-fuel running LPG<br>13 – Bi-fuel running CNG<br>14 – Bi-fuel running propane<br>15 – Bi-fuel running electricity<br>16 – Bi-fuel running electric and combustion engine<br>17 – Hybrid gasoline<br>18 – Hybrid ethanol<br>19 – Hybrid diesel<br>20 – Hybrid electric<br>21 – Hybrid running electric and combustion engine | Int | Number |

FIG. 61C

| | 22 – Hybrid regenerative<br>23 – Bi-fuel running diesel | | |
|---|---|---|---|
| STANDARD_PID | List of all standard OBD-II PID supported by device (to read) and supported by vehicle. | Array of string | Array of string |
| OEM_PID | List of all OEM (vehicle manufacturer) specific OBD-II PID supported by device (to read) and supported by vehicle. | | |
| MONITOR_STATUS | Monitor status since DTCs are cleared.<br><br>Keys:<br>MISFIRE<br>FUEL_SYS<br>COMPREHENSIVE_COMP<br>CATALYST<br>HEATED_CATALYST<br>EVAP_SYS<br>SEC_AIR_SYS<br>AC_REFRIGERANT_SYS<br>O2_SENSOR<br>O2_SENSOR_HEATER<br>EGR_SYS<br><br>Values:<br>True – Test completed<br>False – Test not completed | Map<br>Key: Monitor name (string)<br>Value: Bool | Array of key-value pair<br><br>Key: Monitor name (string)<br>Value: Bool |
| CUR_MONITOR_STATUS | Current cycle monitor status.<br><br>Keys:<br>MISFIRE<br>FUEL_SYS<br>COMPREHENSIVE_COMP<br>CATALYST<br>HEATED_CATALYST<br>EVAP_SYS<br>SEC_AIR_SYS<br>AC_REFRIGERANT_SYS<br>O2_SENSOR<br>O2_SENSOR_HEATER<br>EGR_SYS<br><br>Values:<br>True – Test completed<br>False – Test not completed | Map<br>Key: Monitor name (string)<br>Value: Bool | Array of key-value pair<br><br>Key: Monitor name (string)<br>Value: Bool |

FIG. 61D

| Field | Purpose | Values |
|---|---|---|
| Letter | Defines system being interrogated. There are four different values – categorizing codes into four different systems. | B – Body codes<br>This category covers functions that are, generally, inside of the passenger compartment. These functions provide the driver with assistance, comfort, convenience, and safety.<br><br>C – Chassis codes<br>This category covers functions that are, generally, outside of the passenger compartment. These functions typically include mechanical systems such as brakes, steering and suspension.<br><br>P – Powertrain codes<br>This category covers functions that include engine, transmission and associated drivetrain accessories.<br><br>U – Network & vehicle integration codes<br>This category covers functions that are shared among computers and systems on the vehicle. |
| Digit – 1 | First digit in DTC denotes if the code is generic or manufacturer specific. | 0 – Generic OBD code<br>Generic codes are adopted by all vehicles that follow the OBD-II standard. These codes are common enough across most manufacturers so that a common code and fault message could be assigned.<br><br>1 – Vehicle manufacturer specific or enhanced code<br>These codes are unique to a specific vehicle's make or model. These fault codes will not be used generally by most of the manufacturers.<br><br>Note:<br>The first digit might also be 2 or 3. In this case the type depends on the system:<br>• P2xxx codes are generic codes.<br>• B2xxx, C2xxx and U2xxx codes are manufacturer controlled.<br>• P3xxx and U3xxx codes are manufacturer controlled.<br>• B3xxx and C3xxx codes are reserved. |

FIG. 62A

| | | |
|---|---|---|
| Digit – 2 | Second digit refers to the subsystem. | 0 – Fuel and air metering and auxiliary emission controls.<br>1 – Fuel and air metering.<br>2 – Fuel and air metering (injector circuit).<br>3 – Ignition system or misfire.<br>4 – Auxiliary emissions controls.<br>5 – Vehicle speed controls and idle control system.<br>6 – Computer output circuit.<br>7 – Transmission.<br>8 – Transmission. |
| Digit – 3 and 4 | Last two digits define the actual fault description. This number will define a particular problem and each code is defined separately for each problem. | |

FIG. 62B

| Field | Purpose | Avro Format | JSON Format |
|---|---|---|---|
| VEH_DTC_RPT | Start of vehicle DTC report. | record | object |

FIG. 63

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Optional) | record | object |
| TELEMETRY | Telemetry collected by device. (Optional) | map | array of key-value pair |
| CODES | List of all DTCs. | Array of record | Array of object |

FIG. 64

| Field | Purpose | Avro Format | JSON Format |
|---|---|---|---|
| STATUS | If the DTC code has been previously reported or not.<br><br>*Values:*<br>*0x00* – DTC has already been reported.<br>*0x01* – DTC is being reported for first time. | Int | Number |
| TYPE | DTC type.<br><br>*Values:*<br>*0x00* – Current DTC<br>*0x01* – Pending DTC<br>*0x02* – Permanent DTC | Int | Number |
| CODE | Actual DTC.<br>Length: 5 | String | String |

FIG. 65

| Field | Purpose | Avro Format | JSON Format |
|---|---|---|---|
| VEH_TRIP_RPT | Start of vehicle trip report. | record | object |

FIG. 66

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. Optional. | record | object |
| TELEMETRY | Telemetry collected by device. Optional. | map | array of key-value pair |
| START_TIME | Trip start time. | See: Time measurement field | See: Time measurement field |
| END_TIME | Trip end time. | See: Time measurement field | See: Time measurement field |

FIG. 67A

| | | | |
|---|---|---|---|
| DURATION | Trip duration. | See: Duration measurement field | See: Duration measurement field |
| TOTAL_DURATION | Total duration for which vehicle is driven since device was connected to vehicle. | See: Duration measurement field | See: Duration measurement field |
| START_GPS_TELEMETRY | GPS location data for trip's starting position. | record | object |
| END_GPS_TELEMETRY | GPS location data for trip's end position. | record | object |
| START_VIRT_ODO | Virtual (calculated) odometer at time of trip start. | See: Distance measurement field | See: Distance measurement field |
| END_VIRT_ODO | Virtual (calculated) odometer at time of trip end. | See: Distance measurement field | See: Distance measurement field |
| START_REAL_ODO | Real odometer value at time of trip start – if supported by vehicle. | See: Distance measurement field | See: Distance measurement field |
| END_REAL_ODO | Real odometer value at time of trip end – if supported by vehicle. | See: Distance measurement field | See: Distance measurement field |
| VIRT_DISTANCE | Distance travelled by vehicle during trip using virtual odometer. | See: Distance measurement field | See: Distance measurement field |
| REAL_DISTANCE | Distance travelled by vehicle during trip using real odometer – if real odometer is supported by device. | See: Distance measurement field | See: Distance measurement field |
| VIRT_TOTAL_DISTANCE | Distance travelled by vehicle since device was connected to vehicle using virtual odometer. | See: Distance measurement field | See: Distance measurement field |
| REAL_TOTAL_DISTANCE | Distance travelled by vehicle since device was connected to vehicle using real odometer – if real odometer is supported. | See: Distance measurement field | See: Distance measurement field |
| START_FUEL_VOL | Fuel volume at the start of the trip. | See: Liquid volume measurement field | See: Liquid volume measurement field |

FIG. 67B

| | | | |
|---|---|---|---|
| END_FUEL_VOL | Fuel volume at the end of the trip. | See: Liquid volume measurement field | See: Liquid volume measurement field |
| START_FUEL_LEVEL | Remaining fuel level at the start of the trip. | See: Percentage measurement field | See: Percentage measurement field |
| END_FUEL_LEVEL | Remaining fuel level at the end of the trip. | See: Percentage measurement field | See: Percentage measurement field |
| FUEL_CONSUMPTION | Total fuel used during trip. | See: Liquid volume measurement field | See: Liquid volume measurement field |
| TOTAL_FUEL_CONSUMPTION | Total fuel used since device was connected to vehicle. | See: Liquid volume measurement field | See: Liquid volume measurement field |
| VIRT_FUEL_EFFICIENCY | Fuel efficiency of a vehicle during trip – using virtual odometer for distance travelled and fuel consumption. | See: Fuel efficiency measurement field | See: Fuel efficiency measurement field |
| REAL_FUEL_EFFICIENCY | Fuel efficiency of a vehicle during trip – using real odometer for distance (if supported by vehicle/device) travelled and fuel consumption. | See: Fuel efficiency measurement field | See: Fuel efficiency measurement field |
| AVG_FUEL_EFFICIENCY | Average fuel efficiency of vehicle since device was connected to vehicle. | See: Fuel efficiency measurement field | See: Fuel efficiency measurement field |
| HARSH_EVENTS | Harsh event details during trip. | Array of record | Array of object |
| IDLING_EVENTS | Idling event details during trip. | Array of record | Array of object |
| IDLING_FUEL_CONSUMPTION | Total fuel consumption during all idling events during trip. | See: Liquid volume measurement field | See: Liquid volume measurement field |
| MAX_SPEED | Maximum speed vehicle had during a trip. | See: Speed measurement field | See: Speed measurement field |

FIG. 67C

| | | | |
|---|---|---|---|
| MAX_RPM | Maximum RPM vehicle had during trip. | See: RPM measurement field | See: RPM measurement field |

FIG. 67D

| Field | Purpose | Avro Format | JSON Format |
|---|---|---|---|
| EVENT_TYPE | Kind of harsh event.<br><br>Values:<br>0x00 – Harsh acceleration (speeding)<br>0x01 – Harsh deceleration (braking)<br>0x02 – Harsh right turn<br>0x03 – Harsh left turn<br>0x04 – Harsh upward force<br>0x05 – Harsh downward force | Int | Number |
| EVENT_TIME | Time when harsh event was detected. | See: Time measurement field | See: Time measurement field |
| GPS_TELEMETRY | GPS position telemetry when harsh event was detected. | record | object |
| FORCE | G-force of the harsh event. | See: G-force measurement field | See: G-force measurement field |

FIG. 68

| Field | Purpose | Avro Format | JSON Format |
|---|---|---|---|
| IDLING_START_TIME | Time when an idling event started. | See: Time measurement field | See: Time measurement field |
| IDLING_END_TIME | Time when an idling event ended. | See: Time measurement field | See: Time measurement field |
| IDLING_DURATION | Duration of an idling event. | See: Duration measurement field | See: Duration measurement field |
| GPS_TELEMETRY | GPS position telemetry when idling event started. | record | object |

FIG. 69

| Field | Short name | Purpose | Avro Format | JSON Format |
|---|---|---|---|---|
| VEH_SLEEP_TIME_THR | VCS | Time to wait after ignition-off or towing-is-stopped for device to go to sleep. | See: Duration measurement field | See: Duration measurement field |
| VEH_VBUS_VOLT_DIFF | VCVD | Voltage differential to determine possible ignition on. | See: Voltage measurement field | See: Voltage measurement field |
| VEH_VBUS_VOLT_SAMPL_INT | VCII | Voltage sampling interval to determine possible ignition on.<br><br>*Range: 1 – 3000* | See: Duration measurement field | See: Duration measurement field |
| VEH_VBUS_SAMPL_INT | VCSI | Sampling interval for speed and RPM only.<br><br>*Range: 0 – 5000* | See: Duration measurement field | See: Duration measurement field |
| VEH_VBUS_ALL_SAMPL_INT | VCAI | Sampling interval for all other PIDs.<br><br>*Range: 0 – 5000* | See: Duration measurement field | See: Duration measurement field |
| VEH_VBUS_NUM_RETRY_IGN_OFF | VCIR | Number of times sampling to be performed to determine ignition off. | See: Duration measurement field | See: Duration measurement field |
| VEH_VBUS_SPECIAL_FLAGS | VCVF | This parameter allows to set special instruction/flags/vehicle support to use proper logic for polling/ignition on-off detection.<br><br>*Values: (bitwise)*<br>*0 = Disable/Unset/Not-supported*<br>*1 = Enable/Set/Supported*<br><br>*Bit 0 – Vehicle sounds alarms after Ignition Off for VBUS polling*<br>*Bit 1 – Vehicle supports auto-engine off during idling*<br>*Bit 2-15 – Reserved (must be zero)* | Int (unsigned short) | Number (unsigned short) |

FIG. 70A

| | | | | |
|---|---|---|---|---|
| VEH_VBUS_DETECTION_TIMEOUT | VCVT | Time before device declares failed/unsuccessful VBUS detection. | See: Duration measurement field | See: Duration measurement field |
| VEH_TRIP_PERIODIC_INT | VCTI | Time interval to send periodic trip event message while ignition is on. | See: Duration measurement field | See: Duration measurement field |
| VEH_TRIP_HEADING_CHANGE_THR | VCHT | Change in heading to send heading change event message while ignition is on.<br><br>Range: 1 – 180 | See: Degree measurement field | See: Degree measurement field |
| VEH_MOVING_SPEED_THR | VCMS | VBUS speed of vehicle to declare if vehicle is moving or stationary.<br><br>Note:<br>If speed is below this value for VEH_MOVING_TIME_THR amount of time (once vehicle is in MOVING state), device will declare "NOT MOVING" event. | See: Speed measurement field | See: Speed measurement field |
| VEH_MOVING_TIME_THR | VCMT | Time vehicle should be driving above VEH_MOVING_SPEED_THR to declare vehicle is moving | See: Duration measurement field | See: Duration measurement field |
| VEH_IDLING_TIME_THR | VCIT | Time vehicle should be in "NOT MOVING" state to declare IDLING Start event.<br><br>Note:<br>If vehicle moves from "NOT MOVING" to "MOVING" state while already in idling state, device will declare IDLING Stop event. | See: Duration measurement field | See: Duration measurement field |
| VEH_REPORT_TRIP_NOT_MOVING | VCNM | If periodic trip messages should be sent if vehicle is not moving while ignition is on. | Bool | Bool |
| VEH_HARSH_FW_THR | VCFF | Harsh forward event force. | See: G-force measurement field | See: G-force measurement field |

FIG. 70B

| | | | | |
|---|---|---|---|---|
| VEH_HARSH_FW_TIME_THR | VCFT | Time to wait to declare harsh forward event. | See: Duration measurement field | See: Duration measurement field |
| VEH_HARSH_BRK_THR | VCBF | Harsh braking event force. | See: G-force measurement field | See: G-force measurement field |
| VEH_HARSH_BRK_TIME_THR | VCBT | Time to wait to declare harsh braking event. | See: Duration measurement field | See: Duration measurement field |
| VEH_HARSH_RIGHT_THR | VCRF | Harsh right-turn event force. | See: G-force measurement field | See: G-force measurement field |
| VEH_HARSH_RIGHT_TIME_THR | VCRT | Time to wait to declare harsh right-turn event. | See: Duration measurement field | See: Duration measurement field |
| VEH_HARSH_LEFT_THR | VCLF | Harsh left-turn event force. | See: G-force measurement field | See: G-force measurement field |
| VEH_HARSH_LEFT_TIME_THR | VCLT | Time to wait to declare harsh left-turn event. | See: Duration measurement field | See: Duration measurement field |
| VEH_HARSH_UP_THR | VCUF | Harsh upward force event force. | See: G-force measurement field | See: G-force measurement field |
| VEH_HARSH_UP_TIME_THR | VCUT | Time to wait to declare harsh upward force event. | See: Duration measurement field | See: Duration measurement field |
| VEH_HARSH_DOWN_THR | VCDF | Harsh downward force event force. | See: G-force measurement field | See: G-force measurement field |
| VEH_HARSH_DOWN_TIME_ | VCDT | Time to wait to declare harsh downward force event. | See: Duration | See: Duration |

FIG. 70C

| | | | measurement field | measurement field |
|---|---|---|---|---|
| THR | | | | |
| VEH_CRASH_THR | VCCF | Crash/accident event detection force. | See: G-force measurement field | See: G-force measurement field |
| VEH_POST_CRASH_WAIT_TIME | VCCW | Time to wait before sending post-crash event after detecting crash. | See: Duration measurement field | See: Duration measurement field |
| VEH_CRASH_ACCL_DATA_FREQ | VCAF | What frequency accelerometer data should be collected and sent to server for crash events. | Int | Frequency units |
| VEH_POST_CRASH_ACCL_DATA_FREQ | VCPF | What frequency accelerometer data should be collected and sent to server after detecting crash to send post-crash accelerometer data. | Int | Frequency units |
| VEH_TILT_ANGLE_THR | VCTA | Angle in degree to detect tilt event during ignition-off state. Device will store reference angle after ignition-off event. | See: Degree measurement field | See: Degree measurement field |
| VEH_TOW_GPS_SPEED_THR | VCTS | GPS speed at which vehicle should be moving during ignition-off state to declare towing. | See: Speed measurement field | See: Speed measurement field |
| VEH_TOW_TIME_THR | VCTT | Time a vehicle should be moving above VEH_TOW_GPS_SPEED_THR to declare towing. | See: Duration measurement field | See: Duration measurement field |
| VEH_TOW_BREADCRUMB_INT | VCTB | Time interval at which device should send periodic towing event message while towing is on and ignition is off. | See: Duration measurement field | See: Duration measurement field |
| VEH_TOW_END_TIME_THR | VCTE | Time to wait to declare towing off (if vehicle is already in towing state) and GPS speed is below VEH_TOW_GPS_SPEED_THR during this time duration. | See: Duration measurement field | See: Duration measurement field |
| VEH_REPORT_TOW_BC_NOT_MOVING | VCTN | Whether to report towing breadcrumbs events while vehicle is in towing state, but GPS speed is below VEH_TOW_GPS_SPEED_THR. | Bool | Bool |

FIG. 70D

| Command | Purpose | Required Parameters |
|---|---|---|
| VEH_VBUS_TOGGLE | Enables/disables all VBUS interaction on device. | STATUS<br><br>Values:<br>True – Power ON VBUS functionalities<br>False – Power OFF VBUS functionalities |
| VEH_VBUS_POLLING_TOGGLE | Enables/disables all VBUS polling. | STATUS<br><br>Values:<br>True – Enable all VBUS polling<br>False – Disable All VBUS polling |
| VEH_INIT_VBUS_DETECT | Enables initiation of VBUS detection (check for VIN, protocol etc.) and resend of vehicle identification report after detection complete. | |
| VEH_RESET_TRIP_STATS | Enables reset all trip data accumulation/aggregation. | |

FIG. 71

| Event ID | Purpose | Telemetry |
|---|---|---|
| PT_MOVEMENT | Pet's movement is detected. This message will ONLY be sent if PT_REPORT_MOVEMENT configuration parameter is set and also, PT_MOVEMENT_MODE is set to ON. | |

FIG. 72

| Field | Purpose | Avro Format | JSON Format |
|---|---|---|---|
| PT_ACTIVITY_RPT | Start of pet tracker activity report. | record | object |

FIG. 73

| Field | Purpose | Avro Format | JSON Format |
|---|---|---|---|
| DEV_TIME | Device time when report was generated. | See: Time measurement field | See: Time measurement field |
| GPS_TELEMETRY | GPS location data. (Optional) | record | object |
| TELEMETRY | Telemetry collected by device. (Optional) | map | array of key-value pair |
| LAST_REPORT_TIME | Last time activity report was sent. | See: Time measurement field | See: Time measurement field |
| ACTIVITIES | List of activities since last report. | Array of record | Array of object |

FIG. 74

| Field | Purpose | Avro Format | JSON Format |
|---|---|---|---|
| TYPE | Activity type.<br><br>Values:<br>0x00 – Resting<br>0x01 – Walking<br>0x02 – Running<br>0x03 – In-vehicle | Int | Number |
| TOTAL_DURATION | Duration of an activity since last activity report. | See: Duration measurement field | See: Duration measurement field |
| TIMING | List of timing records. | Array of record | Array of object |

FIG. 75

| Field | Purpose | Avro Format | JSON Format |
|---|---|---|---|
| STAR_TIME | Start time of an activity detected by device. | See: Time measurement field | See: Time measurement field |
| END_TIME | End time of an activity detected by device. | See: Time measurement field | See: Time measurement field |
| DURATION | Duration of any activity. | See: Duration measurement field | See: Duration measurement field |
| STEP_COUNT | Step count during activity. No steps during activity will be denoted as 0. | Int | Number |

FIG. 76

| Field | Purpose | Avro Format | JSON Format |
|---|---|---|---|
| PT_REPORT_MOVEMENT | If movement event should be reported whenever movement is detected. | Bool | Bool |
| PT_MOVEMENT_MODE | Pet's movement mode.<br><br>Values:<br>0x00 – Movement mode is OFF<br>0x01 – Movement mode is ON | Int | Number |
| PT_MOVEMENT_DEBOUNCE | Debounce value for movement detection and movement event reporting after movement has stopped. | See: Duration measurement field | See: Duration measurement field |
| PT_STEP_COUNTER_FACTOR | Size of gait.<br>Range: 1 – 255 | Int | Number |

FIG. 77

| Command | Purpose | Required Parameters |
|---|---|---|
| PT_CMD_LED_FLASH | Command to flash LED lights on device. | DURATION Time to flash LED lights. (See: Duration Measurement Field)<br><br>COLOR (Int/Number)<br>LED color.<br>*Values:*<br>*0x00 – Red*<br>*0x00 – Green*<br>*0x00 – Blue*<br>*0x00 – Magenta*<br>*0x00 – Cyan*<br>*0x00 – Yellow*<br>*0x00 – White* |
| PT_CMD_BEEP | Allows to send command to sound beeping/alarm sound on device. | DURATION<br>Time to beep sound for. (See: Duration measurement field) |
| PT_CMD_SET_LOST_MODE | Allows to activate/deactivate lost mode on device. | MODE (Int/Number)<br>Mode type.<br>*Values:*<br>*0x00 - Deactivate lost mode*<br>*0x01 - Activate lost mode* |

FIG. 78

| Measurement Field | Unit | Avro Format | JSON Format |
|---|---|---|---|
| Time | - | String (ISO 8601 format) | String (ISO 8601 format) |
| Duration | Second | Double (3-decimal point precision) | Number (3-decimal point precision) |
| Distance | Meter | Double (2-decimal point precision) | Number (2-decimal point precision) |
| Speed | Centimeter/second | Double (2-decimal point precision) | Number (2-decimal point precision) |
| RPM | Revolutions per minute | Double | Number |
| Liquid volume | Milliliter | Int | Number |
| G-force | Milli G | Int | Number |

FIG. 79A

| | | | |
|---|---|---|---|
| Acceleration | Centimeter/s/s | Double | Number |
| Weight | Gram | Double (3-decimal point precision) | Number (3-decimal point precision) |
| Pressure | Pascal | Double (3-decimal point precision) | Number (3-decimal point precision) |
| Percentage | % | Double (2-decimal point precision) Range: 0 – 100 | Number (2-decimal point precision) Range: 0 – 100 |
| Temperature | Celsius | Double (2-decimal point precision) | Number (2-decimal point precision) |
| Liquid volume rate | Milliliters/second | Int | Number |
| Fuel efficiency | Liters/100Km | Double (2-decimal point precision) | Number (2-decimal point precision) |
| Torque | Newton meter | Double (3-decimal point precision) | Number (3-decimal point precision) |
| Data | Byte | Long | Number |
| Data rate | Byte/second | Double (3-decimal point precision) | Number (3-decimal point precision) |
| Frequency | Hz | Double (2-decimal point precision) | Number (2-decimal point precision) |
| Signal strength | Milli-dB | Int | Number |
| Degree | - | Double (3-decimal point precision) | Number (3-decimal point precision) |
| Voltage | Millivolts | Int | Number |
| Temperature | Degrees Celsius | Double (3-decimal point precision) | Number (3-decimal point precision) |
| Air-flow rate | Grams/second | Double (3-decimal point precision) | Number (3-decimal point precision) |

FIG. 79B

| Heading | Degree | Double (3-decimal point precision) Range: 0 – 359 | Number (3-decimal point precision) Range: 0 – 359 |
|---|---|---|---|
| Illuminance | Lux | Double (4-decimal point precision) Range: 0.0001 – 100,000 | Number (4-decimal point precision) Range: 0.0001 – 100,000 |

FIG. 79C

| Field | Value | Hex | Notes |
|---|---|---|---|
| Total Message Length | 514 | 0x00000202 | Total message length including this field is 514 bytes. |
| Protocol Version | 1.0 | 0x0100 | - |
| Header Options | 1 | 0x01 | This is a bitwise value. Bit 0 - Set - Device ID related field exists in header |
| Device ID type | 1 | 0x01 | Device's serial number is being used as device ID |
| Device ID length | 11 | 0x0B | Total length of device ID that follows. Denotes total length of device ID is 11 characters. |
| DeviceId | "TEST-DEVICE" | 0x544553542d4445564943 45 | Device ID value |
| Encryption | 0 | 0x00 | Device is being sent over DTLS/TLS - so encryption value is not set. |
| Reserved | 0 | 0x00 | Reserved |

FIG. 80

| Field | Value | Hex | Notes |
|---|---|---|---|
| Payload length | 256 | 0x0100 | Total payload length including this if 256 bytes. |
| Message Type | 1 | 0x01 | Device-to-server message |
| Message sub-type | 1 | 0x01 | Event message |
| Serialization Format | 0 | 0x00 | JSON |

FIG. 81A

| | | | |
|---|---|---|---|
| Compression | 0 | 0x00 | Payload data is not compressed |
| Reserved | 0 | 0x00 | |

FIG. 81B

The following sample message depicts device-to-server event message for event DEV_WK_EXT_BAT.

```
{
  "DEV_TIME": "2018-06-18T17:23:52+00:00",
  "EVENT_ID": "DEV_WK_EXT_BAT",
  "GPS_TELEMETRY":
    {
      "GPS_FIX_TIME": "2018-06-18T17:22:52+00:00",
      "GPS_FIX_STATUS": 1,
      "GPS_LAT": 37.8158547,
      "GPS_LON": -122.3725395,
      "GPS_ALT": 100.00,
      "GPS_SPEED": 0.00,
      "GPS_HEADING": 180.111,
      "GPS_NUM_SAT": 8,
      "GPS_HDOP": 2,
      "GPS_VDOP": 2,
      "GPS_PDOP": 2,
      "GPS_HACC": 4.44,
      "GPS_VACC": 5.55
    },
  "TELEMETRY":
    {
      "DEV_INT_BAT_VOLTAGE": 4000,
      "DEV_EXT_BAT_VOLTAGE": 14000,
      "DEV_ACCL_ALIGN_STATUS": 1,
      "DEV_NW_CARRIER": "TMUS",
      "DEV_NW_CONN_TYPE": 3,
      "DEV_NW_CELL_SIG_STR": 500
    }
}
```

FIG. 82

| Field | Value | Hex | Notes |
|---|---|---|---|
| Payload length | 256 | 0x0100 | Total payload length including this if 256 bytes. |
| Message Type | 1 | 0x01 | Device-to-server message |
| Message sub-type | 2 | 0x02 | Report message |
| Serialization Format | 0 | 0x0 | JSON |
| Compression | 0 | 0x00 | Payload data is not compressed |
| Reserved | 0 | 0x00 | |

FIG. 83

The following sample message depicts device-to-server report message comprised of all various kinds of reports in one message.

```
"ID_RPT":
  {
    "DEV_TIME": "2018-06-18T17:23:52+00:00",
    "TELEMETRY":
      {
        "DEV_NW_CARRIER": "TMUS"
      },
    "GPS_TELEMETRY":
      {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
      },
```

FIG. 84A

```
        "HW_VER": "1.0.0001",
        "MCU_FW_VER": "2.0.0002",
        "MODEM_FW_VER": "3.0.0003",
        "SER_NUM": "X19302DSXS",
        "IMEI": "999333534382914",
        "IMSI": "9290-0292-d335-2xg2-66e3",
        "MSISDN": "P51112151414",
        "ICCID": "A125X32321",
        "WIFI_MAC": "00-14-22-01-23-45",
        "BT_MAC": "00-32-41-13-11-53"
    },
"NW_CONN_RPT":
    {
        "DEV_TIME": "2018-06-18T17:23:52+00:00",
        "TELEMETRY":
            {
                "DEV_NW_CARRIER": "TMUS"
            },
        "GPS_TELEMETRY":
            {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
            },
        "NW_CARRIER": "TMUS",
        "NW_CONN_ROAMING": true,
        "NW_CONN_TYPE": 3,
        "NW_CELL_RECORDS":
            [
                {
                    "NW_CELL_MCC": 1,
                    "NW_CELL_MNC": 1,
                    "NW_CELL_ID": "ID",
                    "NW_CELL_BAND": "BAND",
                    "NW_CELL_ASU": 1,
                    "NW_CELL_SIG_STR": 1,
```

FIG. 84B

```
                "NW_CELL_SIG_QTY": "SIGNAL_QUALITY"
              }
            ],
            "NW_BLE_PROX_RECORDS":
              [
                {
                  "BLE_ID": "ID",
                  "MAC": "00-32-41-13-11-53",
                  "BLE_SIG_STR": 1
                }
              ],
            "NW_WIFI_PROX_RECORDS":
              [
                {
                  "WIFI_SSID": "SSID",
                  "MAC": "00-14-22-01-23-45",
                  "SIG_STR": 1
                }
              ]
          },
        "MSG_STAT_RPT":
          {
            "DEV_TIME": "2018-06-18T17:23:52+00:00",
            "TELEMETRY":
              {
                "DEV_NW_CARRIER": "TMUS"
              },
            "GPS_TELEMETRY":
              {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
              },
            "NUM_EVT_MSG": 1,
            "NUM_RPTS":
              {
```

FIG. 84C

```
            "RPTS1": 1
         },
      "NUM_READ_REQ": 1,
      "NUM_WRITE_REQ": 1,
      "NUM_ONDEMAND_REQ": 1,
      "NUM_CMD_REQ": 1,
      "NUM_ACK_RECV": 1,
      "LAST_MSG_RECV_TIME": "2018-06-18T17:23:52+00:00",
      "LAST_ACK_RECV_TIME": "2018-06-18T17:23:52+00:00",
      "NUM_BYTES_RECV": 1,
      "NUM_BYTES_SENT": 1
   },
"ERROR_RPT":
   {
      "DEV_TIME": "2018-06-18T17:23:52+00:00",
      "TELEMETRY":
         {
            "DEV_NW_CARRIER": "TMUS"
         },
      "GPS_TELEMETRY":
         {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
         },
      "ERROR_DATA":
         [
            {
               "ERROR": "ERROR1",
               "ERROR_TIMESTAMP": "2018-06-18T17:23:52+00:00",
               "ERROR_SEV": 1
            },
            {
               "ERROR": "ERROR2",
               "ERROR_TIMESTAMP": "2018-06-18T17:23:52+00:00",
               "ERROR_SEV": 1
```

FIG. 84D

```
              }
           ]
      },
      "WIFI_STAT_RPT":
        {
           "DEV_TIME": "2018-06-18T17:23:52+00:00",
           "TELEMETRY":
             {
                "DEV_NW_CARRIER": "TMUS"
             },
           "GPS_TELEMETRY":
             {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
             },
           "SSID": "SSID",
           "MAC": "00-14-22-01-23-45",
           "STATUS": true,
           "ROAMING_STATUS": true,
           "PUBLIC_IP": "8.8.8.8",
           "NUM_CLIENTS": 1,
           "DATA_RECV": 1,
           "DATA_SENT": 1,
           "AVG_RECV_SPEED": 1,
           "AVG_SEND_SPEED": 1,
           "CUR_RECV_SPEED": 1,
           "CUR_SEND_SPEED": 1,
           "TOTAL_DATA_RECV": 1,
           "TOTAL_DATA_SENT": 1
        },
      "BT_STAT_RPT":
        {
           "DEV_TIME": "2018-06-18T17:23:52+00:00",
           "TELEMETRY":
             {
```

FIG. 84E

```
      "DEV_NW_CARRIER": "TMUS"
    },
    "GPS_TELEMETRY":
    {
      "GPS_FIX_TIME": "2018-06-18T17:22:52+00:00",
      "GPS_FIX_STATUS": 1,
      "GPS_LAT": 37.8158547,
      "GPS_LON": -122.3725395,
      "GPS_ALT": 100.00,
      "GPS_SPEED": 0.00,
      "GPS_HEADING": 180.111,
      "GPS_NUM_SAT": 8,
      "GPS_HDOP": 2,
      "GPS_VDOP": 2,
      "GPS_PDOP": 2,
      "GPS_HACC": 4.44,
      "GPS_VACC": 5.55
    },
    "BT_NAME": "SSID",
    "BT_STATUS": true,
    "BLE_MODE_SUPPORT": 1,
    "BLE_MODE_ENABLED": 1,
    "BLE_PROFILE_SUPPORTED":
    [
      "PROFILE1",
      "PROFILE2"
    ],
    "BLE_SERVICES_SUPPORTED":
    [
      1,
      3,
      8
    ]
  },
  "SMS_RPT":
  {
    "DEV_TIME": "2018-06-18T17:23:52+00:00",
    "TELEMETRY":
    {
      "DEV_NW_CARRIER": "TMUS"
    },
    "GPS_TELEMETRY":
    {
      "GPS_FIX_TIME": "2018-06-18T17:22:52+00:00",
      "GPS_FIX_STATUS": 1,
      "GPS_LAT": 37.8158547,
```

FIG. 84F

```
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "RECV_TIME": "2018-06-18T17:23:52+00:00",
        "RESULT_CODE": 1,
        "CALLER_ID": "CALLER",
        "ENCODING": 1,
        "DATA": "Value (string)"
    },
    "GPS_STATUS_RPT":
    {
        "DEV_TIME": "2018-06-18T17:23:52+00:00",
        "TELEMETRY":
        {
            "DEV_NW_CARRIER": "TMUS"
        },
        "GPS_TELEMETRY":
        {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "STATUS": true,
        "SATTELITE_DATA":
        [
            {
                "PRN": 1,
                "STATUS": true,
```

FIG. 84G

```
                "SNR": 1.1,
                "AZIMUTH": 1.1
            }
        ]
    },
    "DEV_CAP_RPT":
    {
        "DEV_TIME": "2018-06-18T17:23:52+00:00",
        "TELEMETRY":
        {
            "DEV_NW_CARRIER": "TMUS"
        },
        "GPS_TELEMETRY":
        {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "CAPABILITIES":
        {
            "CAPABILITY1": true,
            "CAPABILITY2": false
        }
    },
    "ACCL_DATA_RPT":
    {
        "DEV_TIME": "2018-06-18T17:23:52+00:00",
        "REASON": 1,
        "DEV_SUB_REASON": 1,
        "FREQ": 1.1,
        "SAMPLE_INT": 1,
        "ACCL_DATA_RECORDS":
        [
            {
                "ACCL_EVENT_TIME": "2018-06-18T17:23:52+00:00",
                "ACCL_COLL_TIME": "2018-06-18T17:23:52+00:00",
```

FIG. 84H

```
            "FORWARD_ACCL": 1.1,
            "LATERAL_ACCL": 1.1,
            "VERTICAL_ACCL": 1.1,
            "GPS_TELEMETRY":
              {
                 "GPS_FIX_TIME": "2018-06-18T17:22:52+00:00",
                 "GPS_FIX_STATUS": 1,
                 "GPS_LAT": 37.8158547,
                 "GPS_LON": -122.3725395,
                 "GPS_ALT": 100.00,
                 "GPS_SPEED": 0.00,
                 "GPS_HEADING": 180.111,
                 "GPS_NUM_SAT": 8,
                 "GPS_HDOP": 2,
                 "GPS_VDOP": 2,
                 "GPS_PDOP": 2,
                 "GPS_HACC": 4.44,
                 "GPS_VACC": 5.55
              },
            "TELEMETRY":
              {
                 "DEV_INT_BAT_VOLTAGE": 4000
              }
         }
      ]
    },
    "VEH_ID_RPT":
      {
         "DEV_TIME": "2018-06-18T17:23:52+00:00",
         "GPS_TELEMETRY":
           {
              "GPS_FIX_TIME": "2018-06-18T17:22:52+00:00",
              "GPS_FIX_STATUS": 1,
              "GPS_LAT": 37.8158547,
              "GPS_LON": -122.3725395,
              "GPS_ALT": 100.00,
              "GPS_SPEED": 0.00,
              "GPS_HEADING": 180.111,
              "GPS_NUM_SAT": 8,
              "GPS_HDOP": 2,
              "GPS_VDOP": 2,
              "GPS_PDOP": 2,
              "GPS_HACC": 4.44,
              "GPS_VACC": 5.55
           },
         "TELEMETRY":
```

FIG. 84I

```
    {
        "DEV_NW_CARRIER": "TMUS"
    },
    "VIN": "JTMYRREV40D037644",
    "PROTOCOL": 1,
    "OBD_STANDARD": 1,
    "STANDARD_PID":
    [
        "PID1",
        "PID2"
    ],
    "OEM_PID":
    [
        "PID1",
        "PID2"
    ],
    "MONITOR_STATUS":
    {
        "Key1": true,
        "Key2": true
    },
    "CUR_MONITOR_STATUS":
    {
        "Key1": true,
        "Key2": true
    }
},
"VEH_DTC_RPT":
{
    "DEV_TIME": "2018-06-18T17:23:52+00:00",
    "TELEMETRY":
    {
        "DEV_NW_CARRIER": "TMUS"
    },
    "GPS_TELEMETRY":
    {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
```

FIG. 84J

```
        "GPS_PDOP": 2,
        "GPS_HACC": 4.44,
        "GPS_VACC": 5.55
      },
      "CODES":
       [
         {
           "STATUS": 1,
           "TYPE": 1,
           "CODE": "String (value)"
         }
       ]
   },
 "VEH_TRIP_RPT":
   {
      "DEV_TIME": "2018-06-18T17:23:52+00:00",
      "GPS_TELEMETRY":
        {
          "GPS_FIX_TIME": "2018-06-18T17:22:52+00:00",
          "GPS_FIX_STATUS": 1,
          "GPS_LAT": 37.8158547,
          "GPS_LON": -122.3725395,
          "GPS_ALT": 100.00,
          "GPS_SPEED": 0.00,
          "GPS_HEADING": 180.111,
          "GPS_NUM_SAT": 8,
          "GPS_HDOP": 2,
          "GPS_VDOP": 2,
          "GPS_PDOP": 2,
          "GPS_HACC": 4.44,
          "GPS_VACC": 5.55
        },
      "TELEMETRY":
        {
          "DEV_NW_CARRIER": "TMUS"
        },
      "START_TIME": "2018-06-18T17:23:52+00:00",
      "END_TIME": "2018-06-18T17:23:52+00:00",
      "DURATION": 100.00,
      "TOTAL_DURATION": 100.00,
      "START_GPS_TELEMETRY":
        {
          "GPS_FIX_TIME": "2018-06-18T17:22:52+00:00",
          "GPS_FIX_STATUS": 1,
          "GPS_LAT": 37.8158547,
          "GPS_LON": -122.3725395,
```

FIG. 84K

```
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
    },
"END_GPS_TELEMETRY":
    {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
    },
"START_VIRT_ODO": 100.00,
"END_VIRT_ODO": 100.00,
"START_REAL_ODO": 100.00,
"END_REAL_ODO": 100.00,
"VIRT_DISTANCE": 100.00,
"REAL_DISTANCE": 100.00,
"VIRT_TOTAL_DISTANCE": 100.00,
"REAL_TOTAL_DISTANCE": 100.00,
"START_FUEL_VOL": 10,
"END_FUEL_VOL": 9,
"START_FUEL_LEVEL": 100.00,
"END_FUEL_LEVEL": 100.00,
"FUEL_CONSUMPTION": 1,
"TOTAL_FUEL_CONSUMPTION": 1,
"VIRT_FUEL_EFFICIENCY": 100.00,
"REAL_FUEL_EFFICIENCY": 100.00,
"AVG_FUEL_EFFICIENCY": 100.00,
"HARSH_EVENTS":
    [
        {
```

FIG. 84L

```
            "EVENT_TYPE": 1,
            "EVENT_TIME": "2018-06-18T17:22:52+00:00",
            "FORCE": 300
         }
      ],
   "IDLING_EVENTS":
      [
         {
            "IDLING_START_TIME": "2018-06-18T17:22:52+00:00",
            "IDLING_END_TIME": "2018-06-18T17:22:52+00:00",
            "IDLING_DURATION": 1.1,
            "GPS_TELEMETRY":
               {
                  "GPS_FIX_TIME": "2018-06-18T17:22:52+00:00",
                  "GPS_FIX_STATUS": 1,
                  "GPS_LAT": 37.8158547,
                  "GPS_LON": -122.3725395,
                  "GPS_ALT": 100.00,
                  "GPS_SPEED": 0.00,
                  "GPS_HEADING": 180.111,
                  "GPS_NUM_SAT": 8,
                  "GPS_HDOP": 2,
                  "GPS_VDOP": 2,
                  "GPS_PDOP": 2,
                  "GPS_HACC": 4.44,
                  "GPS_VACC": 5.55
               }
         }
      ],
   "IDLING_FUEL_CONSUMPTION": 1,
   "MAX_SPEED": 100.00,
   "MAX_RPM": 100.00
},
"PT_ACTIVITY_RPT":
   {
      "DEV_TIME": "2018-06-18T17:23:52+00:00",
      "GPS_TELEMETRY":
         {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
```

FIG. 84M

```
            "GPS_HDOP": 2,
            "GPS_VDOP": 2,
            "GPS_PDOP": 2,
            "GPS_HACC": 4.44,
            "GPS_VACC": 5.55
        },
        "TELEMETRY":
        {
            "DEV_NW_CARRIER": "TMUS"
        },
        "LAST_REPORT_TIME": "2018-06-18T17:23:52+00:00",
        "ACTIVITIES":
        [
            {
                "TYPE": 1,
                "TOTAL_DURATION": 1.1,
                "TIMING":
                [
                    {
                        "START_TIME": "2018-06-18T17:23:52+00:00",
                        "END_TIME": "2018-06-18T17:23:52+00:00",
                        "DURATION": 1.1,
                        "STEP_COUNT": 1
                    }
                ]
            }
        ]
    }
}
```

FIG. 84N

| Field | Value | Hex | Notes |
| --- | --- | --- | --- |
| Payload length | 256 | 0x0100 | Total payload length including this if 256 bytes. |
| Message type | 2 | 0x02 | Server-to-device request message |
| Message sub-type | 1 | 0x01 | Read configuration request |
| Serialization format | 0 | 0x00 | JSON |
| Compression | 0 | 0x00 | Payload data is not compressed |
| Reserved | 0 | 0x00 | |

FIG. 85

Following sample message depicts server-to-device read configuration request message..

```
{
  "ID": "16C47947-3E84-4B31-89E8-714A49410173",
  "PARAMS":
    [
      1234,
      "string"
    ]
}
```

FIG. 86

| Field | Value | Hex | Notes |
|---|---|---|---|
| Payload length | 256 | 0x0100 | Total payload length including this if 256 bytes. |
| Message type | 2 | 0x02 | Server-to-device request message |
| Message sub-type | 2 | 0x02 | Write configuration request |
| Serialization format | 0 | 0x00 | JSON |
| Compression | 0 | 0x00 | Payload data is not compressed |
| Reserved | 0 | 0x00 | |

FIG. 87

The following sample message depicts server-to-device write configuration request message.

```
{
  "ID": "16C47947-3E84-4B31-89E8-714A49410173",
  "PARAMS":
    {
      "PARAM1": 1234,
      "PARAM2": "Value (string)"
    }
}
```

FIG. 88

| Field | Value | Hex | Notes |
|---|---|---|---|
| Payload length | 256 | 0x0100 | Total payload length including this if 256 bytes. |
| Message type | 2 | 0x02 | Server-to-device request message |
| Message sub-type | 3 | 0x03 | On-demand telemetry request |
| Serialization format | 0 | 0x00 | JSON |
| Compression | 0 | 0x00 | Payload data is not compressed |
| Reserved | 0 | 0x00 | |

FIG. 89

The following sample message depicts server-to-device on-demand telemetry request message.

```
{
  "ID": "16C47947-3E84-4B31-89E8-714A49410173",
  "REQUEST_TYPE":
    [
      "TELEMETRY"
    ],
  "REQ_TELEMETRY":
    [
      "DEV_INT_BAT_VOLTAGE",
      "DEV_INT_BAT_LEVEL",
      "DEV_EXT_BAT_VOLTAGE"
    ],
  "REQ_REPORT":
    [
      "ID_RPT",
      "NW_CONN_RPT"
    ]
}
```

FIG. 90

| Field | Value | Hex | Notes |
|---|---|---|---|
| Payload length | 256 | 0x0100 | Total payload length including this if 256 bytes. |
| Message type | 2 | 0x02 | Server-to-device request message |
| Message sub-type | 4 | 0x04 | Command execution request |
| Serialization format | 0 | 0x00 | JSON |
| Compression | 0 | 0x00 | Payload data is not compressed |
| Reserved | 0 | 0x00 | |

FIG. 91

The following sample message depicts server-to-device command execution request message.

```
{
  "ID": "16C47947-3E84-4B31-89E8-714A49410173",
  "COMMANDS":
    [
      {
        "COMMAND_ID": "DEV_REBOOT",
        "PARAMS":
          {
            "Param1": "Value (string)",
            "Param2": "Value (string)"
          }
      }
    ]
}
```

FIG. 92

| Field | Value | Hex | Notes |
|---|---|---|---|
| Payload length | 256 | 0x0100 | Total payload length including this if 256 bytes. |
| Message type | 3 | 0x03 | Server-to-device acknowledgement |
| Message sub-type | 0 | 0x00 | Reserved |
| Serialization format | 0 | 0x00 | JSON |
| Compression | 0 | 0x00 | Payload data is not compressed |
| Reserved | 0 | 0x00 | |

FIG. 93

The following sample message depicts server-to-device acknowledgment message.

```
{
  "ACK_TYPE": 1
}
```

FIG. 94

| Field | Value | Hex | Notes |
|---|---|---|---|
| Payload length | 256 | 0x0100 | Total payload length including this if 256 bytes. |
| Message type | 4 | 0x04 | Device-to-server response message |
| Message sub-type | 1 | 0x01 | Read configuration response message |
| Serialization format | 0 | 0x00 | JSON |
| Compression | 0 | 0x00 | Payload data is not compressed |
| Reserved | 0 | 0x00 | |

FIG. 95

The following sample message depicts device-to-server read configuration response message.

```
{
  "ID": "16C47947-3E84-4B31-89E8-714A49410173",
  "DEV_TIME": "2018-06-18T17:23:52+00:00",
  "ACK_TYPE": 0,
  "PARAMS":
    {
      "DEV_BT_PIN":
        [
          "1234"
        ]
    }
}
```

FIG. 96

| Field | Value | Hex | Notes |
|---|---|---|---|
| Payload length | 256 | 0x0100 | Total payload length including this if 256 bytes. |
| Message type | 4 | 0x04 | Device-to-server response message |
| Message sub-type | 2 | 0x02 | Write configuration response message |
| Serialization format | 0 | 0x00 | JSON |
| Compression | 0 | 0x00 | Payload data is not compressed |
| Reserved | 0 | 0x00 | |

FIG. 97

Following sample message depicts device-to-server write configuration response message.

```
{
  "ID": "16C47947-3E84-4B31-89E8-714A49410173",
  "DEV_TIME": "2018-06-18T17:23:52+00:00",
  "ACK_TYPE": 0,
  "PARAMS":
    {
      "DEV_BT_PIN":
        [
          0
        ]
    }
}
```

FIG. 98

| Field | Value | Hex | Notes |
|---|---|---|---|
| Payload length | 256 | 0x0100 | Total payload length including this if 256 bytes. |
| Message type | 4 | 0x04 | Device-to-server response message |
| Message sub-type | 3 | 0x03 | On-demand telemetry response message |
| Serialization format | 0 | 0x00 | JSON |
| Compression | 0 | 0x00 | Payload data is not compressed |
| Reserved | 0 | 0x00 | |

FIG. 99

The following sample message depicts device-to-server on-demand telemetry response message.

```
{
  "ID": "16C47947-3E84-4B31-89E8-714A49410173",
  "DEV_TIME": "2018-06-18T17:23:52+00:00",
  "TELEMETRY":
    {
      "DEV_NW_CARRIER": "TMUS"
    },
  "ID_RPT":
    {
      "DEV_TIME": "2018-06-18T17:23:52+00:00",
      "TELEMETRY":
        {
          "DEV_NW_CARRIER": "TMUS"
        },
      "GPS_TELEMETRY":
        {
          "GPS_FIX_TIME": "2018-06-18T17:22:52+00:00",
          "GPS_FIX_STATUS": 1,
          "GPS_LAT": 37.8158547,
          "GPS_LON": -122.3725395,
          "GPS_ALT": 100.00,
          "GPS_SPEED": 0.00,
          "GPS_HEADING": 180.111,
          "GPS_NUM_SAT": 8,
          "GPS_HDOP": 2,
          "GPS_VDOP": 2,
          "GPS_PDOP": 2,
          "GPS_HACC": 4.44,
          "GPS_VACC": 5.55
        },
      "HW_VER": "1.0.0001",
      "MCU_FW_VER": "2.0.0002",
      "MODEM_FW_VER": "3.0.0003",
      "SER_NUM": "X19302DSXS",
      "IMEI": "999333534382914",
      "IMSI": "9290-0292-d335-2xg2-66e3",
      "MSISDN": "P51112151414",
      "ICCID": "A125X32321",
      "WIFI_MAC": "00-14-22-01-23-45",
      "BT_MAC": "00-32-41-13-11-53"
    },
  "NW_CONN_RPT":
```

FIG. 100A

```
{
    "DEV_TIME": "2018-06-18T17:23:52+00:00",
    "TELEMETRY":
      {
        "DEV_NW_CARRIER": "TMUS"
      },
    "GPS_TELEMETRY":
      {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
      },
    "NW_CARRIER": "TMUS",
    "NW_CONN_ROAMING": true,
    "NW_CONN_TYPE": 3,
    "NW_CELL_RECORDS":
      [
        {
          "NW_CELL_MCC": 1,
          "NW_CELL_MNC": 1,
          "NW_CELL_ID": "ID",
          "NW_CELL_BAND": "BAND",
          "NW_CELL_ASU": 1,
          "NW_CELL_SIG_STR": 1,
          "NW_CELL_SIG_QTY": "SIGNAL_QUALITY"
        }
      ],
    "NW_BLE_PROX_RECORDS":
      [
        {
          "BLE_ID": "ID",
          "MAC": "00-32-41-13-11-53",
          "BLE_SIG_STR": 1
        }
      ],
    "NW_WIFI_PROX_RECORDS":
```

FIG. 100B

```
        [
            {
                "WIFI_SSID": "SSID",
                "MAC": "00-14-22-01-23-45",
                "SIG_STR": 1
            }
        ]
    },
    "MSG_STAT_RPT":
    {
        "DEV_TIME": "2018-06-18T17:23:52+00:00",
        "TELEMETRY":
        {
            "DEV_NW_CARRIER": "TMUS"
        },
        "GPS_TELEMETRY":
        {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "NUM_EVT_MSG": 1,
        "NUM_RPTS":
        {
            "RPTS1": 1
        },
        "NUM_READ_REQ": 1,
        "NUM_WRITE_REQ": 1,
        "NUM_ONDEMAND_REQ": 1,
        "NUM_CMD_REQ": 1,
        "NUM_ACK_RECV": 1,
        "LAST_MSG_RECV_TIME": "2018-06-18T17:23:52+00:00",
        "LAST_ACK_RECV_TIME": "2018-06-18T17:23:52+00:00",
        "NUM_BYTES_RECV": 1,
        "NUM_BYTES_SENT": 1
    },
```

FIG. 100C

```
"ERROR_RPT":
  {
    "DEV_TIME": "2018-06-18T17:23:52+00:00",
    "TELEMETRY":
      {
        "DEV_NW_CARRIER": "TMUS"
      },
    "GPS_TELEMETRY":
      {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
      },
    "ERROR_DATA":
      [
        {
          "ERROR": "ERROR1",
          "ERROR_TIMESTAMP": "2018-06-18T17:23:52+00:00",
          "ERROR_SEV": 1
        },
        {
          "ERROR": "ERROR2",
          "ERROR_TIMESTAMP": "2018-06-18T17:23:52+00:00",
          "ERROR_SEV": 1
        }
      ]
  },
"WIFI_STAT_RPT":
  {
    "DEV_TIME": "2018-06-18T17:23:52+00:00",
    "TELEMETRY":
      {
        "DEV_NW_CARRIER": "TMUS"
      },
    "GPS_TELEMETRY":
      {
```

FIG. 100D

```
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
      },
   "SSID": "SSID",
   "MAC": "00-14-22-01-23-45",
   "STATUS": true,
   "ROAMING_STATUS": true,
   "PUBLIC_IP": "8.8.8.8",
   "NUM_CLIENTS": 1,
   "DATA_RECV": 1,
   "DATA_SENT": 1,
   "AVG_RECV_SPEED": 1,
   "AVG_SEND_SPEED": 1,
   "CUR_RECV_SPEED": 1,
   "CUR_SEND_SPEED": 1,
   "TOTAL_DATA_RECV": 1,
   "TOTAL_DATA_SENT": 1
 },
"BT_STAT_RPT":
  {
    "DEV_TIME": "2018-06-18T17:23:52+00:00",
    "TELEMETRY":
      {
        "DEV_NW_CARRIER": "TMUS"
      },
    "GPS_TELEMETRY":
      {
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
```

FIG. 100E

```
            "GPS_HDOP": 2,
            "GPS_VDOP": 2,
            "GPS_PDOP": 2,
            "GPS_HACC": 4.44,
            "GPS_VACC": 5.55
        },
        "BT_NAME": "SSID",
        "BT_STATUS": true,
        "BLE_MODE_SUPPORT": 1,
        "BLE_MODE_ENABLED": 1,
        "BLE_PROFILE_SUPPORTED":
            [
                "PROFILE1",
                "PROFILE2"
            ],
        "BLE_SERVICES_SUPPORTED":
            [
                1,
                3,
                8
            ]
    },
    "SMS_RPT":
    {
        "DEV_TIME": "2018-06-18T17:23:52+00:00",
        "TELEMETRY":
            {
                "DEV_NW_CARRIER": "TMUS"
            },
        "GPS_TELEMETRY":
            {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
            },
        "RECV_TIME": "2018-06-18T17:23:52+00:00",
```

FIG. 100F

```
      "RESULT_CODE": 1,
      "CALLER_ID": "CALLER",
      "ENCODING": 1,
      "DATA": "Value (string)"
   },
"GPS_STATUS_RPT":
   {
      "DEV_TIME": "2018-06-18T17:23:52+00:00",
      "TELEMETRY":
         {
            "DEV_NW_CARRIER": "TMUS"
         },
      "GPS_TELEMETRY":
         {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
         },
      "STATUS": true,
      "SATTELITE_DATA":
         [
            {
               "PRN": 1,
               "STATUS": true,
               "SNR": 1.1,
               "AZIMUTH": 1.1
            }
         ]
   },
"DEV_CAP_RPT":
   {
      "DEV_TIME": "2018-06-18T17:23:52+00:00",
      "TELEMETRY":
         {
            "DEV_NW_CARRIER": "TMUS"
         },
```

FIG. 100G

```
            "GPS_TELEMETRY":
               {
                  "GPS_FIX_TIME": "2018-06-18T17:22:52+00:00",
                  "GPS_FIX_STATUS": 1,
                  "GPS_LAT": 37.8158547,
                  "GPS_LON": -122.3725395,
                  "GPS_ALT": 100.00,
                  "GPS_SPEED": 0.00,
                  "GPS_HEADING": 180.111,
                  "GPS_NUM_SAT": 8,
                  "GPS_HDOP": 2,
                  "GPS_VDOP": 2,
                  "GPS_PDOP": 2,
                  "GPS_HACC": 4.44,
                  "GPS_VACC": 5.55
               },
            "CAPABILITIES":
               {
                  "CAPABILITY1": true,
                  "CAPABILITY2":  false
               }
         },
      "ACCL_DATA_RPT":
         {
            "DEV_TIME": "2018-06-18T17:23:52+00:00",
            "REASON": 1,
            "DEV_SUB_REASON": 1,
            "FREQ": 1.1,
            "SAMPLE_INT": 1,
            "ACCL_DATA_RECORDS":
               [
                  {
                     "ACCL_EVENT_TIME":  "2018-06-18T17:23:52+00:00",
                     "ACCL_COLL_TIME": "2018-06-18T17:23:52+00:00",
                     "FORWARD_ACCL":  1.1,
                     "LATERAL_ACCL":  1.1,
                     "VERTICAL_ACCL":  1.1,
                     "GPS_TELEMETRY":
                        {
                           "GPS_FIX_TIME": "2018-06-18T17:22:52+00:00",
                           "GPS_FIX_STATUS": 1,
                           "GPS_LAT": 37.8158547,
                           "GPS_LON": -122.3725395,
                           "GPS_ALT": 100.00,
                           "GPS_SPEED": 0.00,
                           "GPS_HEADING": 180.111,
```

FIG. 100H

```
                    "GPS_NUM_SAT": 8,
                    "GPS_HDOP": 2,
                    "GPS_VDOP": 2,
                    "GPS_PDOP": 2,
                    "GPS_HACC": 4.44,
                    "GPS_VACC": 5.55
                 },
                 "TELEMETRY":
                 {
                     "DEV_INT_BAT_VOLTAGE": 4000
                 }
              }
           ]
       },
   "VEH_ID_RPT":
    {
       "DEV_TIME": "2018-06-18T17:23:52+00:00",
       "GPS_TELEMETRY":
          {
             "GPS_FIX_TIME": "2018-06-18T17:22:52+00:00",
             "GPS_FIX_STATUS": 1,
             "GPS_LAT": 37.8158547,
             "GPS_LON": -122.3725395,
             "GPS_ALT": 100.00,
             "GPS_SPEED": 0.00,
             "GPS_HEADING": 180.111,
             "GPS_NUM_SAT": 8,
             "GPS_HDOP": 2,
             "GPS_VDOP": 2,
             "GPS_PDOP": 2,
             "GPS_HACC": 4.44,
             "GPS_VACC": 5.55
          },
       "TELEMETRY":
          {
             "DEV_NW_CARRIER": "TMUS"
          },
       "VIN": "JTMYRREV40D037644",
       "PROTOCOL": 1,
       "OBD_STANDARD": 1,
       "STANDARD_PID":
          [
             "PID1",
             "PID2"
          ],
       "OEM_PID":
```

FIG. 100I

```
        [
            "PID1",
            "PID2"
        ],
        "MONITOR_STATUS":
        {
            "Key1": true,
            "Key2": true
        },
        "CUR_MONITOR_STATUS":
        {
            "Key1": true,
            "Key2": true
        }
    },
    "VEH_DTC_RPT":
    {
        "DEV_TIME": "2018-06-18T17:23:52+00:00",
        "TELEMETRY":
        {
            "DEV_NW_CARRIER": "TMUS"
        },
        "GPS_TELEMETRY":
        {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "CODES":
        [
            {
                "STATUS": 1,
                "TYPE": 1,
                "CODE": "String (value)"
            }
        ]
```

FIG. 100J

```
        },
    "VEH_TRIP_RPT":
    {
        "DEV_TIME": "2018-06-18T17:23:52+00:00",
        "GPS_TELEMETRY":
            {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
            },
        "TELEMETRY":
            {
                "DEV_NW_CARRIER": "TMUS"
            },
        "START_TIME": "2018-06-18T17:23:52+00:00",
        "END_TIME": "2018-06-18T17:23:52+00:00",
        "DURATION": 100.00,
        "TOTAL_DURATION": 100.00,
        "START_GPS_TELEMETRY":
            {
                "GPS_FIX_TIME": "2018-06-18T17:22:52+00:00",
                "GPS_FIX_STATUS": 1,
                "GPS_LAT": 37.8158547,
                "GPS_LON": -122.3725395,
                "GPS_ALT": 100.00,
                "GPS_SPEED": 0.00,
                "GPS_HEADING": 180.111,
                "GPS_NUM_SAT": 8,
                "GPS_HDOP": 2,
                "GPS_VDOP": 2,
                "GPS_PDOP": 2,
                "GPS_HACC": 4.44,
                "GPS_VACC": 5.55
            },
        "END_GPS_TELEMETRY":
            {
```

FIG. 100K

```
        "GPS_FIX_TIME": "2018-06-18T17:22:52+00:00",
        "GPS_FIX_STATUS": 1,
        "GPS_LAT": 37.8158547,
        "GPS_LON": -122.3725395,
        "GPS_ALT": 100.00,
        "GPS_SPEED": 0.00,
        "GPS_HEADING": 180.111,
        "GPS_NUM_SAT": 8,
        "GPS_HDOP": 2,
        "GPS_VDOP": 2,
        "GPS_PDOP": 2,
        "GPS_HACC": 4.44,
        "GPS_VACC": 5.55
    },
    "START_VIRT_ODO": 100.00,
    "END_VIRT_ODO": 100.00,
    "START_REAL_ODO": 100.00,
    "END_REAL_ODO": 100.00,
    "VIRT_DISTANCE": 100.00,
    "REAL_DISTANCE": 100.00,
    "VIRT_TOTAL_DISTANCE": 100.00,
    "REAL_TOTAL_DISTANCE": 100.00,
    "START_FUEL_VOL": 10,
    "END_FUEL_VOL": 9,
    "START_FUEL_LEVEL": 100.00,
    "END_FUEL_LEVEL": 100.00,
    "FUEL_CONSUMPTION": 1,
    "TOTAL_FUEL_CONSUMPTION": 1,
    "VIRT_FUEL_EFFICIENCY": 100.00,
    "REAL_FUEL_EFFICIENCY": 100.00,
    "AVG_FUEL_EFFICIENCY": 100.00,
    "HARSH_EVENTS":
     [
       {
         "EVENT_TYPE": 1,
         "EVENT_TIME": "2018-06-18T17:22:52+00:00",
         "FORCE": 300
       }
     ],
    "IDLING_EVENTS":
     [
       {
         "IDLING_START_TIME": "2018-06-18T17: 22:52+00:00",
         "IDLING_END_TIME": "2018-06-18T17:22:52+00:00",
         "IDLING_DURATION": 1.1,
         "GPS_TELEMETRY":
```

FIG. 100L

```
                {
                    "GPS_FIX_TIME": "2018-06-18T17:22:52+00:00",
                    "GPS_FIX_STATUS": 1,
                    "GPS_LAT": 37.8158547,
                    "GPS_LON": -122.3725395,
                    "GPS_ALT": 100.00,
                    "GPS_SPEED": 0.00,
                    "GPS_HEADING": 180.111,
                    "GPS_NUM_SAT": 8,
                    "GPS_HDOP": 2,
                    "GPS_VDOP": 2,
                    "GPS_PDOP": 2,
                    "GPS_HACC": 4.44,
                    "GPS_VACC": 5.55
                }
            }
        ],
        "IDLING_FUEL_CONSUMPTION": 1,
        "MAX_SPEED": 100.00,
        "MAX_RPM": 100.00
    },
    "PT_ACTIVITY_RPT":
    {
        "DEV_TIME": "2018-06-18T17:23:52+00:00",
        "GPS_TELEMETRY":
        {
            "GPS_FIX_TIME": "2018-06-18T17:22:52+00:00",
            "GPS_FIX_STATUS": 1,
            "GPS_LAT": 37.8158547,
            "GPS_LON": -122.3725395,
            "GPS_ALT": 100.00,
            "GPS_SPEED": 0.00,
            "GPS_HEADING": 180.111,
            "GPS_NUM_SAT": 8,
            "GPS_HDOP": 2,
            "GPS_VDOP": 2,
            "GPS_PDOP": 2,
            "GPS_HACC": 4.44,
            "GPS_VACC": 5.55
        },
        "TELEMETRY":
        {
            "DEV_NW_CARRIER": "TMUS"
        },
        "LAST_REPORT_TIME": "2018-06-18T17:23:52+00:00",
        "ACTIVITIES":
```

FIG. 100M

```
[
    {
        "TYPE": 1,
        "TOTAL_DURATION": 1.1,
        "TIMING":
        [
            {
                "START_TIME": "2018-06-18T17:23:52+00:00",
                "END_TIME": "2018-06-18T17:23:52+00:00",
                "DURATION": 1.1,
                "STEP_COUNT": 1
            }
        ]
    }
]
```

FIG. 100N

| Field | Value | Hex | Notes |
|---|---|---|---|
| Payload length | 256 | 0x0100 | Total payload length including this if 256 bytes. |
| Message type | 4 | 0x04 | Device-to-server response message |
| Message sub-type | 4 | 0x04 | Command execution response message |
| Serialization format | 0 | 0x00 | JSON |
| Compression | 0 | 0x00 | Payload data is not compressed |
| Reserved | 0 | 0x00 | |

FIG. 101

```
{
  "ID": "16C47947-3E84-4B31-89E8-714A49410173",
  "DEV_TIME": "2018-06-18T17:23:52+00:00",
  "ACK_TYPE": 1,
  "COMMANDS_STATUS":
    [
      {
        "COMMAND_ID": "DEV_REBOOT",
        "STATUS": 0,
        "ERROR": ""
      }
    ]
}
```

The following sample message depicts device-to-server command execution response message.

FIG. 102

| Field | Value | Hex | Notes |
|---|---|---|---|
| Payload length | 256 | 0x0100 | Total payload length including this if 256 bytes. |
| Message type | 5 | 0x05 | Device-to-server request message |
| Message sub-type | 0 | 0x00 | Reserved |
| Serialization format | 0 | 0x00 | JSON |
| Compression | 0 | 0x00 | Payload data is not compressed |
| Reserved | 0 | 0x00 | |

FIG. 103

The following sample message depicts device-to-server request message.

```
{
  "ID": "16C47947-3E84-4B31-89E8-714A49410173",
  "DEV_TIME": "2018-06-18T17:23:52+00:00",
  "REQUESTS":
    [
      {
        "REQUEST_ID": "ID1",
        "PARAMS":
          {
```

FIG. 104A

```
              "Param1":  "Value (string)",
              "Param2":  "Value (string)"
           }
       },
       {
          "REQUEST_ID": "ID2",
          "PARAMS":
           {
              "Param1":  "Value (string)",
              "Param2":  "Value (string)"
           }
       }
     ]
}
```

FIG. 104B

| Field | Value | Hex | Notes |
|---|---|---|---|
| Payload length | 256 | 0x0100 | Total payload length including this if 256 bytes. |
| Message type | 6 | 0x06 | Server-to-device response message |
| Message sub-type | 0 | 0x00 | Reserved |
| Serialization format | 0 | 0x00 | JSON |
| Compression | 0 | 0x00 | Payload data is not compressed |
| Reserved | 0 | 0x00 | |

FIG. 105

The following sample message depicts server-to-device response message.

```
{
  "ID": "16C47947-3E84-4B31-89E8-714A49410173",
  "ACK_TYPE": ["TYPE1"],
  "RESP_REQUESTS":
    {
      "REQ_ID1":
      {
        "STATUS": 0,
        "RESPONSE":
          {
            "RESP1": "Value (string)",
            "RESP2": "Value (string)"
          }
      },
      "REQ_ID2":
      {
        "STATUS": 0,
        "RESPONSE":
          {
            "RESP1": "Value (string)",
            "RESP2": "Value (string)"
          }
      }
    }
}
```

FIG. 106

HOMOGENIZATION OF TELEMATICS DATA THROUGH UNIFIED MESSAGING PROTOCOL

CROSS-REFERENCE TO RELATED APPLICATIONS

The present application claims the benefit of and priority to U.S. provisional patent application No. 62/701,951, titled TELEMATICS DATA HOMOGENIZATION SYSTEM AND METHOD, filed Jul. 23, 2018, the entire contents of which are incorporated herein by reference for all purposes.

BACKGROUND

Communication protocols define a set of rules, syntax, and procedures by which computing devices communicate with each other. Two or more communication protocols may be used in combination with each other, which may be referred to as a protocol stack or suite. Such protocols may be organized as different layers of a protocol stack. For example, a protocol stack may include an application protocol, a transport protocol, a messaging protocol, and a link protocol, each forming a different layer of the protocol stack. Within the context of Internet communications, an example protocol stack includes at least the Internet Protocol (IP) as a messaging protocol and the Transmission Control Protocol (TCP) or the User Datagram Protocol (UDP) as a transport layer protocol.

SUMMARY

A messaging protocol supporting the homogenization of telematics data across a variety of remote monitoring contexts is disclosed. For example, different remote monitoring contexts may include vehicle monitoring and pet monitoring. The messaging protocol includes client-side and server-side implementations.

In an example, a mobile computing device obtains sensor measurements from a set of sensors; formats a set of one or more outbound messages according to a messaging protocol defined in which each outbound message includes a header and a payload containing data that is based on the sensor measurements. The header may contain a sequence identifier that identifies a relative order of the outbound message in a sequence of the set of outbound messages. The mobile computing device transmits the set of outbound messages via a wireless communications interface over a wireless communications network directed to a target computing device, such as a server.

In another example, a server a server system of one or more server computing devices receives multiple inbound messages from a mobile computing device over a communications network having a wireless network component, wherein a header of each of the multiple inbound messages includes a sequence identifier that identifies a relative order of that inbound message in a sequence of the multiple inbound messages. The server system stores data contained within each of the multiple inbound messages in a persistent data storage device. Following storage of the data contained within each of the multiple inbound messages, the server system transmits an acknowledgement message indicating a sequence identifier of a last received inbound message of the multiple inbound messages.

This summary includes only some of the concepts disclosed in greater detail by the following detailed description and associated drawings. As such, claimed subject matter is not limited to the contents of this summary.

BRIEF DESCRIPTION OF THE DRAWINGS

FIGS. 5A and 5B depict a table that describes the message header to be used while using direct UDP/TCP connections to the platform service's servers.

FIG. 6 depicts a structure for published pub/sub messages.

FIGS. 7A and 7B depict a table describing a payload header.

FIG. 8 depicts a table describing a data structure for event messages.

FIGS. 9A and 9B depict a table describing common events for devices.

FIGS. 10A and 10B depict a table describing a GPS-TELEMETRY record structure.

FIGS. 11A, 11B, 11C, and 11D depict a table describing telemetries.

FIG. 12 depicts a table describing an ID report structure.

FIG. 13 depicts a table describing an ID report record structure.

FIG. 14 depicts a table describing a network connectivity report structure.

FIG. 15 depicts a table describing a network connectivity record structure.

FIG. 16 depicts a table describing fields of NW_CELL_RECORDS.

FIG. 17 depicts a table describing a structure for NW_BLE_PROX_RECORDS.

FIG. 18 depicts a table describing a structure for NW_WI-FI_PROX_RECORDS.

FIG. 19 depicts a table describing a message statistics report structure.

FIGS. 20A and 20B depict a table describing a message statistics record structure.

FIG. 21 depicts a table describing an error report structure.

FIG. 22 depicts a table describing an error record structure.

FIGS. 23A and 23B depict tables describing an ERROR-DATA list structure.

FIG. 24 depicts a table describing a Wi-Fi hotspot statistics report structure.

FIGS. 25A and 25B depict a table describing a Wi-Fi hotspot statistics record structure.

FIG. 26 depicts a table describing a Bluetooth report structure.

FIGS. 27A and 27B depict a table describing a Bluetooth record structure.

FIG. 28 depicts a table describing an SMS report structure.

FIG. 29 depicts a table describing an SMS record structure.

FIG. 30 depicts a table describing a GPS status report structure.

FIG. 31 depicts a table describing a GPS status record structure.

FIG. 32 depicts a table describing a SATTELITE-DATA list structure.

FIG. 33 depicts a table describing a device compatibility report structure.

FIG. 34 depicts a table describing a device capability record structure.

FIG. 35 depicts a table describing an accelerometer report structure.

FIG. 36 depicts a table describing an accelerometer alignment record structure.

FIG. 37 depicts a table describing an accelerometer data record structure.

FIG. 38 depicts a table describing a configuration read request structure

FIG. 39 depicts a table describing a configuration write request structure.

FIGS. 40A, 40B, 40C, 40D, 40E, 40F, 40G, 40H, 40I 40J, 40K, and 40L depict a table describing common configuration parameters.

FIG. 41 depicts a table describing an on-demand data request message structure.

FIG. 42 depicts a table describing a command execution request message structure.

FIG. 43 depicts a table describing a command execution request record structure.

FIGS. 44A, 44B, and 44C depict a table describing common commands supported.

FIG. 45 depicts a table describing an ACK-TYPE structure.

FIG. 46 depicts a table describing a device-to-server configuration read request response structure.

FIGS. 47A and 47B depict a table describing a device-to-server configuration write-request response structure.

FIG. 48 depicts a table describing a params map structure.

FIGS. 49A and 49B depict a table describing an on-demand telemetry request's response structure.

FIG. 50 depicts a table describing a command execution request message structure.

FIG. 51 depicts a table describing a command execution status record structure.

FIG. 52 depicts a table describing a device-to-server request message structure.

FIG. 53 depicts a table describing a request record structure.

FIG. 54 depicts a table describing requests a device can send to servers.

FIG. 55 depicts a table describing a device-to-server request message structure.

FIG. 56 depicts a table describing a RESP-REQUEST map record structure.

FIG. 57 depicts a table describing responses for each REQUST-ID.

FIGS. 58A, 58B, and 58C depict a table describing OBD-II device-specific events.

FIGS. 59A, 59B, 59C, 59D, and 59E depict a table describing a OBD-II vehicle device-specific telemetries.

FIG. 60 depicts a table describing a vehicle identification report structure.

FIGS. 61A, 61B, 61C, and 61D depict a table describing a vehicle identification record structure.

FIGS. 62A and 62B depict a table describing each component of DTCs.

FIG. 63 depicts a table describing a vehicle identification report structure.

FIG. 64 depicts a table describing a VEH-DTC-RPT record structure.

FIG. 65 depicts a table describing a CODES list record structure.

FIG. 66 depicts a table describing a trip summary report message structure.

FIGS. 67A, 67B, 67C, and 67D depict a table describing a VEH-TRIP-RPT record structure.

FIG. 68 depicts a table describing a HARSH-EVENT record structure.

FIG. 69 depicts a table describing an IDLING-EVENT record structure.

FIGS. 70A, 70B, 70C, and 70D depict a table describing OBD-II—Vehicle device-type configuration parameters.

FIG. 71 depicts a table describing OBD-II—Vehicle device-type commands.

FIG. 72 depicts a table describing pet tracker device-type-specific events.

FIG. 73 depicts a table describing an activity report structure.

FIG. 74 depicts a table describing a PT-ACTIVITY-RPT record structure.

FIG. 75 depicts a table describing an activities record structure.

FIG. 76 depicts a table describing a timing record structure.

FIG. 77 depicts a table describing configuration parameters.

FIG. 78 depicts a table describing device-specific commands.

FIGS. 79A, 79B, and 79C depict a table describing types of measurement fields.

FIG. 80 depicts a table describing a sample message header.

FIGS. 81A and 81B depict a table describing a Device-to-Server Event Message structure.

FIG. 82 depicts an example Device-to-Server Event Message.

FIG. 83 depicts a table describing a Device-to-Server Report Message structure.

FIGS. 84A, 84B, 84C, 84D, 84E, 84F, 84G, 84H, 84I, 84J, 84K, 84L, 84M, and 84N depict a Device-to-Server Report Message.

FIG. 85 depicts a table describing a Server-to-Device Read Configuration Request Message structure.

FIG. 86 depicts a table describing a Server-to-Device Read Configuration Request Message.

FIG. 87 depicts a table describing a Server-to-Device Write Configuration Request Message.

FIG. 88 depicts a Server-to-Device Write Configuration Request Message.

FIG. 89 depicts a table describing a Server-to-Device On-demand Telemetry Request Message structure.

FIG. 90 depicts a Server-to-Device On-demand Telemetry Request Message.

FIG. 91 depicts a table describing a Server-to-Device Command Execution Request Message structure.

FIG. 92 depicts a Server-to-Device Command Execution Request Message.

FIG. 93 depicts a table describing a Server-to-Device Acknowledgement Message structure.

FIG. 94 depicts a Server-to-Device Acknowledgment Message.

FIG. 95 depicts a table describing a Device-to-Server Read Configuration Response Message structure.

FIG. 96 depicts a Device-to-Server Read Configuration Response message.

FIG. 97 depicts a table describing a Device-to-Server Write Configuration Response Message structure.

FIG. 98 depicts a Device-to-Server Write Configuration Response Message.

FIG. 99 depicts a table describing a Device-to-Server On-demand Telemetry Response Message structure.

FIGS. 100A, 100B, 100C, 100D, 100E, 100F, 100G, 100H, 100I, 100J, 100K, 100L, 100M, and 100N depict a Device-to-server On-demand Telemetry Response Message.

FIG. 101 depicts a table describing a Device-to-Server Command Execution Response Message structure.

FIG. 102 depicts a Device-to-Server Command Execution Response Message.

FIG. 103 depicts a table describing a Device-to-Server Request Message structure.

FIGS. 104A and 104B depict a Device-to-Server Request Message.

FIG. 105 depicts a table describing a Server-to-Device Response Message structure.

FIG. 106 depicts a Server-to-Device Response Message.

DETAILED DESCRIPTION

A messaging protocol supporting the homogenization of telematics data across a variety of remote monitoring contexts is disclosed. For example, different remote monitoring contexts may include vehicle monitoring and pet monitoring. However, other contexts may be supported. These contexts may be indicated by a predefined prefix within the message format defined by the messaging protocol. The messaging protocol includes client-side and server-side implementations.

The use of different protocols by different devices can introduce challenges when trying to support various devices using the same service. An additional challenge arises when the different devices are attached to real-world objects of very different kinds (e.g. pets vs. vehicles). The disclosed messaging protocol may be referred to as a unified messaging protocol for communication between the device and the cloud (or other) service that the device is configured to work with. Some aspects of the messaging protocol are applicable to different types of mobile objects, such as pets and vehicles. The messaging protocol also defines some specific aspects that are specific to either pets or vehicles. A platform formed by a client and service implemented at a server system enables secure communication between connected IoT devices and authenticated recipients to deliver valuable and actionable data. The disclosed messaging protocol further enables clients to interface with the service and securely report or access data.

Figure 1:
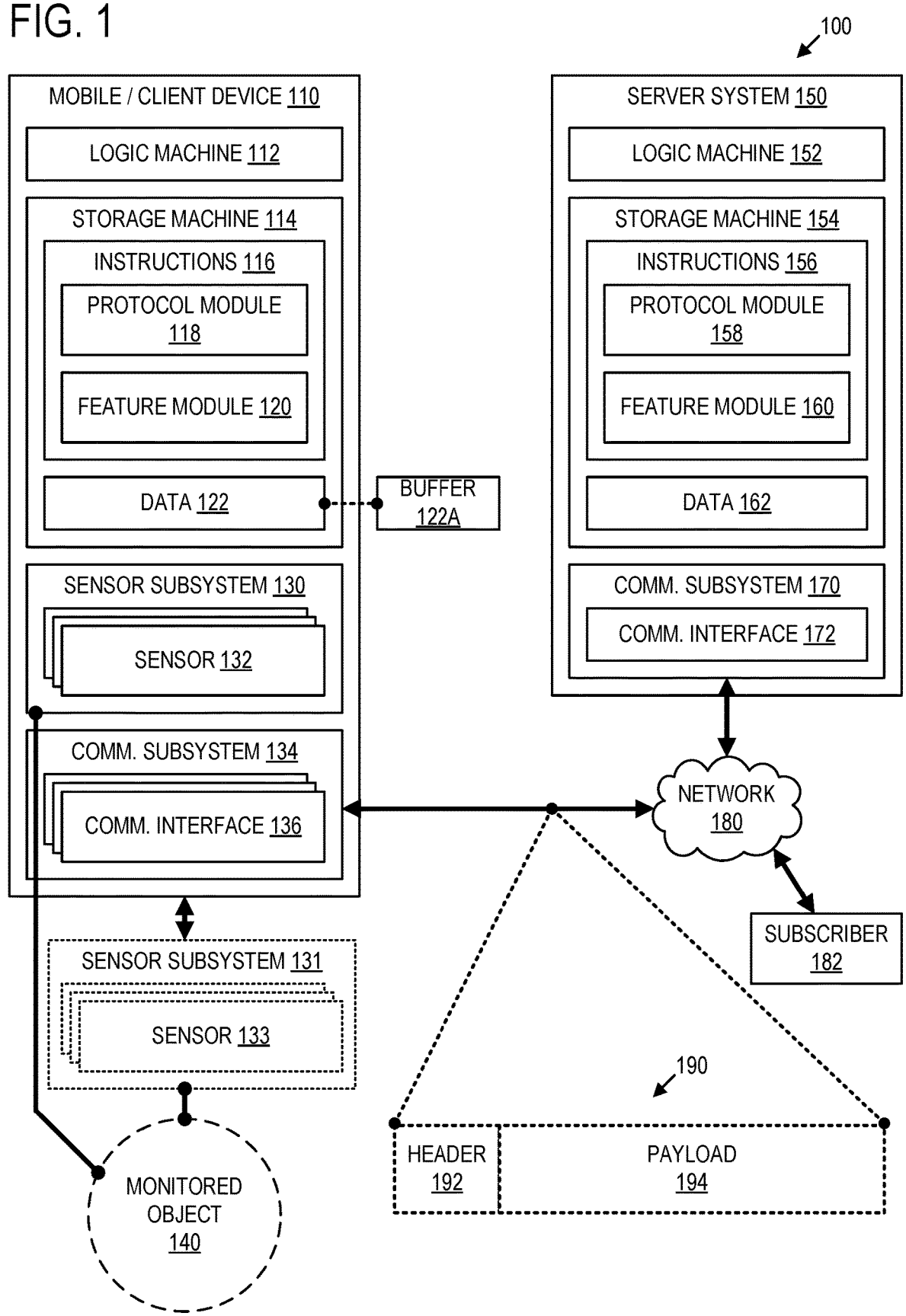
FIG. 1 is a schematic diagram depicting an example computing system.

FIG. 1 depicts an example computing system 100 including a plurality of computing devices of which client computing device 110 (alternatively referred to as a client device, mobile computing device, mobile device, or monitoring device) and a server system 150 of one or more server computing devices are provided. Client device 110 may be deployed to monitor a mobile object 140, such as a vehicle (or other machine) or a pet (or person or other organism). FIG. 1 schematically depicts an example message 190 of a messaging protocol layer that may be used by client device 110 and server system 150 to communicate over a communications network 180. Message 190 includes a header 192 and a payload 194 having a format defined by a messaging protocol, described in further detail with reference to FIG. 2.

Client device 110 includes a logic machine 112 and data storage machine 114. Storage machine 114 may include instructions 116 stored thereon that are executable by logic machine 112. Instructions 116 may include a protocol module 118 that defines aspects of one or more protocols that may be implemented by client device 110, including the messaging protocol and the various other protocols described herein. In an example, protocol module 118 may be referred to as a client-side protocol module for implementing a client-side portion of the supported protocols. Instructions 116 may include a feature module 120 that defines aspects of one or more client-side features, including one or more applications, for example. Storage machine 114 may include data 122 stored thereon that may include raw data, messages, sensor measurement data, event data, user setting, and/or other suitable data, as examples. At least some of data 122 may be stored in a buffer 122A of storage machine 114 as described in further detail with reference to FIG. 4. Buffer 122A may represent a plurality of buffers in at least some implementations. For example, device 110 may maintain a high frequency buffer and a low frequency buffer as described in further detail herein.

Sensor measurements may be obtained via a sensor subsystem 130 that may form part of client device 110 or an off-board sensor system 131 that is communicatively coupled with client device 110. Sensor subsystems 130/131 may each include a set of one or more sensors, such as example sensors 132 and 133, respectively. Client device 110 may include an electronic interface to communicate with the sensors of sensor subsystems 130/131. This electronic interface may support wired and/or wireless communications with sensors. In an example, this electronic interface may form part of a communications subsystem 134 having one or more communication interfaces, of which communication interface 136 is an example. In an example, communication interface 136 is a wireless communication interface, however, wired communications may be alternatively or additionally supported. Client device may communicate with other devices (e.g., server system 150) over communications network 180 via a communication interface of communications subsystem 134.

Server system 150 includes a logic machine 152 and data storage machine 154. Storage machine 154 may include instructions 156 stored thereon that are executable by logic machine 152. Instructions 156 may include a protocol module 158 that defines aspects of one or more protocols that may be implemented by server system 150, including the messaging protocol and the various other protocols described herein. In an example, protocol module 158 may be referred to as a server-side protocol module for implementing a server-side portion of the supported protocols. Instructions 156 may include a feature module 160 that defines aspects of one or more server-side features, including one or more applications, for example. Storage machine 154 may include data 162 stored thereon that may include data (e.g., sensor measurements or events) reported by client device 110, as an example. Server system 150 includes a communications subsystem 170 having one or more communication interfaces of which communication interface 172 is an example. Server system 150 may communicate with other devices (e.g., client 110 or subscriber device 180) over communications network 180 via communication interface 172 of communications subsystem 134. For example, server system 150 may receive sensor measurements and/or event reports from client device 110 via message 190, may process that information, and send processed forms of the information to subscriber device 182 via network 180. Additional aspects of client device 110 and server system 150 will be described in further detail at the conclusion of the Detailed Description.

Figure 2:
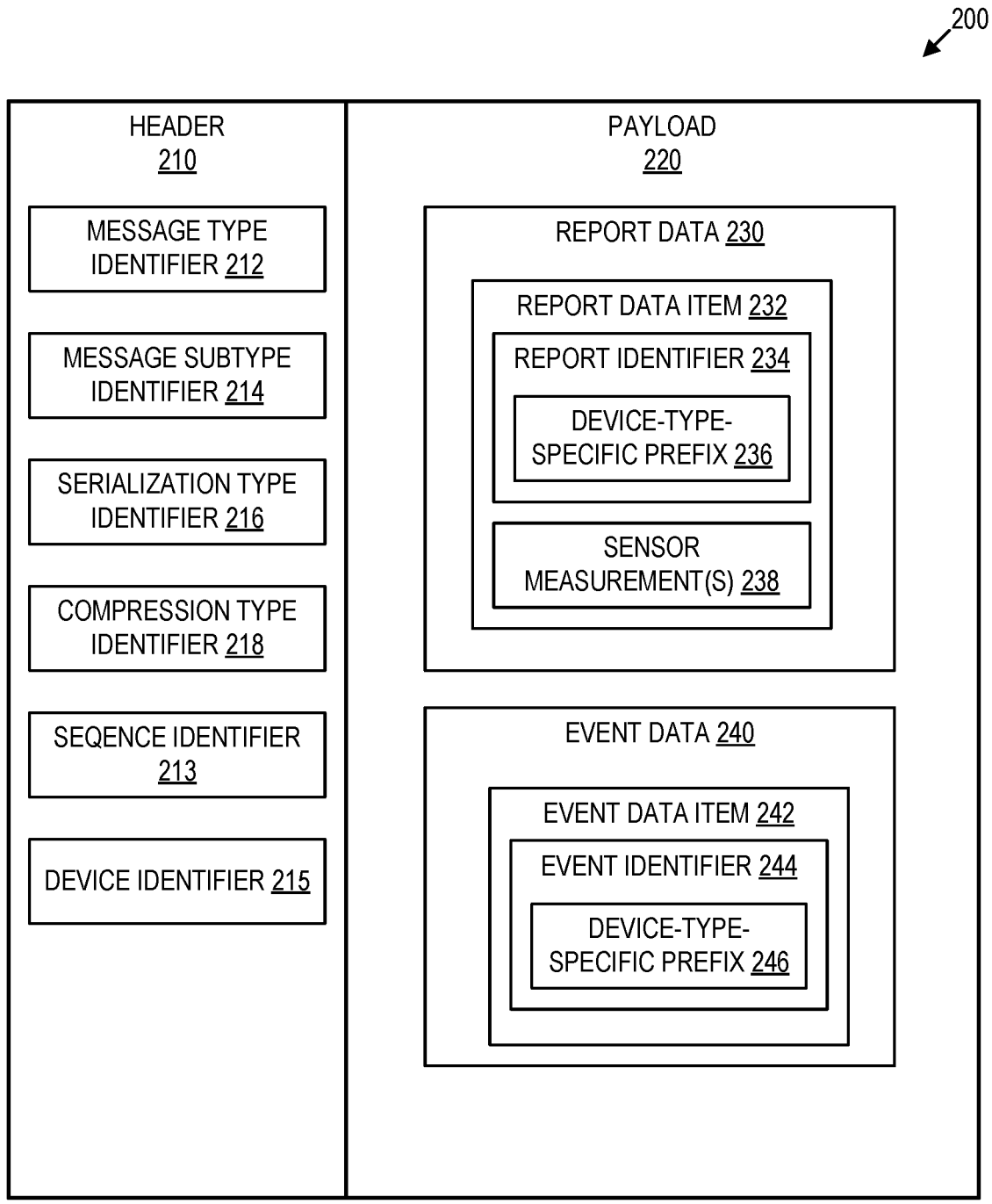
FIG. 2 depicts an example message that may be formatted by a computing device according to the messaging protocol disclosed herein.

FIG. 2 depicts an example message 200 that may be formatted by a computing device according to the messaging protocol disclosed herein. Message 200 is an example of previously described message 190 of FIG. 1. Message 200 includes a header 210 containing header data and a payload 220 containing payload data.

Header data of header 210 includes one or more of a message type identifier 212 selected from a plurality of available message types, a message subtype identifier 214 selected from a plurality of available message subtypes, a serialization type identifier 216 that identifies a select serialization format of the payload data of payload 220 of a plurality of supported serialization formats, a compression type identifier 218 that identifies a select compression format of the payload data of payload 220 of a plurality of supported compression formats, a sequence identifier 213 that identifies a relative order of message 200 in a sequence of messages, and a device identifier 215 indicating an identifier associated with the computing device (e.g., device 110 of FIG. 1) that prepares and/or sends the message, as described in further detail herein with respect to the messaging protocol and the supported features of the service. For example, header 210 is set forth in further detail in Section 3.1 of the messaging protocol specification; and message type identifiers are set forth in further detail in Sections 3.4.1, 3.4.2, 3.4.3, 3.4.4, 3.4.5, 3.4.6 of the messaging protocol specification.

Payload data of payload 220 may include one or more of report data 230 (e.g., of a report message subtype) formed by a set of one or more report data items 232 and/or event data 240 (e.g., of an event message subtype) formed by a set of one or more event data items 242, among other types of payload data described herein.

Each report data item 232 may represent or include information indicating one or more sensor measurements 238. Each report data item 232 may include a report identifier 234 selected from a plurality of predefined report identifiers in which at least some of the predefined report identifiers each have a device-type-specific prefix 236 (e.g., DEV prefix, such as "VEH" and "PT" prefixes of the messaging protocol specification) that identifies a class of a mobile object being monitored and/or a type of device monitoring the mobile object, as described in further detail herein with respect to the messaging protocol and the supported features of the service. Device-type-specific details are set forth in further detail in Section 3.5 of the messaging protocol specification. In at least some examples, the device-type-specific prefix of the predefined report identifiers is selected from a set of two or more predefined device-type-specific prefixes. For example, the set of two or more predefined device-type-specific prefixes includes at least a vehicle-indicating prefix (e.g., "VEH") and an asset tracker-indicating prefix (e.g., "PT").

Each event data item 240 represents satisfaction of a corresponding event condition, such as by sensor measurements, as an example. Event data 242 may include an event identifier 244 selected from a plurality of predefined event identifiers in which at least some of the predefined event identifiers each have a device-type-specific prefix 246 that identifies a class of the mobile object being monitored and/or a type of device monitoring the mobile object, as described in further detail herein with respect to the messaging protocol and supported features of the service. Device-type-specific details are set forth in further detail in Section 3.5 of the messaging protocol specification. In at least some examples, the device-type-specific prefix of the predefined event identifiers is selected from a set of two or more predefined device-type-specific prefixes. For example, the set of two or more predefined device-type-specific prefixes includes at least a vehicle-indicating prefix (e.g., "VEH") and an asset tracker-indicating prefix (e.g., "PT").

Figure 3A:
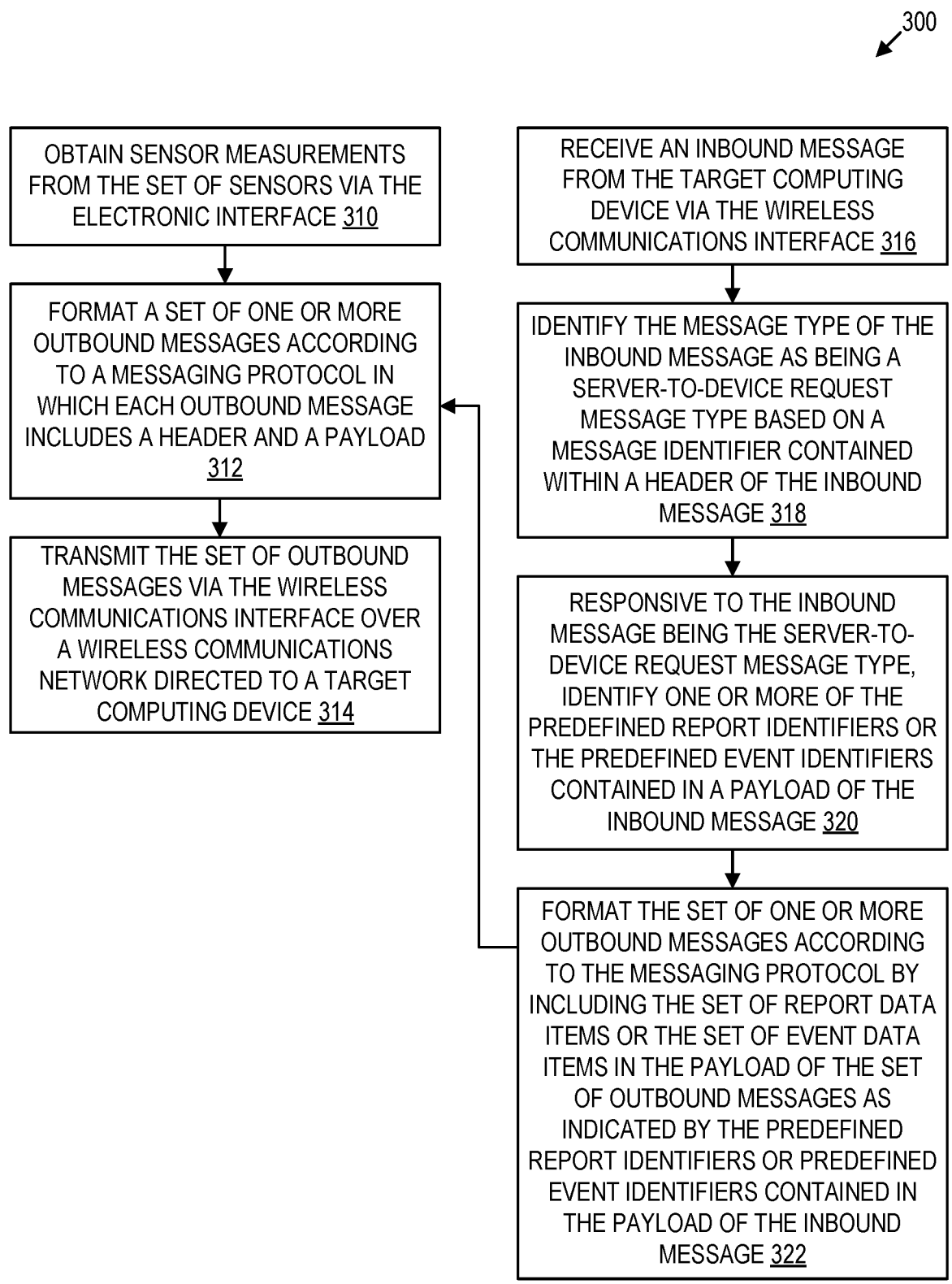
FIG. 3A depicts an example method, which may be performed by a mobile computing device or client computing device executing instructions that include the messaging protocol disclosed herein.

FIG. 3A depicts an example method 300, which may be performed by a mobile computing device or client computing device executing instructions that include a messaging protocol, such as described herein. Such instructions may refer to instructions 116 and the messaging protocol may be defined by protocol module 118 of FIG. 1. At 310, the method includes obtaining sensor measurements from a set of sensors via an electronic interface. The set of sensors may refer sensor subsystem 130 or 131 of FIG. 1. At 312, the method includes formatting a set of one or more outbound messages according to a messaging protocol (such as the messaging protocol described herein) in which each outbound message includes a header and a payload, such as previously described with reference to FIG. 2. At 314, the method includes transmitting the set of outbound messages via the wireless communications interface over a wireless communications network directed to a target computing device. The target computing device may include a server system, such as server system 150 of FIG. 1. At 316, the method includes receiving an inbound message from the target computing device (e.g., server system) via the wireless communications interface. At 318, the method includes identifying the message type of the inbound message as being a server-to-device request message type based on a message identifier contained within a header of the inbound message. Example server-to-device request message types are described in further detail with reference to the messaging protocol of FIGS. 5A-106. At 320, the method includes, responsive to the inbound message being the server-to-device request message type, identify one or more of the predefined report identifiers or the predefined event identifiers contained in a payload of the inbound message. These predefined report identifiers and predefined event identifiers are also described in further detail with reference to the messaging protocol of FIGS. 5A-106. At 322, the method includes, formatting the set of one or more outbound messages (e.g., at 312 or a subsequent set of outbound messages) according to the messaging protocol by including the set of report data items or the set of event data items in the payload of the set of outbound messages as indicated by the predefined report identifiers or predefined event identifiers contained in the payload of the inbound message.

Figure 3B:
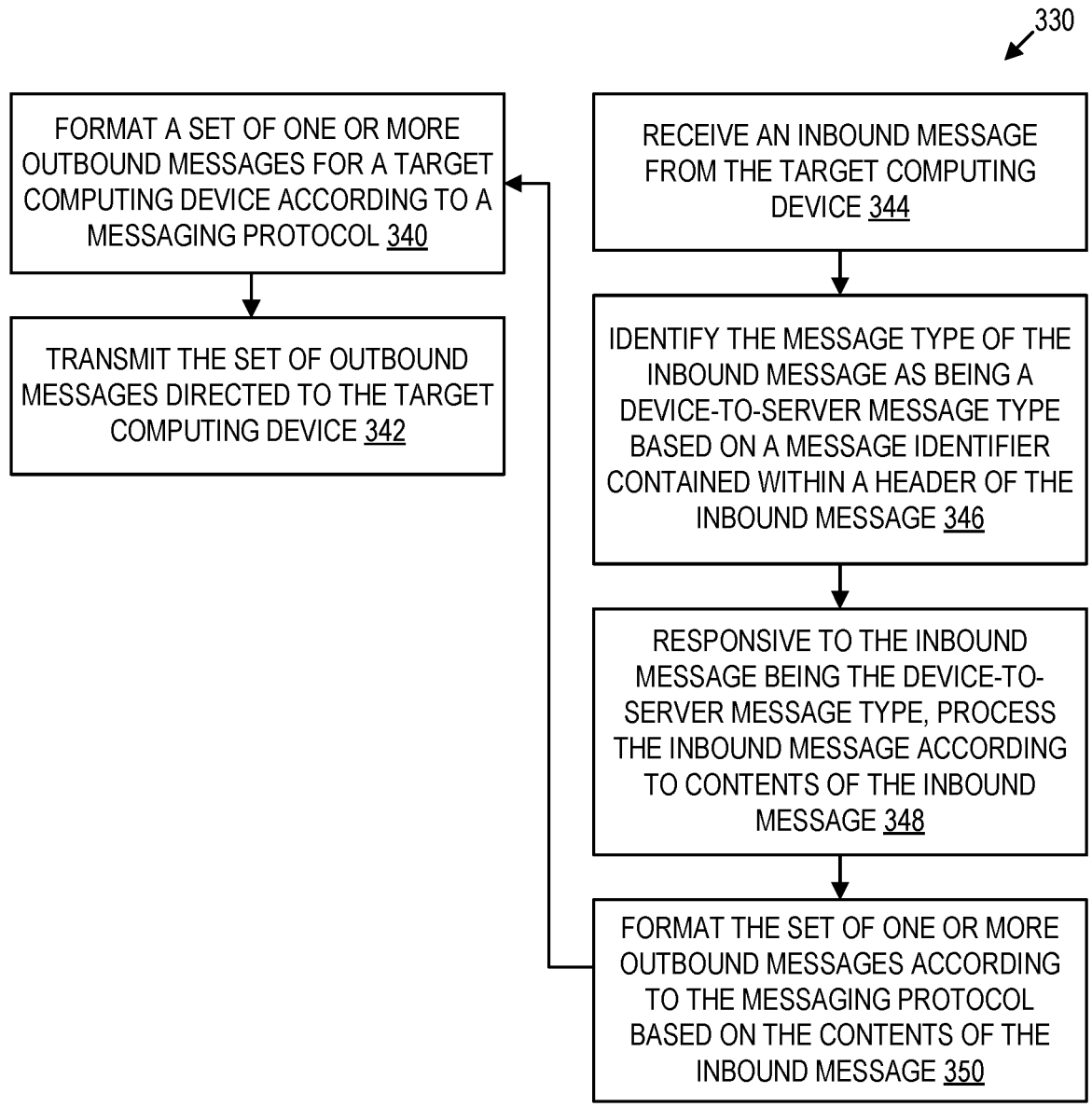
FIG. 3B depicts an example method, which may be performed by a server system executing instructions that include the messaging protocol disclosed herein.

FIG. 3B depicts an example method 340, which may be performed by a server system executing instructions that include a messaging protocol, such as described herein. Such instructions may refer to instructions 156 and the messaging protocol may be defined by protocol module 158 of FIG. 1. At 340, the method includes formatting a set of one or more outbound messages for a target computing device (e.g., a client or mobile computing device) according to a messaging protocol. Example message formats are described in further detail with reference to the messaging protocol of FIGS. 5A-106. At 342, the method includes transmitting the set of outbound messages directed to the target computing device. The inbound message received at 316 of FIG. 3A is an example of an outbound message transmitted at 342 of FIG. 3B. At 344, the method includes receiving an inbound message from the target computing device. The inbound message received at 344 of FIG. 3B is an example of an outbound message transmitted at 314 of FIG. 3A. At 346, the method includes identifying the message type of the inbound message as being a device-to-server message type and/or subtype based on a message identifier contained within a header of the inbound message.

At 348, the method includes, responsive to the inbound message being the device-to-server message type, processing the inbound message according to the contents of the inbound message (including the header and the payload). Example server-to-device request message headers and payloads are described in further detail with reference to the messaging protocol of FIGS. 5A-106. In an example, processing the inbound message according to the contents of the inbound message based on the messaging protocol further includes processing the inbound message according to the device-type-specific prefix of the predefined event identifiers and/or the device-type-specific prefix of the predefined report identifiers. For example, data received from a first class of device indicated by a first device-type-specific identifier may be processed differently than data received from a second class of device indicated by a second device-type-specific identifier. Such different processing may include directing the data to different processing modules and/or server devices, selectively filtering and/or applying thresholds or functions to such data or processed portions thereof, and selectively storing and/or reporting such data or processed portions thereof to subscribers, etc.

At 350, the method includes formatting the set of one or more outbound messages (e.g., at 310 or a subsequent set of outbound messages) according to the messaging protocol based on the contents of the inbound message received at 344.

Aspects of the messaging protocol and associated transport protocols are described in further detail below.

1. Introduction

The platform enables secure communication between connected IoT devices and authenticated recipients to deliver valuable and actionable data. The messaging protocol specification and associated transport layer protocols for interfacing with the platform's service and securely accessing its data follows.

2. Transport Layer

There are various ways to connect with the platform's service. This includes setting up direct connections or using the publish/subscribe model. The direct communication method connects clients directly to servers using internet protocol (IP) addresses and port numbers. Supported direct-connection methods include TLS (transport layer security) over TCP (transmission control protocol) and DTLS (datagram transport layer security) over UDP (user datagram protocol) as well as TCP and UDP directly. In an example, DTLS over UDP may be deployed because of its simplicity, scalability, and security. Note that transport layer here includes session-layer applications that provide an envelope to exchange messages between servers and devices.

2.1 Overview of TLS and DTLS

TLS is the most widely deployed internet protocol for securing network traffic and is widely used for protecting Web traffic and for email. While a brief overview of the TLS protocol and how it is used in the protocol specification is provided here, this document does not attempt to provide full details of the TLS protocol and its sub-components. For more on TLS 1.2, please refer to RFC 5246 (TLS 1.2).

TLS and DTLS are designed to provide privacy and data integrity between two or more communicating identity parties (typically server and client). When a connection is secured by TLS/DTLS, the connection between the two parties will have one or more of the following properties: (1) The identity of the communicating parties can be authenticated using public-key cryptography; (2) The connection is reliable because each message transmitted includes a message integrity check using a message authentication code (MAC) to prevent undetected loss or alteration of the data during transmission; (3) In addition to the above mentioned properties, TLS/DTLS can also provide (based on the use of encryption key negotiation protocols) perfect forward secrecy, ensuring that any future disclosure of encryption keys cannot be used to decrypt any TLS/DTLS communication recorded previously. The protocols have two layers: a record protocol and a handshake protocol.

2.1.1 TLS/DTLS Record Protocol

The TLS/DTLS record protocol is a layered protocol. At each layer, messages may include fields for length, description, and content. The record protocol takes messages to be transmitted, fragments the data into manageable blocks, optionally compresses the data, applies a MAC, and then encrypts and transmits the result. Received data is then ostensibly processed in reverse; it is decrypted, verified, decompressed, reassembled, and then delivered to higher-level clients. This process is used to encapsulate various higher-level protocols such as the TLS/DTLS handshake protocol, alert protocol, change cipher spec protocol, or the application data protocol.

The TLS/DTLS record protocol provides connection security with two basic properties. First, the connection is private (secured) because symmetric cryptography is used to encrypt the data being transmitted between the two parties (e.g., AES, RC4, etc.). The keys for this symmetric encryption are uniquely generated for each connection and are based on a secret negotiated by another protocol (such as the TLS handshake protocol) at the start of the session. The server and client negotiate the details of which encryption algorithm and cryptographic keys to use before the first byte of data is transmitted. The negotiation of a shared secret ensures that it is unavailable to eavesdroppers and cannot be obtained by attackers who place themselves in the middle of the connection. Second, the connection is reliable. Message transport includes a message integrity check using a keyed MAC. Secure hash functions (e.g., SHA-1, etc.) are used for MAC computations. This reliability ensures that attackers cannot modify the communications during the negotiation without being detected.

2.1.2 TLS/DTLS Handshake Protocol

TLS/DTLS handshake protocol provides a way to establish secret keys and produce cryptographic parameters for the session state between client and server. During negotiations, the following items will be agreed upon: (1) Session identifier: Random ID chosen by server to identify an active or resumable session state; (2) Peer certificate: Used to authenticate a peer; (3) Compression method: Compression algorithm used to compress data prior to encryption; (4) CipherSpec: Specifies the pseudorandom function (PRF) used to generate keying material, the bulk data encryption algorithm (such as AES, RC4 etc.) and the MAC algorithm (such as HMAC-SHA1)—it also defines cryptographic attributes such as the symmetric encryption key length and MAC length; (5) Master secret: 48-byte secret shared between client and server—this shared secret will be used for the symmetric encryption of the messages afterwards, which is faster than asymmetric encryption; (6) Resumable session: A flag indicating whether session can be used to initiate new connections.

In summary, the handshake protocol provides a way to negotiate and agree upon the following between client and server: (1) Agree on the version of the protocol to use (i.e., TLS 1.2 or DTLS 1.2); (2) Select cryptographic algorithms and parameters; (3) Authenticate each other by exchanging and validating digital certificates; (4) Use asymmetric encryption techniques to generate a shared secret (to negate key distribution and man-in-the-middle attacks).

2.1.2.1 TLS Handshake

Steps involved in a TLS handshake are as follows:

(1) The TLS client sends a "client hello" message that lists cryptographic information such as the TLS version and, in the client's order of preference, the cipher suites supported by the client (see 2.1.4. Cipher Suites). The message also contains a random byte string that is used in subsequent computations. The protocol allows for the client hello to include the data compression methods supported by the client. Also, it allows clients to send any TLS extension supported by client.

(2) The TLS server responds with a "server hello" message that contains the cipher suite chosen by the server from the list provided by the client, the session ID, and another random byte string. The server also sends its digital certificate. The server will also send a "client certificate request" that includes a list of the types of certificates supported and the acceptable certification authorities (CAs). Servers may require clients to present valid certificates for authentication and validation purposes. (See 2.6 Device Provisioning for more on client-side certificates and configuration provisioning.)

(3) The TLS client verifies the server's digital certificate (see 2.5.3 How TLS/DTLS Provide Authentication, Secrecy, and Integrity for more details).

(4) The TLS client sends the random byte string that enables both the client and the server to compute the secret key to be used for encrypting subsequent message data. The random byte string itself is encrypted with the server's public key.

(5) If the TLS server sends a client certificate request, the client returns a random byte string encrypted with the client's private key, together with the client's digital certificate, or a "no digital certificate alert." This alert is only a warning, but with some implementations, the handshake fails if client authentication is mandatory.

(6) The TLS server verifies the client's certificate.

(7) The TLS client sends the server a "finished" message, encrypted with the secret key, indicating that the client part of the handshake is complete.

(8) The TLS server sends the client a "finished" message, also encrypted with the secret key, indicating that the server part of the handshake is complete.

For the duration of the TLS session, the server and client can now exchange messages that are symmetrically encrypted with the shared secret key.

2.1.2.2 DTLS Handshake

DTLS uses the same handshake message formats, flows, and logic as TLS except for the following differences: (1) Stateless cookie exchange has been added to prevent denial-of-service attacks; (2) Modifications to the handshake header to handle message loss, reordering, and DTLS message fragmentation (to avoid IP fragmentation); (3) Retransmission timers to handle message loss.

2.1.3 How TLS/DTLS Provide Authentication, Secrecy, and Integrity

As mentioned above, the main purpose of using TLS or DTLS is to secure communications between client and server. TLS/DTLS do so by providing various mechanisms to authenticate both parties and provide a way to negotiate security parameters for a session.

2.1.3.1 Authentication

As part of the TLS/DTLS handshake, after the client says "hello" (as described above), the server provides its certificate to the client and requests a certificate back. When the client receives the server's certificate, it will verify the certificate and then use the server's public key to encrypt the data to calculate a shared secret. The server can only generate a shared secret if it can properly decrypt the data sent by the client using its own private key. On the server side, when the server receives the client's certificate, it first verifies the certificate and then uses the client's public key to decrypt the data sent by the client during the handshake to calculate the shared secret. (2.5.3.1.1 Certificate Verification, below, describes the verification process in more detail.) In final steps of the handshake, server and client exchange "finished" messages, which are encrypted using the shared secret. If server and client can both decrypt these messages using the shared secret, the key-exchange is confirmed and the authentication process is successfully completed. Simply put, certificate authority M (CA M) issues a certificate to the server and certificate authority N (CA N) issues a certificate to client. For client-side server authentication and server-side client authentication: (1) The server will have personal certificates issued by CA M, its private key, and CA certificate for CA N; (2) The client will have personal certificate issued to client by CA N, its private key, and a CA certificate for CA M; (3) Upon receiving a certificate from the server, the client will verify the server's identity by verifying the server's digital certificate with the public key of CA M; (4) Also, upon receiving the client's certificate, the server will verify the client's identity by verifying the client's digital certificate with the public key of CA N, which issued a personal certificate to the client; (5) In this case, both certificates will be issued by the platform's certificate authority.

2.1.3.1.1 Certificate Verification

When the server receives a digital certificate from the client, or vise versa, both will verify the certificate. The following steps provides an overview of certificate verification: (1) The digital signature of the certificate is checked: (1.A) A digital signature is calculated using some hashing algorithm for the entire message being transferred between client and server; (1.B) Usually, for this purpose, the sender calculates a MAC or message digest of the message being sent and it encrypts it using its own private key—This is called a digital signature; (1.C) The sender transmits this digital signature along with the message; (1.D) Upon receiving the message and message digest, the receiver decrypts the message digest using the sender's public key; (1.E) The receiver also computes the message digest using the same algorithm (as negotiated during the handshake) for the message it received and then verifies that both digests (sent by sender and recalculated by receiver) are the same; (1.F) If the digital signature matches, it confirms on the receiver side that: (1.F.1) The message has not be altered during transmission; (1.F.2) The message was sent by the entity that claims to have sent it; (2) The certificate chain is checked and verified; (3) The expiry and activation dates and validity period are verified; (4) The revocation status of the certificate is checked.

2.1.3.1.2 Certificate Revocation

For certificate revocation, neither the Online Certificate Status Protocol (OCSP) nor Certificate Revocation Lists (CRLs) are used. Instead, this profile relies on a software update mechanism to provision information about revoked certificates as stated in RFC 7925—Section 4.4.3.

2.1.3.2 Secrecy

TLS/DTLS use a combination of asymmetric and symmetric encryption to ensure message secrecy. During the TLS/DTLS handshake, both client and server negotiate and agree upon an encryption algorithm and a shared secret to be used for that session only. Messages transferred between client and server will be encrypted using the agreed upon encryption algorithm and shared secret. Authentication of server on client side, authentication of client on server side, encryption algorithm, and shared secret to be used for encryption and message digest algorithm to be used to generate message authentication code are negotiated between client and server during each new session. TLS/DTLS use asymmetric encryption while sending the shared secret, so no key distribution is required. (2.6 Device Provisioning describes client-side certificate and other configuration provisioning in more detail).

2.1.3.3 Integrity

TLS/DTLS provides data integrity by calculating the message digest (the MAC).

The hash algorithm to be used to generate the MAC is negotiated during the TLS/DTLS handshake process.

2.1.4 Cipher Suites

To establish connection protection during the TLS/DTLS handshake, the TLS/DTLS record protocol may require specification of a suite of algorithms containing a key-exchange algorithm, digital signature verification algorithm, bulk encryption algorithm, and MAC algorithm: Key-exchange algorithm: The key-exchange algorithm provides a way to communicate a shared secret between client and server during the handshake. For each session, a new symmetric encryption key is calculated. The client and server agree upon a key-exchange algorithm and the parameters to be used for that key-exchange algorithm to generate new shared secret for the session. Authentication algorithm: The authentication algorithm provides a way to define which mechanism will be used to validate the server's certificate and the digital signature on the client's side, and vice versa. Encryption algorithm: The cipher suite also defines which encryption algorithm to use for the session to encrypt messages. In addition to the encryption algorithm, it also provides a way to define the symmetric encryption key length. MAC algorithm: The cipher suite also provides support defining which MAC generation algorithm should be used to calculate the MAC on both sides.

2.1.4.1 Cipher Suites Supported by the Platform

For better security and for perfect forward secrecy, servers will support following cipher suites. Cipher Suite—TLS_ECDHE_ECDSA_WITH_AES_256_GCM_SHA384 (0xC0,0x2C), Key Exchange—ECDHE, Digital Signature—ECDSA, Encryption—AES 256 with GCM, MAC—SHA 384, FIPS—Yes, Suite B—Yes. FIPS: Specifies whether the cipher suite is FIPS (Federal Information Processing Standards) certified. Suite B: Specifies whether the cipher suite adheres to Suite B (RFC 6460) guidelines.

2.1.4.1.1 Cipher Suite TLS_ECDHE_ECDSA_WITH_AES_256 GCM_SHA384

Using this cipher suite, the following algorithms can be used: Key exchange and digital signature verification: Ephemeral Elliptic Curve Diffie-Hellman (ECDHE) with Elliptic Curve Digital Signature Algorithm (ECDSA) for signatures. It is defined in more detail in RFC 4492—Section 2.2. Server's certificate will contain an ECDSA-capable public key and will be signed with ECDSA. ECDHE using 384-bit prime modulus curve P-384. The server will send its ephemeral ECDHE public key and specification/parameters required for ECDHE in the server-key-exchange message during handshake and will be signed with ECDSA using the server's private key corresponding to the public key in the server's certificate. The client generates an ECDHE key pair on the same curve as the server's ephemeral ECDHE key and sends its public key in the client's key-exchange message. Encryption: AES with 256-bit symmetric encryption key with Galois Counter Mode (GCM). It is defined in more detail in RFC 5288. Message Authentication Code: SHA384 algorithm will be used to generate a MAC.

2.1.5 Change Cipher Spec Protocol

The change cipher spec protocol permits signal transitions in ciphering strategies. This protocol consists of only one message, which is sent as a part of the TLS/DTLS handshake. This message is encrypted (and compressed if negotiated) and is sent by both the client and server to notify the receiving party that the subsequent records will be protected using the newly negotiated cipher spec and keys.

2.1.6 Alert Protocol

One of the content types supported by the TLS record layer is the alert type. Alert messages convey the severity of the message (warning or fatal) and a description of the alert. Alert messages with a level of fatal result in the immediate termination of the connection. In this case, other connections corresponding to the session may continue, but the session identifier is invalidated, preventing the failed session from being used to establish new connections. Like other messages, alert messages are encrypted and compressed, as specified by the current connection state. Alerts (closure and errors) are defined, for example, in RFC 5246—Section 7.2 (from which the above description was taken).

2.2 TLS 1.2 Over TCP (with Acknowledgement)

TLS over TCP enables two parties to identify and authenticate each other and allow client/server applications to communicate with confidentiality and data integrity. A gateway server running TLS 1.2 over TCP provides features and security as described in RFC 5246 for TLS 1.2. At a basic level, TLS protocols are layered on top of TCP, which delivers ordered and error-checked byte streams between applications running on various hosts communicating via IP. TCP is a connection-oriented protocol, requiring an established communication channel between communicating parties. This means TCP requires tracking open communication channels, retransmitting lost data, and sending low-level acknowledgments (ACKs) to confirm packet reception, all of which introduces extra overhead in the system and on the network. For time-sensitive, real-time applications, this extra overhead is a challenge if there is network congestion and hosts need to frequently re-transmit data and acknowledge every packet. As well, beyond the TCP acknowledgement, the protocol may require receivers to send an application-level ACK to senders. This is because TCP cannot guarantee that the received message has been persisted. Because sending an acknowledgement for every message could slow the system, the protocol allows for acknowledgements to be delayed so that the server can send a single acknowledgement for multiple messages. (This is discussed in detail in 2.8 Message Buffering.)

2.2.1 TCP Header

Along with the 20-byte IP header, TCP adds a 32-byte header; each of which may be used and supported.

2.3 DTLS 1.2 Over UDP (with Acknowledgement)

UDP is a "connectionless" protocol that enables communications to be initiated without requiring a pre-established handshake. A number of application layer protocols have been designed that use UDP transport. In many cases, the most desirable way to secure client/server applications would be to use TLS; however, the requirement for datagram semantics prohibits the use of TLS. The primary advantage of TLS is that it provides a transparent connection-oriented channel, making it easy to secure an application protocol by inserting TLS between the application layer and the transport layer. However, because TLS runs over a reliable transport channel (typically TCP) it cannot be used to secure unreliable datagram traffic running on top of UDP.

The basic design philosophy of DTLS is to construct "TLS over datagram transport." The reason that TLS cannot be used directly in datagram environments is simply that packets may be lost or reordered. TLS has no internal facilities to handle this kind of unreliability; therefore, TLS implementations break when rehosted on a datagram transport. The purpose of DTLS is to make only minimally required changes to the TLS protocol to fix this problem. To a great extent, DTLS is identical to TLS.

Unreliability in UDP creates additional problems for TLS at two levels: (1) TLS does not allow independent decryption of individual records—Because the integrity check depends on the sequence number, if record N is not received, then the integrity check on record N+1 will be based on the wrong sequence number and, thus, will fail; (2) The TLS handshake layer assumes that handshake messages are delivered reliably and breaks if those messages are lost.

RFC 6347 (DTLS 1.2) describes approaches to solve both these problems. A gateway running DTLS 1.2 over UDP can provide features and security as described in RFC 6347 for DTLS 1.2.

At the lowest level, DTLS protocols are layered on top of unreliable UDP. Because UDP is a connectionless protocol, it does not require a pre-established handshake for communications to be initiated. This reduces protocol requirements and overhead since any required error checking and corrections are handled at the application level. UDP thus emphasizes reduced latency over reliability. UDP is suitable for time-sensitive processing applications where a need for guaranteed delivery and constant re-transmission could delay real-time data.

With the disclosed protocol, to ensure that device data sent to a server is received and persisted (processed), the specification requires an acknowledgment for every message. The sender could be a device (resulting in a server-to-device ACK) or it could be a server (device-to-server ACK). Because sending an acknowledgment for every message could slow the system, the disclosed protocol allows ACKs to be delayed and a single ACK to be sent for multiple messages. (See 2.8 Message Buffering for more.)

2.3.1 UDP Header

Along with the 20-byte IP header, UDP adds an 8-byte header on top of that.

2.4 MTU and PMTU Discovery

MTU (maximum transmission unit) is the size of the largest protocol data unit (PDU) that can be communicated/transmitted in a single network layer transaction. That is, it is the largest size packet or frame, specified in octets, that can be sent in a packet-based or frame-based network (such as the internet). Larger MTUs are associated with reduced overhead while smaller MTU values can reduce network delays. In many cases, MTU is dependent on underlying network capabilities and may be manually or automatically adjusted so as not to exceed these capabilities. Also, too large an MTU size may mean retransmissions if the packet encounters a router which cannot handle that large of a packet. Too small an MTU size means relatively larger header overhead and more acknowledgments that have to be sent and handled. Ethernet V2 supports 1500 bytes as MTU. However, the de facto internet standard MTU is 576 bytes. Most operating systems provide a default MTU value suitable for a majority of applications. For example, more recent Windows™ systems can sense whether the connection should be using 1500 or 576 as MTU, while on Linux operating systems, the MTU size is 1500 by default. Nonetheless, while sending packets, one should always count for overall packet size and not just the application data size and make sure that it is smaller than the allowed MTU size.

2.4.1 PMTU Discovery

Path MTU (PMTU) discovery is a standardized technique to determine the MTU size on the network between two hosts to avoid any IP fragmentation. Because TCP (i.e., TLS over TCP) is a stream-based protocol, data can be easily divided into multiple packets for transmittal. However, with TCP, it is possible that, due to smaller MTU size configuration on one of the routers on the route, the TCP three-way handshake completes successfully but then hangs when data is transferred. This leads to a black hole connection. Meanwhile, because UDP (i.e., DTLS over UDP) is a datagram-oriented protocol, the data being transferred in any packet fits a single datagram. More specifically, each DTLS record fits within a single datagram. Clients connecting to servers determine proper MTU size using PMTU (as described in 4.1.1 of RFC 6347).

2.5 Direct TCP/UDP

It is possible to directly communicate with servers using TCP or UDP without TLS or DTLS and securing communications using symmetric key encryption. In such cases, the encryption field in the message header is set to value 0x01 to encrypt the message payload and ensure confidentiality and data integrity. If connecting directly with just TCP or UDP, devices are provisioned with encryption keys by the manufacturer and the keys then shared with the platform service in advance (via encrypted email using secure public keys that the platform service will exchange with manufacturers).

2.6 Device Provisioning

Developing and provisioning IoT devices may require security threats to be investigated and decisions on what services to use to mitigate these threats. Enabling IoT devices to exchange data often requires authentication of the two endpoints and the ability to provide integrity and confidentiality protection of the exchanged data. As mentioned above, servers may support DTLS and TLS security protocols to provide these features and functionalities. However, before the client (IoT device) can initiate the TLS/DTLS handshake with the servers, it needs to know the address of the servers and needs to know various other configurations, as well as the credentials to use to authenticate and validate itself against the servers. Also, it needs to know how to authenticate/validate the servers. In this scenario, clients will behave as a constrained TLS/DTLS client profile (as defined in RFC 7925—Section 3.2.1), with the servers supporting certificate-based authentication. This may require devices to support a pre-populated "trust anchor store" that allows the DTLS/TLS stack to perform path validation for the certificate obtained from the servers during the TLS/DTLS handshake process. The following sections provide an overview of the components that facilitate the certificate-based authentication between devices and servers.

2.6.1 Public Key Infrastructure and Certificate Authority

The platform service has a public key infrastructure (PKI) to facilitate distribution and identification of the public encryption keys. This provides certificate-based authentication so that servers can authenticate devices and devices can authenticate the servers. To achieve this, the platform service operates a certificate authority (CA) that issues digital certificates for the servers, devices, and hardware partners. The platform service's CA also issues root certificates, which are self-signed and form the basis of an X.509-based PKI. The root certificate issues an intermediate certificate that inherits the trust of the trusted root certificate, which then forms an effective certification chain of trust. This intermediate certificate, in-turn, is used to issue other certificates, such as server endpoint certificates, manufacturer certificates, and device certificates. Certificates issued to manufacturers contain unique identifiers issued by the platform service for the manufacturer. Also, certificates issued to each device contain unique identifiers of the manufacturer and the device ID (or serial number) to uniquely identify the device.

2.6.2 Device Manufacturing

For device provisioning, the manufacturer generates a certificate for each device and signs the certificate using the certificate issued to the manufacturer by the platform service's CA. This certificate acts as a manufacturer key to authenticate the device with the platform service's bootstrap (provisioning) servers and fully provision the device in the platform service when it comes online for the first time. During the device manufacturing, this certificate (unique per device) is stored on the device. Also, a corresponding private key is stored in a secured hardware module on the device. CA certificates are pre-populated in a trust anchor store on devices, which allows the TLS/DTLS stack to perform path validation for the certificates obtained during the TLS/DTLS handshake process from servers (the platform service's bootstrap and gateway servers): (1) Trust anchor store: Trust anchor store is a set of one or more trust anchors stored in a device; (2) Trust anchor: Trust anchor is an authoritative entity for which the trust is assumed and not derived using chain of trust. In PKI, the root certificate is the trust anchor from which the whole chain of trust is derived. Devices are also pre-populated with the platform service's bootstraps server's URI. So, when a device comes online for the first time, it knows to which server to connect to fully provision the device.

2.6.3 Device Provisioning and Platform Service Bootstrap Server

As mentioned above, during manufacture, devices are pre-populated with device-specific certificates and private keys by the manufacturer. However, devices do not contain a certificate issued directly by the platform service's intermediate certificate. This certificate may be required to authenticate and validate devices while performing the TLS/DTLS handshake with the platform service's gateway servers.

When a device comes online for the first time, it contacts a bootstrap server. The bootstrap server provisions information on the device as well as in the platform service's server's back end to enable the device to communicate with the platform service's gateway servers. The bootstrap server implements a client-Initiated bootstrap interface (as defined in Section 6.1 of Lightweight Machine to Machine (LWM2M) protocol technical specification). LWM2M is a protocol from the Open Mobile Alliance for machine-to-machine and IoT device management. The bootstrap server runs CoAP (constrained application protocol) over DTLS as defined in the LWM2M specification. A URI for the platform service's bootstrap server may be provided.

When a device first comes online, the following happens: (1) Device initiates a DTLS connection with the platform service's bootstrap server. (2) During the DTLS handshake process, the device verifies the bootstrap server's certificate using the trusted anchor store on the device (which contains platform service CA certificates). (3) Device will present a device-specific certificate which is pre-populated on the device during manufacturing. This certificate contains a unique identifier of the manufacturer and the device's serial ID. The platform service's server will verify this certificate to authenticate and validate the device. (4) As a part of the bootstrap/provisioning process, the following happens: (4.A) Bootstrap server sends platform service's gateway server's URI to device. (4.B) Bootstrap server sends any device-specific configuration details. (4.C) The platform service's server generates a new public/private key and certificate (signed by the platform service's Intermediate Certificate) for the device, which contains a device-specific identifier. A private key is sent to the device along with the certificate. The device stores the private key in a secured hardware module. (4.D) The bootstrap server also populates information for the device in its back end. (4.E) Once provisioning is finished, the bootstrap server sends a "finished" message (as defined in the LWM2M Bootstrap Interface), at which point the device erases the manufacturer-generated certificate and private key from its secured hardware module and disconnects from the bootstrap server. (4.F) Once provisioning is complete, the device has been given the platform service's gateway server's URI and a newly generated certificate and private key. (5) Device now connects to the gateway server and, during the TLS/DTLS handshake process, provides the newly issued certificate to the server. This allows the gateway server to properly authenticate and validate the device and generate a symmetric encryption key for the session.

2.6.4 Secret Key Storage

Any secret key on a device should be stored in protected storage so that an attacker cannot obtain the keys from devices. (One option for securely storing these keys on devices is Trusted Platform Module.)

2.7 UDP/TCP Message Header

Regardless of whether UDP or TCP is used, the protocol may require a prepended message header to identify certain message properties and characteristics, including message type, message sequence, and other aspects. FIGS. 5A and 5B depict a table that describes the message header to be used while using direct UDP/TCP connections to the platform service's servers.

2.8 Sending messages to the Platform Service's Gateway 2.8.1 Message Buffering

For direct UDP/TCP connections, client devices need to be able to successfully connect to servers and receive acknowledgements to prevent data loss and ensure that messages are processed. In some instances, the device may be having difficulty connecting to a server but still be collecting telemetry data and generating events and messages. If it cannot send these messages to the server or receive acknowledgments back, then it will incur data loss. To solve this problem, the protocol may use a device message-buffering mechanism to handle server acknowledgments. If the device cannot connect to a server or cannot send messages to the server or does not receive acknowledgments back from the server in time, it buffers newly sent messages (for which acknowledgment is not received yet) and any new messages in its in-device memory buffer. This buffer should be large enough to store up to seven days' worth of data. The actual size of the buffer depends on the device's usage type, type of telemetry data and messages it sends, how often the device sends message, and so on. A device should keep messages in its buffer up until it can publish these messages to the server and receive an ACK. The device can then safely delete the messages. Messages also remain buffered if, say, the device goes to sleep, the battery runs out, or the device is restarted. The device buffers these messages until it receives acknowledgment from the server for those messages or receives an explicit command/request to clear the buffer.

Devices can generate at least two kinds of messages: (1) Event-based messages (such as ignition on and various reports); and (2) Streaming messages (for reporting high-frequency data such as accelerometer data).

High-frequency data produce messages at much higher rate than event-based messages or report messages. In such cases, where the device cannot communicate with the gateway servers (due to network connectivity or roaming issues), high-frequency data messages might fill up the buffer quickly, causing the device to lose important event-based data or report messages. To avoid such problems, devices implement two different buffers, a low-frequency message buffer and a high-frequency message buffer.

Low-frequency message buffer: This buffer stores and forwards non-high-frequency messages, such as event-based data messages, report messages, etc. The device provisions enough buffer space to store up to e.g., thirty days' worth of data. If the buffer is full, new messages may be dropped and there will be data loss.

High-frequency message buffer: This buffer should store and forward high-frequency data messages, such as high-frequency accelerometer messages. The device provisions enough buffer space to store up to e.g., three days' worth of data. If the buffer is full, new messages may be dropped and there will be data loss.

2.8.2 Acknowledgement Messages

When the server receives a message from a device using a direct UDP or TCP connection, to ensure the message is persisted at the server, the server replies with an acknowledgment receipt (i.e., an ACK message). The acknowledgment receipt message structure is the same as the message header structure, defined above. However, most of the details in the message header used to send messages from the client device to the server are not required to send an ACK from the server to the client device. Also, server ACKs do not contain payloads.

2.8.2.1 Delayed Acknowledgment

Sending an acknowledgment for each message could lead to higher network traffic and increased data transmission. To avoid this, and to give devices some flexibility (specifically, some run-ahead to send more data while awaiting acknowledgments and/or while a network connection exists), the protocol allows delayed acknowledgment for device-to-server messages. This means that client devices can keep sending messages (e.g., up to a maximum of eight or other suitable quantity) before receiving acknowledgments for previous messages. Each message will be kept in an in-device buffer (e.g., buffer 122A of FIG. 1) of the client device until being acknowledged by the server. Instead of sending an acknowledgment for each message received from a client device, the server may wait for a predefined maximum quantity of messages (e.g., eight messages or other suitable quantity) to be received from the client device, or may wait up to a predefined maximum period of time (e.g., two seconds or other suitable period of time) to send an acknowledgment back. Each acknowledgment includes a corresponding sequence number (i.e., a sequence identifier) that identifies the last message received and persisted by the server in storage. For example, upon receiving acknowledgment for message 8 after the sequence 1, 2, 3, 4, 5, 6, 7, 8, the client device can remove buffered messages up to 8. This ensures that messages are processed. If any message fails to persist, the server will only acknowledge the sequence number of the last persisted message.

2.8.2.2 Acknowledgment with Sequence Number Less than Expected

The server will send an ACK with the sequence number of the last successfully persisted message. If it fails to process a message in the sequence, any messages after that will need to be resent by the client device. Using the same example as above, a client device sends message sequence 1, 2, 3, 4, 5, 6, 7, 8 without waiting for an ACK, but message 5 fails to be received or processed (e.g., persisted in storage) by the server. Even if the server has received messages 6 to 8, the server will not process those messages and will return an ACK to the device only acknowledging the sequence up to message 4. The client device can erase messages from the buffer up to message 4, but resends messages 5 through 8.

2.8.2.3 Late Acknowledgment

Even with delayed acknowledgment, the server might fail to send an ACK or might send an ACK that fails to reach the client device. In this case, the client device cannot keep sending new messages. The client device is only allowed to send a maximum quantity of messages (e.g., eight messages or other suitable predetermined limit) without receiving an acknowledgement. If it does not receive an ACK within a predefined period of time (e.g., five seconds), then the client device retries sending those already sent messages.

2.8.2.4 Sequence Numbering

As acknowledgment and requirement of retransmitting the same message largely depends on proper sequence numbers (i.e., sequence identifiers). Sequence numbers are maintained sequentially across buffers. For example, a low-frequency buffer has four messages and high-frequency buffer has 20 messages. If the device sends two messages from the low-frequency buffer, then their sequence numbers should be X and X+1. After that, if the device decides to send 10 messages from the high-frequency buffer, then they should have sequence numbers starting from X+2 to X+11, and the last messages from the low-frequency buffer should have sequence numbers X+12 and X+13.

2.8.3 Retry Mechanism

If the server fails to persist messages or the ACK exceeds the allotted time to reach the device due to some issue, the client device tries to resend those messages to ensure there is no data loss. The retry mechanism can be defined using device configuration parameters (i.e., how many times the device resends messages). After reaching the configured maximum, the client device will either drop the connection or will reset its communication module and it continues sending the same message.

2.8.3.1 Congestion Control

In order to avoid any congestion on edge nodes, especially in the case of DTLS over UDP or UDP on its own, the retry mechanism implements slow-send and delay between two consecutive send operations. Normally, if the client device does not receive an ACK within the configured time interval, the device waits (for X time) before initiating retransmission of the first message in its sent buffer. Even after retransmitting the message, if the client device does not receive an ACK, the client device should double the value of the waiting interval before sending the same message again. As an example, the initial wait interval should be one second (and should not exceed 60 seconds). If the client device does receive an acknowledgment, the wait interval should be decreased by half. In at least some examples, the wait interval should not be less than one second.

While retransmitting messages, the client device starts with one message initially. For example, if the client device has already sent eight messages without waiting for an ACK and does not receive ACK within the configured interval, the client device should only retransmit the first message it sent for which it has yet to receive an ACK, instead of retransmitting eight messages at once. If the client device does receive an ACK within the specified period, it can then double the value of the messages to be sent. So, in next rounds, the client device can send two messages at a time, then four messages, and then eight messages (each contingent on subsequent successful ACKs). While retransmitting, if the client device already received an ACK with the sequence number of the last message it sent, then it should stop retransmision efforts and should start sending new messages. For example, if the client device has already sent eight messages but has not received an ACK within the configured interval, the client device will retransmit the first message of that series of messages (e.g., message 1). It may, for example, be possible that the server has already received the initial eight messages and has already sent an ACK, but the ACK was lost. In this case, when the client device retransmits the first message and the server receives it, the server already knows that it has processed that message based on the latest sequence number it received and latest ACK sequence number sent. The server thus sees that it is receiving a message with sequence number 1 and it has already sent ACK with sequence number 8. If so, the server will simply resend the ACK with sequence number 8. When the client device receives the ACK with sequence number 8, it will stop the retransmission effort, will reset retransmission parameters (wait interval and number of messages it can send), will clear messages up to sequence number 8 from its buffer, and will start sending messages beginning with sequence number 9.

Figure 4:
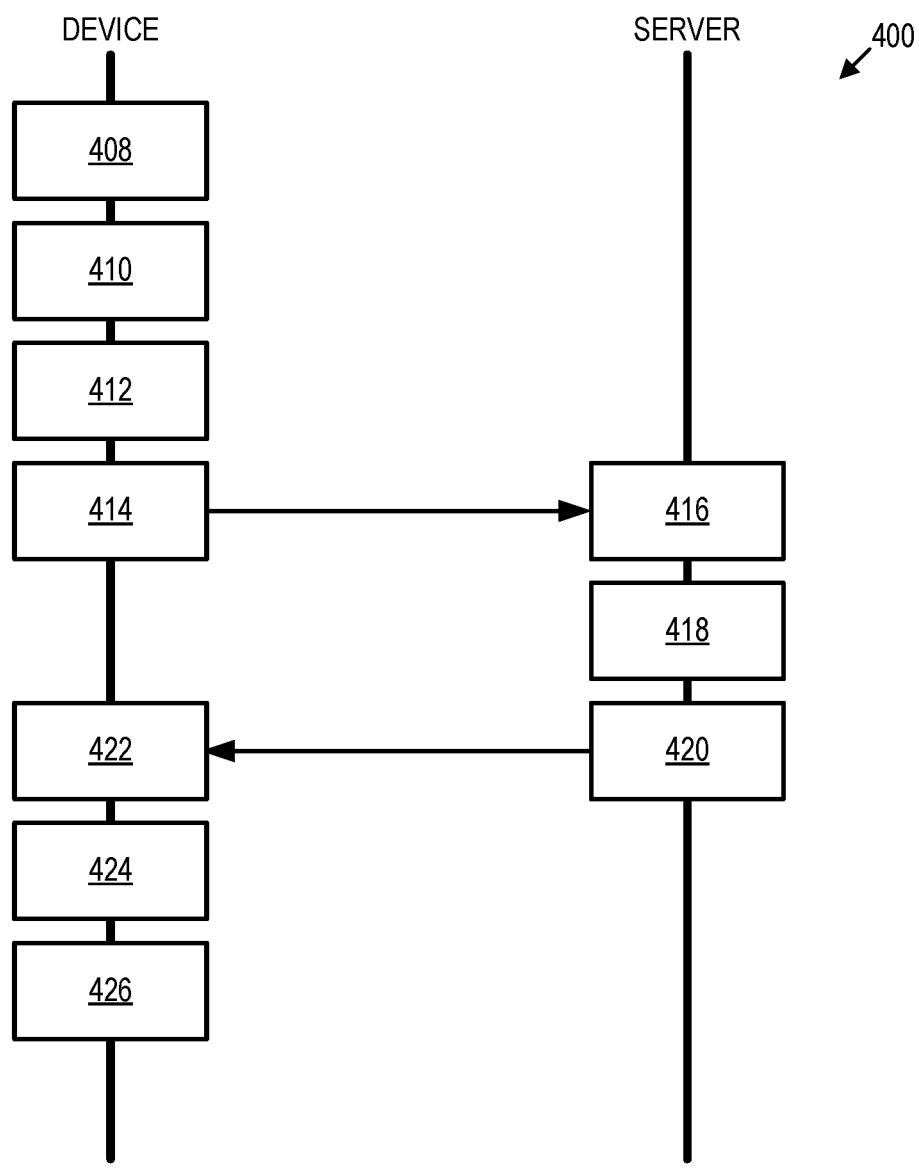
FIG. 4 depicts an example method of an acknowledgement technique of the disclosed messaging protocol.

FIG. 4 depicts an example method 400 of an acknowledgement technique of the messaging protocol disclosed herein. In FIG. 4, a device (e.g., device 110 of FIG. 1) interacts with a server (e.g., of server system 150 of FIG. 1) via a communications network (e.g., network 180 of FIG. 1). Aspects of method 400 may be referred to as UDP windowing, when used with the UDP transport protocol. However, other suitable transport protocols may be used. UDP windowing may be used by the device to send multiple messages before receiving an acknowledgement message from the server of any of the multiple messages, thereby enabling the device to send messages while network connectivity is available.

As described in further detail with reference to method 400, the buffering mechanism based on UDP allows data to be sent quickly and reliably in the case of common potential disconnections. The buffer may be a cyclic buffer that is used to allow more than one message to be pending between sender and receiver. A logical clock and acknowledge mechanism is used by receiver to be able to allow the sender to send ahead data while a network connection is present. The lack of an acknowledgment message from the receiver acts as both a flow control mechanism as well as notice of disconnection after a timeout. The acknowledgement message may indicate a logical clock number lower than the most recent logical clock sent to act as flow control to indicate only a particular number of sequential messages. This is achieved because the sender must retain messages until it receives an acknowledgment message up-to the last confirmed logical clock number. The messages in the buffer can be prioritized by the sender according to need.

At 408, the device obtains sensor measurements from a set of sensors via an electronic interface of the device. At 410, the device formats a set of one or more outbound messages according to the messaging protocol (e.g., as defined by protocol module 118) in which each outbound message includes a header and a payload. The payload may contain data that is based on the sensor measurements obtained by the device, such as the reporting messages and/or event messages described herein. In at least some examples, each outbound message is formatted by the device encoding some or all of the data for the payload according to a predefined schema to obtain encoded data that is then included in the payload. For example, the encoded data of the payload has the select serialization format indicated by the serialization type identifier. The schema (e.g., as defined by the Avro framework in instructions executed by the device) may have a different description language than the encoded data, in contrast to XML, for example. As previously described with reference to FIG. 2, the header may contain (A) a device identifier associated with the mobile computing device, (B) a sequence identifier that identifies a relative order of the outbound message in a sequence of the set of outbound messages, and (C) a serialization type identifier that identifies a select serialization format of the payload data of a plurality of supported serialization formats, among other suitable data. For example, the header may further contain a message type identifier corresponding to a device-to-server message type selected from a plurality of supported message types, including at least an event message type and a report message type; and/or a compression type identifier for the payload data that identifies a select compression format of the payload data of a plurality of supported compression formats.

At 412, the device stores the set of outbound messages in a buffer of the device. At 414, the device transmits the set of outbound messages via the wireless communications interface over a wireless communications network directed to a target computing device, such as the server. In an example, the set of outbound messages are transmitted over a transport layer protocol that does not utilize a handshake dialog with a recipient party, including the target computing device. An example of this type of transport layer protocol includes UDP. At 416, the server receives multiple inbound messages corresponding to the set of outbound messages transmitted at 414 from the device over the communications network. The communications network may include a wireless network component (e.g., a wireless network at the device side). As discussed above, the header of each of the multiple inbound messages includes a sequence identifier that identifies a relative order of that inbound message in a sequence of the multiple inbound messages.

At 418, the server processes and stores (i.e., persists) the data contained within each of the multiple inbound messages in a persistent data storage device, represented as storage machine 154 in FIG. 1. As part of operation 418, the server decodes the encoded data contained in the payload by applying the schema indicated by the serialization identifier, including deserializing the encoded data for each inbound message. Unlike some protocols that send a single schema-based wire format (e.g. XML), the messaging protocol disclosed herein uses the schema only to describe the underlying wire protocol with completely unrelated wire protocol mapping as possible. This schema-based definition allows the receiver (e.g., server) to store/further transport the data received in any wire protocol in a standard manner. The schema provides both an abstract definition of the wire protocol to be mapped to and provides the reverse mapping such that the schema can be used for storage as well.

At 420, following storage of the data contained within each of the multiple inbound messages, the server sends an acknowledgement message indicating a sequence identifier of a last received inbound message of the multiple inbound messages to the device. In at least some examples, the server performs flow control at the server system by delaying transmission of the acknowledgement message until a predetermined time, thereby delaying the device from sending additional messages beyond the limits imposed by the predefined quantity of unacknowledged messages.

At 422, the device receives the acknowledgement message from the target computing device (e.g., the server in this example) following the set of outbound messages being transmitted to the target computing device. The acknowledgement message indicates a sequence identifier of the set of outbound messages that were transmitted at 414. As an example, where the set of outbound messages transmitted at 414 includes multiple outbound messages, the device transmits, at 414, the multiple outbound messages before the acknowledgement message is received from the target computing device. In at least some examples, the multiple outbound messages are limited to a predefined quantity of outbound messages (e.g., eight or other suitable quantity) that can be transmitted to the target computing device before the acknowledgement message is received.

At 424, the device clears one or more outbound messages of the set of outbound messages from the buffer that have a sequence identifier that includes or precedes the sequence identifier indicated by the acknowledgment message. For example, two or more outbound messages of the set of outbound messages may be cleared from the buffer responsive to the acknowledgment message, based on the sequence identifier. The two or more outbound messages that are cleared from the buffer may be less than all outbound messages of the set of outbound messages. The device may retain a subsequent portion of the set of outbound messages in the buffer that were transmitted after the two or more outbound messages until a subsequent acknowledgment message is received from the target computing device that indicates a sequence identifier of the last outbound message of the subsequent portion of the set of outbound messages.

Upon reaching the predefined quantity of outbound messages transmitted to the target computing device before the acknowledgement message is received, the device continues to store one or more additional outbound messages in the buffer at 426 without transmitting the one or more additional outbound messages. The one or more additional outbound messages may include multiple additional outbound messages. In at least some examples, the device prioritizes the multiple additional outbound messages based on a feature (e.g., contents or type) of their respective payloads, and transmits, as previously described at 414, one or more of the multiple additional outbound messages to the target computing device in an order defined by their priority, for example, upon receiving an acknowledgment message from the server that enables the device to clear pending messages from the buffer. The various operations of method 400 may be repeated to enable the device to send any suitable quantity of messages to the server.

2.9 Publish/Subscribe

With the pub/sub transport method, senders (publishers) do not program the messages to be sent directly to specific receivers (subscribers). Instead, published messages are categorized into classes (called channels or topics) without knowing which (if any) subscriber is interested in receiving the messages. Similarly, subscribers can express interest in one or more publishers (channel or topic) and receive messages that are of interest without the publisher's knowledge. Typically, this pattern involves a middle party that receives messages from publishers and distributes them to interested subscribers. This pattern provides greater network scalability and a more dynamic network topology. Pub/sub is very useful in implementing real-time communications. Data can be sent and received in milliseconds. Chat applications are a good example. In chat applications, when someone sends a message, that message is received (and displayed) instantaneously. Another example specific to the platform service is an OBD-II device communicating with the platform service's servers. When a connected vehicle is turned on, the platform service delivers an immediate notification of the event to the user's phone.

2.9.1 Pub/Sub using PubNub

PubNub is a globally distributed, real-time data-stream network (DSN) and real-time, infrastructure-as-a-service intermediary between publishers and subscribers.

2.9.2 Pub/Sub Channels

If using pub/sub with the protocol, devices subscribe and publish messages to a specific, secure platform channel (e.g., "platformserver"). To send a message back to a specific device, the platform service will publish a message to the channel that includes "device_id" so that that device is the only qualified recipient.

2.9.3 Pub/Sub Message Structure

Pub/sub messages may be published using the structure depicted in FIG. 6, using JSON conventions, as an example. PROTO_VER: Protocol version. Format: "Major.Minor" For example: "1.0"; DEV_ID_TYPE: Device ID type: 0—IMEI, 1—Serial number; DEV_ID: ID of the device: Supports alphanumeric, hyphen, and underscore; SEQ_NUM: Sequence number of the message being published. It will be incremented by one on every new message (X, X+1, etc.): Value range: 0—Max of UINT32; PAYLOAD: Full payload (actual message): BASE64 encoded string of actual payload byte data.

2.9.4 Pub/Sub Security

The protocol's security structure while using middleware servers may be the same as when using TCP with TLS, described previously.

2.9.5 Pub/Sub Message Buffer and Retry Mechanism

The message buffer and retry mechanisms while using middleware servers are the same as described earlier in 2.8 Message Buffering.

2.9.6 Pub/Sub Example Implementation Supporting MQTT Using A Stateless Gateway Service In an example implementation, the various client devices described herein may interact with the platform service using MQTT or portions thereof. Some client device (e.g., MDI devices) use the MQTT protocol for communication. MQTT is a publish/subscribe protocol, and the platform service may not initially support receiving data from devices through a publish/subscribe protocol. Supporting such a protocol may require an architectural modification, because using a publish/subscribe protocol in the way it is originally intended requires using a broker, which is a separate service that would need to be maintained in addition to the existing platform service. Any issues related to the addition of this service, such as scalability and availability, would also need to be accounted for.

This example implementation may address one or more of the following issues: (1) avoiding having to maintain a separate broker, by making the gateway of the platform service expose the interface that the device expects from a broker; and (2) a full implementation of an MQTT broker on the gateway may introduce other issues. One issue is that the gateway would have been required to become a stateful service, which could have a significant impact on performance. However, implementation of MQTT may be reduced to a point that allows the gateway to remain stateless, while still presenting an interface that implements the parts of the MQTT protocol that are sufficient to work with MDI devices.

This example implementation may enable a reduction of the MQTT protocol to the point where it does not require an actual broker, without requiring modification to the client device firmware (which allows working with the same device that is currently manufactured by e.g., MDI).

This example implementation may provide a stateless design of the service that satisfies this reduced protocol. A stateless design helps allow the service that responds to devices to be simpler and more scalable than if a stateful design was required.

The MQTT protocol allows any client to publish a message under a topic, and any client to subscribe to published messages. This publishing and subscribing can be limited by some access control, which would be essential if the broker is reachable from the Internet, as what would be needed by the platform.

In a traditional MQTT implementation, some clients (the client devices) always publish messages and never subscribe, and some clients (the gateway instances) always subscribe but never publish. Another aspect is that some use-scenarios do not need to support MQTT QoS level 2 to work with MDI devices. QoS level 2 ensures "exactly once" message delivery semantics, whereas for the platform service's QoS level 1 (i.e. "at least once") delivery semantics are sufficient for many use-scenarios.

These aspects imply that the broker does not need to provide devices with an interface that exposes everything supported by MQTT. Specifically, MQTT defines 14 message types: 1. Connect; 2. ConnAck; 3. Publish; 4. PubAck; 5. PubRec; 6. PubRel; 7. PubComp; 8. Subscribe; 9. SubAck; 10. Unsubscribe; 11. UnsubAck; 12. PingReq; 13. PingResp; 14. Disconnect. The MDI device can work properly if the service it connects to supports only a subset of these messages. For device-to-broker communication only the following messages may be supported: 1. Connect; 3. Publish; 12. PingReq; 14. Disconnect. For broker-to-device communication only the following messages may be supported: 2. ConnAck; 4. PubAck; 13. PingResp.

In addition, the platform service does not need to support MQTT retained messages to work with MDI devices. With the reduction to the protocol as described above and without need for retained messages, the broker does not need to retain any state information about the devices beyond the lifetime of the TCP connection that is initiated by the device.

With this change, the broker would still need to allow the instances of the gateway service to subscribe to receive the messages sent by the devices. For the platform service, any message needs to be received by only one of the gateway instances. Therefore, the broker will essentially be expected to load balance the messages across gateway instances.

If the broker is replaced by a load balancer, and each gateway instance has a separate broker, the topology of the system can include multiple devices publishing to a common load balancer that directs data streams to respective brokers in the gateway from which gateway instance respectfully subscribe.

Because of the reduction to the protocol that has been introduced above, any broker instance within a common gateway does not need to be aware of any of the other broker instances. For example, there may be a one-to-one mapping between brokers instances and gateway instances within a common gateway. Each broker instance manages subscriptions from exactly one gateway instance, for example.

Because of this one-to-one mapping, the system can be simplified further by eliminating the broker completely, and having each gateway instance expose an MQTT interface that supports only the subset of protocol functionality defined above. Because the MQTT functionality has now been integrated into the gateways, it can be integrated in such a way that it runs in the same OS process as the gateway service, passing the message immediately to the next gateway component responsible for further processing (the component that would have received the message from an MQTT broker as a result of subscribing to topics on the broker). This change turns the connection between the device and the gateway into what is essentially a client-server connection, rather than a connection that is mediated by a broker. As explained, this change can be implemented without making any modifications to the format of the supported subset of MQTT protocol messages, and without requiring any changes to the device firmware, despite the fact that the device firmware is designed to work with an MQTT broker. In this example, devices publish to a common load balancer from which respective instances in a gateway subscribe.

2.10 UDP as the Recommended Transport Mechanism

In at least some implementations, the protocol may include the use of DTLS over UDP because of its simplicity and scalability: Easy setup: UDP does not require any pre-setup for communication—namely, having to set up a communication channel using a handshake, as required by TCP. This reduces overall overhead. No transport-level ACK: UDP does not require sending transport-layer acknowledgments to sender, thus reducing overall traffic and network congestion. Reliability using application-level ACK: UDP allows for buffer management to reduce the number of application-level acknowledgment receipts required by the specification. Data security: The specification provides data security by encrypting payload data as well as signing the message using MACs, both of which ensure that data is sent by authorized parties and cannot be interpreted by unauthorized parties. Both security measures are supported while using UDP. Simplicity: UDP does not require session maintenance and constant checking if the communication channel is still open or not, as may be required when using TCP, thus reducing the overall cost of implementation. Scalability and high-availability: UDP servers require much less infrastructure compared to TCP servers for the same number of connections and amount of data being transferred. Also, it is very easy to provide scalability and high-availability (using clusters of the platform service's servers) for UDP servers compared to TCP servers.

3. Payload

The payload contains the actual message data, such as tracking details, location details, telemetry data, server-to-device requests to read/write configuration, acknowledgment receipts from servers to devices, and so on. Payload structure is common across transport mechanisms (direct UDP/TCP, pub/sub, etc.) being used by a device. To identify what kind of data the payload contains, how the payload data has been serialized, and how to interpret the received data, the payload section is divided into the following subsections: Payload header with metadata information about the payload data; Payload data structure with the actual data being sent/published.

3.1 Payload Header

Payloads contain a valid payload header, as described in the following table depicted in FIGS. 7A and 7B.

3.2 Serialization Format

In the context of data storage and data transfer, serialization is the process of translating data (data structures or object states) into a format that can be stored (for example, in a file or in buffer/memory) or transmitted (for example, across a network connection) and reconstructed later by a reader. When the resulting series of bits is reread according to the serialization format, it is used to create a semantically identical clone of the original object. Serialization is also called marshalling. The opposite operation, extracting a data structure from a series of bytes, is deserialization (unmarshalling). The protocol currently supports the serialization framework/formats described below.

3.2.1 JSON (Serialization Format 0x00)

JSON (JavaScript object notation) is an open-standard file format that uses human-readable text to transmit data objects consisting of attribute—value pairs and array of data types. The protocol supports transmitting payload data in JSON UTF-8 encoded text format serialized as binary (byte array). While sending messages, payload data is converted into UTF-8 encoded JSON text, which is then converted into a byte array before transmission. On the receiver's end, this byte array is converted back to UTF-8 encoded text and then parsed as JSON.

3.2.2 Apache Avro (Serialization Format 0x01)

Avro is a framework for making remote procedure calls and data serialization developed within Apache's Hadoop project. It uses JSON for defining data types and protocols and serializes data in a compact binary format. Its primary use is in Apache Hadoop, where it provides both a serialization format for persistent data and a wire format for communication between Hadoop nodes, and from client programs to the Hadoop services.

3.3 Compression

Most data serialization frameworks support their own compression mechanism, negating the need for the additional compression of serialized payload data. However, while using a serialization format such as JSON, payload data is only serialized into binary format, but not compressed. In such cases, the protocol provides support to define the compression methodology used to compress serialized payload data.

3.3.1 No Compression (Compression Type 0x00)

If the serialization format supports its own compression, then no further compression of serialized payload data is required. In such cases, compression type will be set to 0x00, meaning either payload data is not compressed or the serialization format uses its own compression method.

3.3.2 Deflate Compression (Compression Type 0x01)

Deflate is a lossless data compression algorithm that uses the LZ77 algorithm and Huffman coding to compress data. Deflate compression is recommended when the serialization format does not provide its own compression mechanism to compress serialized payload data. In such cases, compressing serialized payload data would decrease the size of serialized payload and reduce message size.

3.4 Payload Data

Payload data contains the data that a device wants to report to the server or request from the server and vice versa. The following sections describe the data structure for various message types in more detail. Note: Field name denotes name for Avro serialization format and attribute (key) name for JSON serialization format.

3.4.1 Device-to-Server Messages (Message Type 0x01)

Device-to-server messages contain various kind of data (telemetry, reports, events, etc.) that a device wants to periodically report to the server, or whenever a specific event is detected by a device or occurs on the device.

3.4.1.1 Event Messages (Message Sub-type 0x01)

Event messages are used by devices to report any event occurring or being detected by device and to report time-based telemetry data at regular intervals. The table depicted in FIG. 8 describes the data structure for event messages.

3.4.1.1.1 Common Events

The majority of events will be device-specific events, such as ignition on or ignition off for OBD-II devices. However, there are events that are common among different device types, such as device wakeup, device going to sleep, low battery, and sudden acceleration or deceleration. The table depicted in FIGS. 9A and 9B describes common events for devices. Common events (device-independent events) will have a DEV prefix. Also, each event could have event-specific telemetry, which will be present under the "Telemetry" field.

3.4.1.1.2 GPS Telemetry Structure

It is recommended that any device with GPS capabilities should send GPS telemetry data with each device-to-server communication. The table depicted in FIGS. 10A and 10B describes the GPS-TELEMETRY record structure.

3.4.1.1.3 Common Telemetry

Many devices will have device-specific telemetries, such as RPM for OBD-II devices. However, some common telemetry will be shared among different device types, such as internal battery voltage. The table depicted in FIGS. 11A, 11B, 11C, and 11D describes common telemetries. It is good practice to send some common telemetry with every kind of device-to-server message (e.g., event message, report message). This allows the platform service's servers to track common telemetry with finer details.

3.4.1.2 Report Messages (Message Sub-Type 0x02)

The purpose of report message type is to report aggregated data, statistical data, or device-specific data. The following sections outline different report payload structures. Some of the reports are device-specific (e.g., OBD-II or tracker), some of the reports are common (ID report and network statistics), and some of the reports could depend on capabilities provided by the device (Wi-Fi and Bluetooth statistics).

3.4.1.2.1 ID Report

ID report provides details for IDs/versions related to device, such as serial number, IMEI, MAC address, or firmware versions. ID report will be sent to server whenever a device wakes up from sleep state or when requested by server. The table depicted in FIG. 12 describes the ID report structure. The ID report record has the structure depicted in FIG. 13.

3.4.1.2.2 Network Connectivity Report

This provides detail report about network connectivity as seen by device. The network connectivity report will be sent to the server whenever a device establishes a network connection for the first time after waking-up, or after restart, or at regular intervals as defined in the configuration parameter section, or when requested by server. The table depicted in FIG. 14 describes the network connectivity report structure. The network connectivity record has the structure depicted in FIG. 15. Each entry in NW_CELL_RECORDS contains the following fields depicted in FIG. 16. Each entry in in NW_BLE_PROX_RECORDS has the structure depicted in FIG. 17. Each entry in in NW_WI-FI_PROX_RECORDS has the structure depicted in FIG. 18.

3.4.1.2.3 Message Statistics Report

This provides a detailed report for messages/data statistics with number of messages sent and/or received, and amount of data sent and received. Message statistic reports will be sent to the server at regular intervals, as defined in the configuration parameter or when requested by the server. The table depicted in FIG. 19 describes the message statistics report structure. The message statistics record has the structure depicted in FIGS. 20A and 20B.

3.4.1.2.4 Error Report

This reports any kind of error occurred on the device. The error report will be sent whenever a device encounters any error or when requested by server. The table depicted in FIG. 21 describes the error report structure. The error record has the structure depicted in FIG. 22. Each entry in the ERROR-DATA list has the structure depicted in FIGS. 23A and 23B.

3.4.1.2.5 Wi-Fi Hotspot Statistics Report

Provides details report for Wi-Fi in terms of how much data has been sent and received, bandwidth, and data usage. The Wi-Fi hotspot statistic report will be sent to the server at regular intervals as defined in the configuration parameter or when requested by server. The table depicted in FIG. 24 describes the Wi-Fi hotspot statistics report structure. The Wi-Fi hotspot statistics record has the structure depicted in FIGS. 25A and 25B.

3.4.1.2.6 Bluetooth Report

This provides a detailed report for Bluetooth in terms of status and proximity sensors. Bluetooth hotspot statistic reports will be sent to the server at regular intervals as defined in the configuration parameter or when requested by server. The table depicted in FIG. 26 describes the Bluetooth report structure. The Bluetooth record has the structure depicted in FIGS. 27A and 27B.

3.4.1.2.7 SMS Report

This provides detailed reports for the SMS messages received by device. SMS reports will be sent to the server whenever a device receives an SMS message. The table depicted in FIG. 28 describes the SMS report structure. The SMS record has the structure depicted in FIG. 29.

3.4.1.2.8 GPS Status Report

This report provides details about GPS status, in terms of location details and satellite information. The GPS status report will be sent whenever a device wakes up, or GPS fix status changes, or when requested by server. The table depicted in FIG. 30 describes the GPS status report structure. The GPS status record has the structure depicted in FIG. 31. Each entry in the SATTELITE-DATA list has the structure depicted in FIG. 32.

3.4.1.2.9 Device Capability Report

This report provides a detailed overview of various device capabilities and will be sent at regular intervals per device configuration or when requested by server. The table depicted in FIG. 33 describes the device compatibility report structure. The device capability record has the structure depicted in FIG. 34.

3.4.1.2.10 Accelerometer Data Report

This report provides details regarding any accelerometer related event such as streaming accelerometer data, harsh accelerations, or harsh decelerations. This report will be sent to the server whenever a defined accelerometer event is detected, or at regular intervals, or when requested by the server. The following table depicted in FIG. 35 describes the accelerometer report structure. The accelerometer alignment record has the structure depicted in FIG. 36. Each accelerometer data record has the structure depicted in FIG. 37.

3.4.2 Server-to-Device Request Messages (Message Type 0x02)

Server-to-device request messages are primarily used by servers to send read/write configuration requests to devices, to request on-demand reports and various data, and to execute any specific action on a device.

3.4.2.1 Device Configuration Read/Write Requests

To make certain decisions on the device (for example, which server to send data to, which server to check for firmware upgrades, when to send events, how often to send, when to send reports, how to poll certain telemetries, how often to poll), devices supports configuration parameters. The protocol supports reading and writing configuration parameters. Configuration parameters can be device-type independent or device-type specific.

3.4.2.1.1 Configuration Read Request (Message Sub-type 0x01)

Configuration read request messages allow the platform service's servers to read device configuration—either device-type independent or device-type specific—parameters. Device-type independent configuration parameters are common across various types of devices (such as OBD-II, asset tracker, etc.). The table depicted in FIG. 38 describes the configuration read request structure.

3.4.2.1.2 Configuration Write Request (Message Sub-type 0x02)

Configuration write request messages allow the platform service's servers to write device configuration parameters—either device-type independent or device-type specific. Device-type independent configuration parameters are common across various types of devices (such as OBD-II, asset tracker, etc.). The table depicted in FIG. 39 describes the configuration read request structure.

3.4.2.1.3 Common Device Configuration Parameters

The table depicted in FIGS. 40A, 40B, 40C, 40D, 40E, 40F, 40G, 40H, 40I 40J, 40K, and 40L describes the common configuration parameters. Some of these parameters could be specific to a device's capabilities. For example, settings for Wi-Fi, Bluetooth, or accelerometer.

3.4.2.2 On-Demand Data Request (Message Sub-Type 0x03)

On-demand request messages allows servers to request on-demand telemetry data and reports from devices. This will allow servers to ask for a specific detail from devices. These types of messages are useful when a server wants to query devices for certain types of messages or reports out of schedule. For example, a network statistics report may be scheduled to be sent to a server once a day. However, it is possible that the server would like to know the network statistics for the device "just in time" rather than waiting for the next scheduled report. In these situations, the server will send an on-demand request message to the device to request specific telemetry or reports. The table depicted in FIG. 41 describes the on-demand data request message structure.

3.4.2.3 Command Execution Request (Message Sub-Type 0x04)

Command execution requests allow servers to send action/command execution requests to devices. This allows servers to request that a device execute any action supported by the device. Again, the command can be device-type independent or it can be device-specific. For example, device-independent commands could be requesting to toggle Wi-Fi radio status (enable/disable). A device-specific command could be requesting to remote start a vehicle for OBD-II-type devices (if supported by device) or requesting to beep an alarm for tracker-type devices. The table depicted in FIG. 42 describes the command execution request message structure. Each command execution request record has the structure depicted in FIG. 43.

3.4.2.3.1 Common Commands

The table depicted in FIGS. 44A, 44B, and 44C describes the common commands supported.

3.4.3 Server-to-Device Acknowledgment Messages (Message Type 0x03)

Server-to-device acknowledgment messages will be used only when devices are connected to servers directly using UDP/TCP connections. Whenever the server receives a message from a device with message type 0x01 (device-to-server message), the server will respond to the device with an acknowledgment receipt to let device know that it has successfully received the data from the device and has persisted/processed that data. Whenever a device sends to servers using transport mechanism other than direct UDP/TCP connections, such as in pub/sub, server-to-device acknowledgment messages are not required and will not be sent by the server when it receives data from middleware servers using the subscribe mechanism. FIG. 45 depicts the ACK-TYPE structure.

3.4.4 Device-to-Server Response Messages (Message Type 0x04)

Device-to-server response message flow is the opposite of server-to-device request message flow (server-to-device request message type 0x02). It includes responses to read configuration requests, receipts to write configuration requests, responses to on-demand telemetry requests, or responses to command execution requests.

3.4.4.1 Configuration Read Request Response (Message Sub-Type 0x01)

Configuration read request messages allow servers to read device configuration parameters—either device-type independent or device-type specific. Device-type independent configuration parameters are common across various types of devices (such as OBD-II, asset trackers, etc.). Whenever servers send configuration read requests, devices will respond to the server using a configuration read response message. The table depicted in FIG. 46 describes device-to-server configuration read request response structure.

3.4.4.2 Configuration Write Request's Response (Message Sub-type 0x02)

Configuration write request message allows servers to write device configuration parameters—either device-type independent or device-type specific. Device-type independent configuration parameters are common across various types of devices (such as OBD-II, asset trackers, etc.). Whenever a server sends a configuration write request, the device will respond using configuration write response message. The table depicted in FIGS. 47A and 47B describes device-to-server configuration write-request response structure. Each record in params map (key-value pair list) has the structure depicted in FIG. 48.

3.4.4.3 On-Demand Telemetry Request's Response (Message Sub-Type 0x03)

On-demand request messages allows servers to request on-demand telemetry data and reports from devices. This will allow servers to ask for a specific detail from devices. These types of messages are useful when a server wants to query a device for certain types of messages or reports out of schedule. Whenever servers send on-demand telemetry requests, devices will respond to servers using on-demand telemetry response messages. The table depicted in FIGS. 49A and 49B describes the on-demand telemetry request's response structure.

3.4.4.4 Command Execution Response (Message Sub-Type 0x04)

Command execution requests allow servers to send action/command execution requests to devices. This allows servers to request that a device execute any action supported by the device. Again, the command can be device-type independent or it can be device-type specific. Whenever the server sends a command execution request, the device will respond using a command execution response message after executing the requested commands. The table depicted in FIG. 50 describes the command execution request message structure. Each command execution status record has the structure depicted in FIG. 51.

3.4.5 Device-to-Server Request Messages (Message Type 0x05)

Device-to-server request messages are primarily used by devices to ask for any kind of details from servers, such as clock synchronization, assisted GPS data, etc. This message will be sent by a device to the server whenever device wants to request specific information. The table depicted in FIG. 52 describes the device-to-server request message structure. Each request record has the structure depicted in FIG. 53. The table depicted in FIG. 54 describes the common (device-type independent) requests a device can send to the servers.

3.4.6 Server-to-Device Response Messages (Message Type 0x06)

Server-to-device response message flow is exactly an opposite message flow as the device-to-server request messages. Whenever a device requests any data/information from a server, the server will respond to the device with server-to-device response messages. The table depicted in FIG. 55 describes the device-to-server request message structure. The table depicted in FIG. 56 describes the structure of the individual record in RESP-REQUEST map. The table depicted in FIG. 57 describes the common (device-type independent) responses for each REQUST-ID.

Device-Type-Specific Details

The above-mentioned payload structure (event messages, report messages, configuration read/write messages, on-demand telemetry requests, command-execution requests, device-to-server requests) is generic, so it can be used for any kind of device (OBD-II, asset tracker, etc.). However, some things will be device-type specific. For example, event ID. An OBD-II device will have events like ignition on and ignition off, while an asset tracker may have very limited events (wake-up, sleep, low battery, etc.). The same goes for device-specific reports (such as vehicle identification reports for OBD-II devices and daily activity reports for asset trackers). This section illustrates the different device types and device-type-specific events, telemetries, reports, configuration parameters, and commands.

3.5.1 OBD-II—Vehicle

OBD-II device-types are intended for use with vehicles. OBD (on-board diagnostics) refers to a vehicle's self-diagnostic and reporting capability. OBD systems give vehicle owners or repair technicians access to the status of various vehicle subsystems and their telemetry data. The OBD-II standard specifies the type of diagnostic connector and its pinout, the electrical signaling protocols available, and the messaging format. It also provides a candidate list of vehicle parameters to monitor along with how to encode the data for each. There is a pin in the connector that provides power for the scan tool from the vehicle battery, which eliminates the need to connect a scan tool to a power source separately. Finally, the OBD-II standard provides a list of standardized DTCs (diagnostic trouble codes). Because of this standardization, a single device can query the on-board computer(s) for these parameters in just about any vehicle. OBD-II standardization was prompted to simplify diagnosis of increasingly complicated emissions equipment, and even though only emission-related codes and data may be required to be transmitted through it according to U.S. legislation, most manufacturers have made the OBD-II data link connector the main connector in the vehicle through which systems are diagnosed and reprogrammed. The following section describes OBD-II device-specific events, telemetries, configuration parameters, reports and commands.

3.5.1.1 Events

The table depicted in FIGS. 58A, 58B, and 58C describes OBD-II device-specific events. OBD-II vehicle device-specific events will have prefix "VEH." Also, each event could have event specific telemetry, which will be present under the "Telemetry" field.

3.5.1.2 Telemetry

The table depicted in FIGS. 59A, 59B, 59C, 59D, and 59E describes OBD-II vehicle device-specific telemetries. It is good practice to send some common telemetry with every kind of device-to-server message in addition to OBD-II vehicle device-specific telemetries (such as battery voltage, network connection signal strength, GPS telemetry). This allows servers to track some of the common telemetry with finer details.

3.5.1.3 Reports

In addition to common reports (device-type independent), OBD-II vehicle device-type supports the following reports.

3.5.1.3.1 Vehicle Identification Report

The vehicle identification report provides support to report-specific information related to the vehicle bus interface. This report message is typically used to report the VIN (vehicle identification number) of the vehicle, the vehicle interface bus type and list of OBD-II PIDs (on-board diagnostic parameter IDs—codes used to request data from a vehicle) detected and supported by a vehicle. This report will be sent to a server whenever device detects VIN, OBD-II PIDs after an ignition-on event on vehicle or whenever requested by a server. The table depicted in FIG. 60 describes the vehicle identification report structure. The vehicle identification record has the structure depicted in FIGS. 61A, 61B, 61C, and 61D.

3.5.1.3.2 DTC Report

DTC (diagnostic trouble codes) provide support to report faults detected in vehicles. This report will be sent to a server whenever a device detects a DTC on the vehicle (periodic check) or whenever the servers request this report from device. (The platform service can supply a list of platform-recognized common DTCs upon request.) Diagnostic trouble codes, or OBD-II trouble codes, are codes that the car's OBD system uses to signal an issue. Each code corresponds to a fault detected in the car. When the vehicle detects an issue, it will activate the corresponding trouble code. Trouble codes are stored in the memory of on-board diagnostic systems whenever a component or system that's not operating within acceptable limits is detected (i.e., these codes are stored when a sensor in a vehicle reports a reading that is outside the normal/accepted range). For example, if the fuel mixture is too rich. The code will help the driver to identify and fix the issue within the car. In an example, each trouble code includes one letter and four digits, such as P1234. The table depicted in FIGS. 62A and 62B explains each component of DTCs. The table depicted in FIG. 63 describes the vehicle identification report structure. The VEH-DTC-RPT record has the structure depicted in FIG. 64. Each record in CODES list has the structure depicted in FIG. 65.

3.5.1.3.3 Trip Summary Report

The trip summary report is an aggregation type report that provides aggregated statistics about a trip a vehicle makes. That is, this report provides telemetry, statistics, and aggregated statistics between Ignition-on and Ignition-off events. This means that the device keeps track of statistics and aggregations while the vehicle is in-trip. This report is usually sent to server whenever device detects Ignition-off event on vehicle, which marks the completion of a trip or whenever requested by server during a trip. The table depicted in FIG. 66 describes the trip summary report message structure. The VEH-TRIP-RPT record has the structure depicted in FIGS. 67A, 67B, 67C, and 67D. Each HARSH-EVENT record has the structure depicted in FIG. 68. Each IDLING-EVENT record has the structure depicted in FIG. 69.

3.5.1.4 Configuration Parameters

In addition to common configuration parameters (device-type independent), OBD-II—Vehicle device-type supports following configuration parameters depicted in FIGS. 70A, 70B, 70C, and 70D.

3.5.1.5 Commands

In addition to common commands (device-type independent), OBD-II—Vehicle device-type supports following commands depicted in FIG. 71.

3.5.2 Pet Tracker

Pet tracker devices may be used with pets (or other moveable objects) and to track their locations and their activities. The pet tracker makes it easy to track pets, where they have been, and what they're been doing (walking, running, sleeping etc.). Also, finding a lost pet can be a very stressful and sometimes very complicated process. The owner searches the area and, if the search turns out to be fruitless, post flyers, contact shelters, and other means to search for the lost pet. With the pet tracker, as long as the animal is still wearing the device, the owner will be able to easily locate the pet. The following section describes pet tracker device-type-specific events, telemetries, configuration parameters, reports, and commands.

3.5.2.1 Events

Pet tracker device-type-specific events have a PT prefix. Also, each event could have event specific telemetry, which will be present under the "Telemetry" field. The table depicted in FIG. 72 describes the pet tracker device-type-specific events.

3.5.2.2 Telemetry

Tracker-specific telemetry may be supported.

3.5.2.3 Reports

In addition to common reports (device-type independent), pet tracker device-type supports the following reports.

3.5.2.3.1 Activity Report

The activity report provides support to send various activities the pet has done since the last activity report was send to a server. This report will be sent to the server at regular intervals as defined by the configuration parameters or when requested by the server. The table depicted in FIG. 73 describes the activity report structure. The PT-ACTIVITY-RPT record has the structure depicted in FIG. 74. Each activities record has the structure depicted in FIG. 75. Each timing record has the structure depicted in FIG. 76.

3.5.2.4 Configuration Parameters

In addition to common configuration parameters (device-type independent), pet tracker devices support the following configuration parameters depicted in FIG. 77.

3.5.2.5 Commands

In addition to common commands (device-type independent), pet tracker devices support the following device-specific commands depicted in FIG. 78.

3.6 Measurement Fields

In payload message structure, many fields are measurement-type fields, meaning they provide some sort of measurement values such as time, duration, pressure, temperature etc. The table depicted in FIGS. 79A, 79B, and 79C describes the types of measurement fields, their measurement units, and their serialization formats.

3.7 Sample Messages

Following section describes samples messages for each different message type described in previous sections.

3.7.1 Message Header

The table depicted in FIG. 80 illustrates a sample message header and field values.

3.7.2 Device-to-Server Event Message

FIGS. 81A and 81B depict the structure of the Device-to-Server Event Message.

The sample message depicted FIG. 82 describes an example Device-to-Server Event Message for event DEV_WK_EXT_BAT.

3.7.3 Device-to-Server Report Message

FIG. 83 depicts the structure of the Device-to-Server Report Message. The sample message depicted in FIGS. 84A, 84B, 84C, 84D, 84E, 84F, 84G, 84H, 84I, 84J, 84K, 84L, 84M, and 84N describes an example Device-to-Server Report Message comprising of various kinds of reports in one message.

3.7.4 Server-to-Device Read Configuration Request Message

FIG. 85 depicts the structure of the Server-to-Device Read Configuration Request Message. The sample message depicted in FIG. 86 describes an example Server-to-Device Read Configuration Request Message.

3.7.5 Server-to-Device Write Configuration Request Message

FIG. 87 depicts the structure of the Server-to-Device Write Configuration Request Message. The sample message depicted in FIG. 88 describes an example Server-to-Device Write Configuration Request Message.

3.7.6 Server-to-Device On-Demand Telemetry Request Message

FIG. 89 depicts the structure of the Server-to-Device On-demand Telemetry Request Message. The sample message depicted in FIG. 90 describes an example Server-to-Device On-demand Telemetry Request Message.

3.7.7 Server-to-Device Command Execution Request Message

FIG. 91 depicts the structure of the Server-to-Device Command Execution Request Message. The sample message depicted in FIG. 92 describes an example Server-to-Device Command Execution Request Message.

3.7.8 Server-to-Device Acknowledgement Message

FIG. 93 depicts the structure of the Server-to-Device Acknowledgement Message. The sample message depicted in FIG. 94 describes an example Server-to-Device Acknowledgment Message.

3.7.9 Device-to-server Read Configuration Response Message

FIG. 95 depicts the structure of the Device-to-Server Read Configuration Response Message. The sample message depicted in FIG. 96 describes an example Device-to-Server Read Configuration Response message.

3.7.10 Device-to-Server Write Configuration Response Message

FIG. 97 depicts the structure of the Device-to-Server Write Configuration Response Message. The sample message depicted in FIG. 98 describes an example Device-to-Server Write Configuration Response Message.

3.7.11 Device-to-Server On-demand Telemetry Response Message

FIG. 99 depicts the structure of the Device-to-Server On-demand Telemetry Response Message. The sample message depicted in FIGS. 100A, 100B, 100C, 100D, 100E, 100F, 100G, 100H, 100I, 100J, 100K, 100L, 100M, and 100N describes an example Device-to-server On-demand Telemetry Response Message.

3.7.12 Device-to-Server Command Execution Response Message

FIG. 101 depicts the structure of the Device-to-Server Command Execution Response Message. The sample message depicted in FIG. 102 describes an example Device-to-Server Command Execution Response Message.

3.7.13 Device-to-Server Request Message

FIG. 103 depicts the structure of the Device-to-Server Request Message. The sample message depicted in FIGS. 104A and 104B describes an example Device-to-Server Request Message.

3.7.14 Server-to-Device Response Message

FIG. 105 depicts the structure of the Server-to-Device Response Message. The sample message depicted in FIG. 106 describes an example Server-to-Device Response Message.

Referring again to FIG. 1, it will be appreciated that the computing devices and systems are depicted in simplified form. It is to be understood that virtually any computer architecture may be used without departing from the scope of this disclosure. As previously described, a computing system or device includes a logic machine and a data storage machine. A computing system or device may further include an input/output subsystem, a communication subsystem, and an energy storage device that supplies electrical energy to the various components.

A logic machine may include one or more physical devices configured to execute instructions, such as instructions held in a data storage machine. For example, the logic machine may be configured to execute instructions that are part of one or more protocols, applications, services, programs, routines, libraries, objects, components, data structures, or other logical constructs. As a non-limiting example, instructions include an operating system and one or more applications. Such instructions may be implemented to perform a task, implement a data type, transform the state of one or more devices, or otherwise arrive at a desired result. As one example, the logic machine includes hardware in the form of one or more processors that are configured to execute software instructions. Additionally or alternatively, the logic machine may include one or more hardware or firmware logic machines configured to execute hardware or firmware instructions, as another example. Processors of the logic machine may be single core or multicore, and the programs executed thereon may be configured for parallel or distributed processing. The logic machine may optionally include individual components that are distributed throughout two or more devices, which may be remotely located and/or configured for coordinated processing. One or more aspects of the logic machine may be virtualized and executed by remotely accessible networked computing devices configured in a cloud computing configuration.

A data storage machine includes one or more physical, non-transitory, machines or devices configured to hold data in data store and/or instructions executable by the logic machine to implement the herein described methods and operations. When such methods and operations are implemented, the state of the data storage machine may be transformed (e.g., to hold different data or other suitable forms of information). A data storage machine may include removable media and/or built-in devices. A data storage machine may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. A data storage machine may include devices with one or more of the following characteristics: volatile, nonvolatile, dynamic, static, read/write, read-only, random access, sequential access, location addressable, file addressable, and content addressable. In at least some implementations, a logic machine and a data storage machine may be integrated into one or more common devices, such as an application specific integrated circuit or a system on a chip. It is to be appreciated that a data storage machine includes one or more physical, non-transitory devices. In contrast, in at least some implementations and under select operating conditions, aspects of the instructions described herein may be propagated in a transitory fashion by a signal (e.g., an electromagnetic signal, an optical signal, etc.) that is not held by a physical device for at least a finite duration. Furthermore, data and/or other forms of information pertaining to the present disclosure may be propagated by a signal.

The terms "module" or "program" may be used to describe an aspect of a computing system that is implemented to perform one or more particular functions. In some cases, such a module or program may be instantiated via a logic machine executing instructions held by a data storage machine. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc.

An input/output subsystem may include and/or otherwise interface with one or more sensors (e.g., a sensor subsystem), input devices, and/or output devices. Examples of input devices include a dedicated button or switch, keyboard, keypad, touch-sensitive graphical display device, touch-panel or pad, a computer mouse, a pointer device, a handheld controller, a microphone, etc. Examples of output devices include a graphical display device, a touch-sensitive graphical display device, an audio speaker, a haptic feedback device (e.g., a vibration motor), etc. When included, a graphical display device may be used to present a visual representation of data held by a data storage machine, such as a GUI, for example. As the herein described methods and operations change the data held by the data storage machine, and thus transform the state of the data storage machine, the state of the graphical display may likewise be transformed to visually represent changes in the underlying data.

A communication subsystem may be configured to communicatively couple the computing system or device with one or more other computing devices or computing systems, and/or to communicatively couple two or more computing devices that form computing system. Communication subsystem 134 may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable the computing system or device to send and/or receive messages to and/or from other devices via a communications network such as the Internet, for example. A communication subsystem or an electronic interface thereof may form an OBD interface which may correspond to a vehicle-side OBD interface and/or a device-side OBD interface. A communication subsystem include a wireless LAN interface and/or a wireless WAN interface.

It is to be appreciated that a "service", as used herein, may be an application program or other suitable instruction set executable across multiple sessions and available to one or more system components, programs, and/or other services. For example, feature module 160 of server system 150 may include a service. In at least some implementations, a service may run on a server or collection of servers responsive to a request from a client (e.g., an on-board computing system, a wireless mobile device, or other networked computing device). A service may be configured for use with one or more applications that may be distributed to and downloaded by one or more other computing devices. For example, one or more mobile computing devices, telematics devices, server devices, etc. may download application programs to augment the user experience provided by or through a computing system located on-board a vehicle. In at least some implementations, a service may host or otherwise provide an application program store or library from which application programs may be purchased or obtained by subscribers or members of the public. A service may include one or more service modules for providing cloud-based functionality. For example, a notification module may receive, process, and forward event notifications and response messages between telematics devices and client devices. As another example, an account module may associate profile information or other data with various identifiers, and enable other computing devices, such as on-board computing systems and/or client devices to access account profile information via an application programming interface (API). As yet another example, an application module may distribute and/or manage application programs operating at on-board computing systems and/or client devices. Application module may support the ability for users to port applications, data, and/or preferences stored in a user account across multiple on-board computing systems.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims or the equivalence of such metes and bounds are embraced by the claims.

The invention claimed is:

1. A mobile computing device for monitoring a mobile object, the mobile computing device comprising:
an electronic interface to communicate with a set of one or more sensors;
a wireless communications interface;
a logic machine; and
a data storage machine having instructions stored thereon executable by the logic machine to:
obtain sensor measurements from the set of one or more sensors via the electronic interface;
format a set of one or more outbound messages according to a messaging protocol defined by the instructions in which each of outbound messages includes a header and a payload containing data that is based on the sensor measurements obtained, the header containing:
(A) a device identifier associated with the mobile computing device,
(B) a sequence identifier that identifies a relative order of the each of the outbound messages in a sequence of the set of one or more outbound messages, and
(C) a serialization type identifier that identifies a select serialization format of the payload data of a plurality of supported serialization formats,
transmit the set of one or more outbound messages via the wireless communications interface over a wireless communications network directed to a target computing device.

2. The mobile computing device of claim 1, wherein the instructions are further executable by the logic machine to:
store the set of one or more outbound messages in a buffer of the data storage machine;
receive an acknowledgement message from the target computing device following the set of one or more outbound messages being transmitted to the target computing device, the acknowledgement message indicating a sequence identifier of the set of one or more outbound messages; and
clear one or more of the outbound messages of the set of one or more outbound messages from the buffer that have a sequence identifier that includes or precedes the sequence identifier indicated by the acknowledgment message.

3. The mobile computing device of claim 2, wherein the set of one or more outbound messages includes multiple outbound messages; and
wherein the multiple outbound messages are transmitted before the acknowledgement message is received from the target computing device.

4. The mobile computing device of claim 3, wherein the set of one or more outbound messages are transmitted over a transport layer protocol that does not utilize a handshake dialog with a recipient party, including the target computing device.

5. The mobile computing device of claim 4, wherein the transport layer protocol includes User Datagram Protocol (UDP).

6. The mobile computing device of claim 3, wherein two or more of the outbound messages of the set of one or more outbound messages are cleared from the buffer responsive to the acknowledgment message.

7. The mobile computing device of claim 6, wherein the two or more of the outbound messages that are cleared from the buffer are less than all of the outbound messages of the set of one or more outbound messages; and
wherein the instructions are further executable by the logic machine to:
retain a subsequent portion of the set of one or more outbound messages in the buffer that were transmitted after the two or more of the outbound messages until a subsequent acknowledgment message is received from the target computing device that indicates a sequence identifier of the last of the outbound messages of the subsequent portion of the set of one or more outbound messages.

8. The mobile computing device of claim 3, wherein the multiple outbound messages are limited to a predefined quantity of outbound messages that are transmitted to the target computing device before the acknowledgement message is received.

9. The mobile computing device of claim 8, whereupon reaching the predefined quantity of outbound messages transmitted to the target computing device before the acknowledgement message is received, the instructions are further executable by the logic machine to continue to store one or more additional outbound messages in the buffer without transmitting the one or more additional outbound messages.

10. The mobile computing device of claim 9, wherein the instructions are further executable by the logic machine to:
upon receiving the acknowledgment message, transmit the one or more additional outbound messages stored in the buffer via the wireless communications interface over a wireless communications network directed to the target computing device, up to a predefined threshold quantity of outbound messages.

11. The mobile computing device of claim 10, wherein the one or more additional outbound messages includes multiple additional outbound messages; and
wherein the instructions are further executable by the logic machine to:
prioritize the multiple additional outbound messages based on a feature of their respective payloads, and
transmit one or more of the multiple additional outbound messages to the target computing device in an order defined by their priority.

12. The mobile computing device of claim 1, wherein each of the outbound messages is formatted by the logic machine encoding at least a portion of the data according to a predefined schema to obtain encoded data of the payload.

13. The mobile computing device of claim 12, wherein the encoded data obtained of the payload has the select serialization format indicated by the serialization type identifier.

14. The mobile computing device of claim 12, wherein the predefined schema has a different description language than the encoded data.

15. The mobile computing device of claim 1, wherein the header further contains:
a message type identifier corresponding to a device-to-server message type selected from a plurality of supported message types, including at least an event message type and a report message type, and
a compression type identifier for the payload data that identifies a select compression format of the payload data of a plurality of supported compression formats.

16. A method performed by a server system of one or more server computing device, the method comprising:
- receiving multiple inbound messages from a mobile computing device over a communications network having a wireless network component, wherein a header of each of the multiple inbound messages includes a sequence identifier that identifies a relative order of that inbound message in a sequence of the multiple inbound messages;
- storing data contained within each of the multiple inbound messages in a persistent data storage device; and
- following the storing of the data contained within each of the multiple inbound messages, transmitting an acknowledgement message indicating a sequence identifier of a last received inbound message of the multiple inbound messages.

17. The method of claim 16, further comprising:
- performing flow control at the server system by delaying transmitting the acknowledgement message until a predetermined time.

18. The method of claim 16, wherein the data of a payload of each inbound message is encoded according to a predefined schema; and
- wherein the header of each inbound message further includes a serialization type identifier that identifies a select serialization format of a plurality of supported serialization formats; and
- wherein the method further comprises decoding the encoded data by deserializing the data of each of the multiple inbound messages based on the select serialization format identified by the serialization type identifier of that respective instance of the inbound message.

19. The method of claim 16, wherein the header further contains:
- a message type identifier corresponding to a device-to-server message type selected from a plurality of supported message types, including at least an event message type and a report message type, and
- a compression type identifier for the payload data that identifies a select compression format of the payload data of a plurality of supported compression formats.

20. A method performed by a computing device, the method comprising:
- formatting multiple outbound messages according to a messaging protocol in which each of the outbound messages includes a header and a payload, the header containing a sequence identifier that identifies a relative order of the outbound messages in a sequence of the multiple outbound messages;
- storing the multiple outbound messages formatted in a buffer of the computing device;
- transmitting the multiple outbound messages via the wireless communications interface over a wireless communications network directed to a target computing device before an acknowledgement message is received from the target computing device;
- receive the acknowledgement message from the target computing device, the acknowledgement message indicating a sequence identifier of the multiple outbound messages; and
- clearing one or more of the outbound messages of the multiple outbound messages from the buffer that have a sequence identifier that includes or precedes the sequence identifier indicated by the acknowledgment message.

* * * * *